US009159360B2

(12) United States Patent
Shiroishi

(10) Patent No.: US 9,159,360 B2
(45) Date of Patent: Oct. 13, 2015

(54) SERVO PATTERN BY MICROWAVE ASSISTED MAGNETIC RECORDING, PERPENDICULAR MAGNETIC RECORDING MEDIUM, MAGNETIC STORAGE DEVICE AND METHOD FOR MANUFACTURING THE SAME

(71) Applicant: HITACHI, LTD., Chiyoda-ku, Tokyo (JP)

(72) Inventor: Yoshihiro Shiroishi, Hachioji (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/867,362

(22) Filed: Apr. 22, 2013

(65) Prior Publication Data

US 2013/0279039 A1    Oct. 24, 2013

(30) Foreign Application Priority Data

Apr. 23, 2012  (JP) ................................. 2012-097724

(51) Int. Cl.
| G11B 21/02 | (2006.01) |
| G11B 5/09 | (2006.01) |
| G11B 5/127 | (2006.01) |
| G11B 20/12 | (2006.01) |
| G11B 5/60 | (2006.01) |
| G11B 5/596 | (2006.01) |

(Continued)

(52) U.S. Cl.
CPC ........ *G11B 20/1217* (2013.01); *G11B 5/59638* (2013.01); *G11B 5/59655* (2013.01); *G11B 5/607* (2013.01); *G11B 5/012* (2013.01); *G11B 5/59633* (2013.01); *G11B 5/59661* (2013.01); *G11B 5/6011* (2013.01); *G11B 21/21* (2013.01); *G11B 2005/0024* (2013.01); *G11B 2020/1281* (2013.01); *G11B 2020/1284* (2013.01); *G11B 2220/2516* (2013.01)

(58) Field of Classification Search
None
See application file for complete search history.

(56) References Cited

U.S. PATENT DOCUMENTS

| 6,128,153 A | 10/2000 | Hasegawa et al. |
| 7,230,790 B1 * | 6/2007 | Mallary et al. ............. 360/77.08 |

(Continued)

FOREIGN PATENT DOCUMENTS

| JP | H01-94574 A | 4/1989 |
| JP | H09-330571 A | 12/1997 |

(Continued)

OTHER PUBLICATIONS

Notice of Reasons for Rejection, mailed Jul. 14, 2015, which issued during the prosecution of Japanese Patent Application No. 2012-097724, which corresponds to the present application (with English translation attached).

*Primary Examiner* — Andrew L Sniezek
(74) *Attorney, Agent, or Firm* — Baker Botts L.L.P.

(57) ABSTRACT

Disclosed is a technique of providing a perpendicular magnetic recording medium in which high-quality servo information enabling high-density recording of 500 kTPI or more is recorded, and a magnetic storage device of an adaptive track formatting type having large capacity, high reliability and high performance with high device manufacturing yield. At a servo area of the perpendicular magnetic recording medium, a servo sequence such as a burst pattern for positioning in a servo track is recorded in a seamless manner without big recording footprint (several times longer than the servo bit) and in a magnetization pattern such that a total amount of the recording magnetization is substantially zero.

17 Claims, 34 Drawing Sheets

(51) Int. Cl.
  *G11B 21/21* (2006.01)
  *G11B 5/012* (2006.01)
  *G11B 5/00* (2006.01)

(56) References Cited

U.S. PATENT DOCUMENTS

| | | | |
|---|---|---|---|
| 8,643,972 B2 * | 2/2014 | Shiroishi et al. | 360/59 |
| 2004/0252394 A1 * | 12/2004 | Hamaguchi et al. | 360/48 |
| 2005/0213250 A1 | 9/2005 | Kurita et al. | |
| 2005/0286156 A1 | 12/2005 | Shimamura et al. | |
| 2006/0023339 A1 | 2/2006 | Fukuyama et al. | |
| 2006/0152843 A1 | 7/2006 | Hamaguchi et al. | |
| 2006/0280975 A1 * | 12/2006 | Albrecht et al. | 428/848.5 |
| 2008/0150643 A1 | 6/2008 | Suzuki et al. | |
| 2008/0268291 A1 | 10/2008 | Akiyama et al. | |
| 2009/0128943 A1 | 5/2009 | Ishibashi et al. | |
| 2011/0090603 A1 | 4/2011 | Bai | |
| 2011/0149433 A1 * | 6/2011 | Coker et al. | 360/77.08 |
| 2011/0149434 A1 | 6/2011 | Coker et al. | |
| 2011/0216435 A1 | 9/2011 | Shiimoto et al. | |
| 2012/0170151 A1 * | 7/2012 | Oikawa et al. | 360/110 |
| 2013/0258514 A1 * | 10/2013 | Kobayashi et al. | 360/46 |

FOREIGN PATENT DOCUMENTS

| | | |
|---|---|---|
| JP | 2006-012353 A | 1/2006 |
| JP | 2006-040423 A | 2/2006 |
| JP | 2006-196068 A | 7/2006 |
| JP | 2008-277586 A | 11/2008 |
| JP | 2011-090767 A | 5/2011 |
| JP | 2011-187092 A | 9/2011 |

* cited by examiner

Fig. 9

| Table 1 | II$_{STO}$(1) | II$_{STO}$(2) | ·· | II$_{STO}$(n) | ·· | II$_{STO}$(N) |
|---|---|---|---|---|---|---|
| II$_{WB}$(1) | | | | | | |
| II$_{WB}$(2) | | | | | | |
| . | | | | | | |
| II$_{WB}$(m) | | | | II$_{WB}$(m), II$_{STO}$(n) | | |
| . | | | | | | |
| II$_{WB}$(M) | | | | | | |

II$_{WB}$(i) < II$_{WB}$(i+1)
II$_{STO}$(j) < II$_{STO}$(j+1)
i=1,2,···,M-1
j=1,2,···,N-1

Fig. 10

| Head | Zone | Base recording current | STO driving current | TFC input power | Servo related information | | | |
|---|---|---|---|---|---|---|---|---|
| | | | | | E(i,j) | MCW(i,j) | MWW(i,j) | TP$_{OP}$(i,j) |
| H$_0$ | Z$_1$ | I$_{WB}$(0,1) | I$_{STO}$(0,1) | P$_{TFC}$(0,1) | E(0,1) | MCW(0,1) | MWW(0,1) | TP$_{OP}$(0,1) |
| | Z$_2$ | I$_{WB}$(0,2) | I$_{STO}$(0,2) | P$_{TFC}$(0,2) | E(0,2) | MCW(0,2) | MWW(0,2) | TP$_{OP}$(0,2) |
| | . | . | . | . | . | . | . | . |
| | Z$_n$ | I$_{WB}$(0,n) | I$_{STO}$(0,n) | P$_{TFC}$(0,n) | E(0,n) | MCW(0,n) | MWW(0,n) | TP$_{OP}$(0,n) |
| H$_1$ | Z$_1$ | I$_{WB}$(1,1) | I$_{STO}$(1,1) | P$_{TFC}$(1,1) | E(1,1) | MCW(1,1) | MWW(1,1) | TP$_{OP}$(1,1) |
| | Z$_2$ | I$_{WB}$(1,2) | I$_{STO}$(1,2) | P$_{TFC}$(1,2) | E(1,2) | MCW(1,2) | MWW(1,2) | TP$_{OP}$(1,2) |
| | . | . | . | . | . | . | . | . |
| | Z$_n$ | I$_{WB}$(1,n) | I$_{STO}$(1,n) | P$_{TFC}$(1,n) | E(1,n) | MCW(1,n) | MWW(1,n) | TP$_{OP}$(1,n) |
| . | . | . | . | . | . | . | . | . |
| H$_m$ | Z$_1$ | I$_{WB}$(m,1) | I$_{STO}$(m,1) | P$_{TFC}$(m,1) | E(m,1) | MCW(m,1) | MWW(m,1) | TP$_{OP}$(m,1) |
| | Z$_2$ | I$_{WB}$(m,2) | I$_{STO}$(m,2) | P$_{TFC}$(m,2) | E(m,2) | MCW(m,2) | MWW(m,2) | TP$_{OP}$(m,2) |
| | . | . | . | . | . | . | . | . |
| | Z$_n$ | I$_{WB}$(m,n) | I$_{STO}$(m,n) | P$_{TFC}$(m,n) | E(m,n) | MCW(m,n) | MWW(m,n) | TP$_{OP}$(m,n) |

SERVO PATTERN BY MICROWAVE ASSISTED MAGNETIC RECORDING, PERPENDICULAR MAGNETIC RECORDING MEDIUM, MAGNETIC STORAGE DEVICE AND METHOD FOR MANUFACTURING THE SAME

CLAIM OF PRIORITY

The present application claims priority from Japanese patent application JP 2012-097724 filed on Apr. 23, 2012, the content of which is hereby incorporated by reference into this application.

BACKGROUND OF THE INVENTION

1. Field of the Invention

The present invention relates to a servo track writer equipped with a function of recording a servo pattern on a magnetic storage device, the servo pattern enabling high-precision positioning with high format efficiency, a perpendicular magnetic recording medium with such a high-quality servo pattern and a magnetic storage device.

2. Background Art

The growth of the Internet environment and newly provided data centers along with penetration of crowd computing have increased the amount of information generated in recent years. Magnet recording started to shift in 2005 from longitudinal magnetic recording using a longitudinal ring-shape magnetic head and a longitudinal magnetic recording medium to perpendicular magnetic recording, and the perpendicular magnetic recording has improved its performance using a main pole and a shield (auxiliary pole) type magnetic recording head and a magnetic recording medium called an Exchange Coupled Composite (ECC) medium achieving dramatically improved recordability due to small magnetic crystalline anisotropic energy Hk on the magnetic surface layer (this may be called a cap layer) side to achieve high-density recording. There is no doubt that magnetic storage devices such as magnetic disk devices (HDD) having the highest recording density and excellent bit cost play the leading role for storage in the "big-data era". In order to support this, magnetic storage devices have to have larger capacity and so further increasing recording density is must.

As a magnetic recording technique for higher-density recording, microwave assisted magnetic recording (MAMR) has been proposed, in which high-frequency magnetic field in a microwave band is applied to a magnetic recording medium so as to excite precession movement of medium magnetization for magnetic recording on a perpendicular magnetic recording medium having large magnetic anisotropy while reducing the switching magnetic field. In recent years, practical micro-structured high-frequency Spin Torque Oscillator (STO) has been proposed by Japanese Patent No. 4677589 (which corresponds to US 2008/150643 A1), for example, configured to rapidly rotate spins by spin torque, thus generating high-frequency magnetic field. Japanese Patent No. 4255869 (which corresponds to US 2005/2132502011/0216436 A1) discloses a method of making a high-frequency magnetic field oscillator generate high-frequency magnetic field (circularly polarized magnetic field) rotating in the direction of the precession movement of the magnetic recording medium to be magnetization-reversed so as to be suitable for the polarity of the magnetic recording field, thus effectively inducing the magnetization reversal. In this way, research and development for implementation of the microwave assisted magnetic recording has become active.

In order to implement higher-density recording using an actual magnetic storage device, not only the magnetic recording technique as stated above but also high-precision positioning of a magnetic head at a predetermined data track are required. To this end, magnetic disk devices widely use a technique of recording a specific magnetic pattern (e.g., cyclic all-one pattern) called a servo burst pattern of several tens to 100 MHz beforehand as positional reference information during manufacturing, thus obtaining a head position signal from the pattern. JP 2011-129242 A (which corresponds to US 2011/149434 A1) discloses, as a servo model, a method using integrated servo fields. This servo model provides a sequence set that is constrained to provide some or all of a servo track mark (STM), position error signals (PES) and positional information such as the track-ID instead of a servo burst pattern including all-one information, and provides the position error signal in relation to the center of a data track through the amplitude of a signal read to adjacent sequences.

For a magnetic storage device provided with a plurality of magnetic heads, adaptive formatting is available, which uses a common servo track that is recorded collectively to absorb and compensate variations of the track width among these magnetic heads, thus optimizing track density or Track Per Inch (TPI) and linear recording density or Bits Per Inch (BPI) of a data track for each magnetic head during manufacturing and test process. Specifically, data is written on adjacent data tracks of a data track as a target, and then characteristics and a change thereof are evaluated by an Adjacent Track Interference (ATI) test, a squeeze test, a track width measurement test (747 curve method) and the like, thus optimize TPI. BPI is adjusted for each magnetic head so that an error rate of a plurality of magnetic heads on one magnetic storage device becomes as uniform as possible over the entire zone and the device capacity satisfies the specified value. This means that TPI changes continuously depending on the radial position and BPI is set for each zone (JP 2009-129482 A which corresponds to US 2009/128943 A1).

SUMMARY OF THE INVENTION

Firstly, the following examines a method for recording a servo pattern by perpendicular magnetic recording to achieve high-density recording having track density of 500 kTPI (track pitch: about 50 nm) and recording density of about 1 Tb/in$^2$.

Following the conventional perpendicular magnetic recording techniques, a perpendicular magnetic recording head having a main pole with a recording track width of 40 to 50 nm is manufactured. The perpendicular magnetic recording head, together with an ECC perpendicular magnetic recording medium, is mounted at a recording/reproducing tester having a servo function or is incorporated into a conventional magnetic storage device, and the magnetic storage device is installed at a conventional servo track writer (STW) that performs positioning using an encoder motor (rotary encoder), an external position detection/positioner such as a laser length measurement machine and a push pin, and servo information is recorded and the signal quality is evaluated.

FIG. 39 schematically shows an exemplary 4-bit burst pattern 201d recorded. In FIG. 39, reference numeral 201a denotes a gain reference initial signal gain (ISG) part, 201b denotes a servo sector marker synchronization part including a preamble and a Servo Address Mark (SAM) part, the preamble including a continuous pattern to give a frequency of data clock for synchronization of data recording/reproducing, and the SAM part indicating the leading of a servo signal for enabling recognition that the subsequent signal is a servo signal, 201c denotes a gray code part and 201e denotes a post servo part. This example schematically shows the state where, as the process progresses, the magnetic head moves to the outer radius side.

In this servo information recording process, as in the magnetization state at the boundary between servo tracks 3 and 4 recorded at step (6), each bit of the servo track is recorded in a continuously curved magnetization state. Recording current as shown at step (6) is applied to the perpendicular magnetic head, and servo information is recorded while rotating once at step (1). The magnetic head is then moved in the track width direction by a half of the servo track pitch TP, and a new servo pattern (magnetization information) is recorded (servo write steps (1) and (2)) while erasing and overwriting the servo pattern recorded one rotation ahead of the magnetic disk from one side (in the drawing, lower side) with the same phase. In this way, while magnetic disk rotates twice, servo information recording is performed on a servo area of one track.

The head magnetic field during recording, however, is expanded (side recording and side erasing) in the track width direction, and so an erasing area occurs between old magnetization information and new magnetization information. As a result, bits of the servo pattern recorded through this process will finally have a pair of magnetization information separated as in the drawing. Subsequently, every rotation of the magnetic disk forms tracks 1, 2, 3 ... one by one by the servo track recording steps (3), (4), (5).... Then, the gain reference ISG part 201a and the servo sector marker synchronization part 201b indicating a synchronization signal and the leading of a servo signal are recorded as a continuous pattern in the track width direction (excluding separation by side writing or erasing). Such a separated pattern is called a seamed pattern.

As a result of quantitative evaluation of the servo pattern recorded by the above process, as shown in FIG. 40, recording magnetic field expands widely from the main pole at the inner and outer radius side, and the amount of fringe due to side erasing reaches 3 nm (middle radius) to 8 nm (inner radius, outer radius) depending on the yaw angle θ. Thus, when servo information is recorded from an inner radius to an outer radius, for example, side erasing affects greatly on the outer radius side due to the influence from fringe of the recording magnetic field, thus reducing effective magnetization amount in a servo track. Further, due to noise from the side erasing area, S/N of a positioning signal from burst parts A, B and C including a seamed servo pattern deteriorates by up to 2 to 3 dB, leading to a significant problem of failing to secure sufficient signal quality.

Next, a method for recording a servo pattern capable of securing a high servo signal quality without separating servo bits is further considered. Firstly, in the servo track recording process, in order to record a seamless pattern so as not to separate servo bits, a servo pattern is recorded by turning off recording current at a pattern position where recording was performed in the previous step so as not to overwrite. Herein, in order to prevent the servo signal from being distorted having a DC component due to magnetic field from the surrounding area, demagnetization is performed by moving a magnet away from the medium surface while rotating the perpendicular magnetic recording medium beforehand.

FIG. 41 schematically shows the state where 4-bit servo burst signal is recorded. As shown in this drawing, in response to turn ON and OFF of recording current at step (5b), big recording footprint of the main pole is left after the final bit recording at the gray code part 201c, and further big recording footprint is left after the final bit recording of A burst at the servo burst part 201d as well due to turning-OFF of the recording current, thus causing deterioration of servo usage efficiency (format efficiency). The same goes for a null-type servo burst pattern shown in FIG. 42. In FIGS. 41, 42, an area 213 is a zero-magnetized part.

This phenomena leads to deterioration of area usage efficiency (format efficiency) of a servo pattern in a recent high-density perpendicular recording device having a high servo frequency of about 100 MHz (corresponding to 50 to 100 nm in bit length) because the above-stated footprint reaches the length several times longer than the servo bit. This results from an essential problem that is inevitable for perpendicular magnetic recording using a main-pole and shield type magnetic head, i.e., the recording magnetization state on the perpendicular magnetic recording medium by a main-pole and shield type magnetic head is decided by magnetic field from the main pole and the magnetization state in the shape of the main pole remains as a residual recording magnetization state (recording footprint) when the recording current is switched from ON to OFF.

Additionally, it is important for positioning to secure linearity of a servo signal with reference to position deviation. To this end, a servo pattern is typically recorded as dense as possible in the track width direction, and conventionally a servo track pitch has to be smaller than a data track pitch by about 15 to 20% so as to secure the linearity with the track density of 500 kTPI or more. This makes it very complicated to find positional information of a data track based on positional information of a servo pattern when a magnetic head is moved to a predetermined data track in accordance with an instruction from a host system. For each positioning, a target value for the positioning has to be calculated from servo information using a fifth to seventh-order conversion equation of the value, which is a problem in terms of a load applied to the magnetic storage device and the performance.

In view of the aforementioned problems of the conventional art, present invention provides a perpendicular magnetic recording medium recording high-quality servo information enabling a high-density track of 500 kTPI or more, and an adaptive track formatting type magnetic storage device with large capacity, high reliability and high performance and with a high manufacturing yield of the device.

According to the invention, a servo sequence such as a positioning burst pattern in a servo track is recorded at a servo area of a perpendicular magnetic recording medium in a seamless manner without big recording footprint several times longer than the servo bit and in a magnetization pattern such that the total amount of recording magnetization becomes substantially zero.

A servo pattern can be recorded by a servo track writer provided with a microwave assisted magnetic recording head including: a recording magnetic pole that forms a ring-shape magnetic core; a high-frequency oscillation element provided in a recording gap thereof; a magnetic reproduction element that reads information from a magnetic recording medium; and a TFC element that controls clearance between the high-frequency generation element and a magnetic recording medium.

According to the invention, at least a servo sequence providing positioning information is seamless and is not separated, and so servo information has a large effective magnetization amount and can provide high positional signal quality, thus enabling precise positioning.

Problems, configurations, and advantageous effects other than those described above will be made clear by the following description of embodiments.

BRIEF DESCRIPTION OF THE DRAWINGS

FIG. 9 shows a table to optimize $I_{WB}$ and $I_{STO}$.

FIG. 10 shows an exemplary table holding optimum values of $I_{WB}$, $I_{STO}$, $P_{TFC}$ and servo-related information for each magnetic head and for each magnetic recording medium zone.

DESCRIPTION OF A PREFERRED EMBODIMENT OF THE INVENTION

In the following, an embodiment of the invention is described with reference to the drawings.

Embodiment 1

Figure 1:
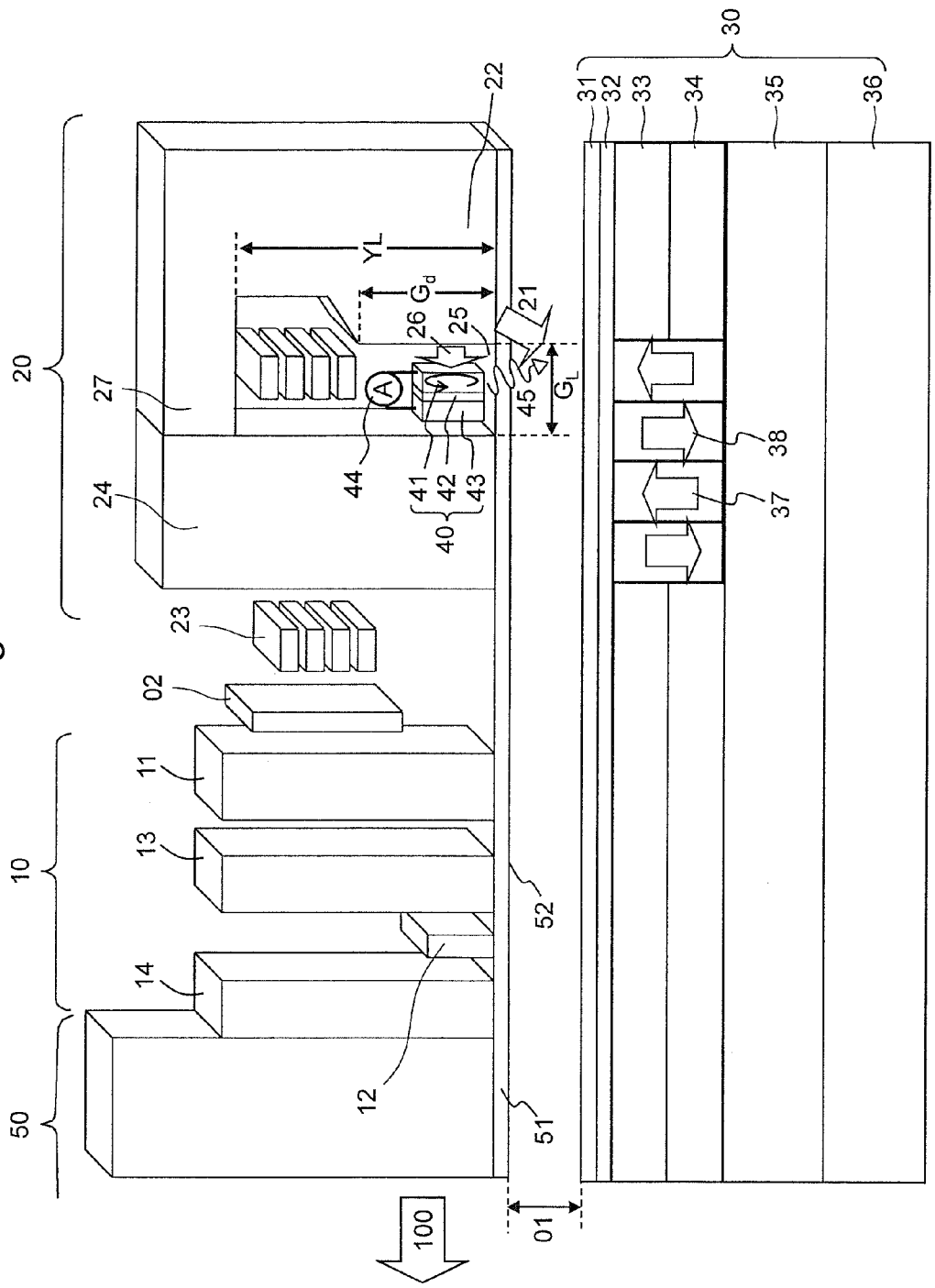
FIG. 1 is a conceptual diagram showing exemplary magnetic head and perpendicular magnetic recording medium.

The following describes exemplary configurations of a microwave assisted magnetic recording head and a perpendicular magnetic recording medium used in the present embodiment, a servo pattern of the perpendicular magnetic recording medium (this may be called a servo sequence), exemplary configurations of a servo track and a data track and a magnetic disk device. FIG. 1 is a conceptual diagram showing exemplary magnetic head and perpendicular magnetic recording medium used in the present embodiment.

(Magnetic Head)

A magnetic head includes a reproduction head part 10, a recording head part 20 and a thermal expansion element (TFC: Thermal Flying Height Controller) 02 for clearance controller or the like formed on a slider 50 traveling in the direction of an arrow 100 while keeping clearance 01 on a perpendicular magnetic recording medium 30. Herein, the TFC 02 includes a heat-generation resistive element thin film of about 50 to 150Ω made of a material having high specific resistance and a high thermally expandable property, such as NiCr or W and insulated with alumina ($Al_2O_3$) film, and has a function of adjusting the clearance between the recording head part 20 or the reproduction head part 10 and the perpendicular magnetic recording medium 30 to be about 0.5 to 2 nm. The TFC may be provided at two or more positions, and in such a case, wiring for connection of them may be provided independently or in series. Wiring for power supply is not illustrated in the drawing. A head protective layer 51 is made of Chemical Vapor Deposition-Carbon (CVD-C), Filtered Cathodic Arc Carbon (FCAC) or the like, and a bottom face 52 is an Air Baring Surface (ABS) of the magnetic head. The head protective layer may be omitted.

The slider 50 is made of $Al_2O_3$—TiC ceramic or the like, subjected to etching so that negative pressure is generated at the ABS face, allowing the floating amount of the pole part of the magnetic head to be about 5 to 10 nm across the entire perimeter of the magnetic recording medium. The slider 50 is mounted on a suspension having element driving wiring, and is incorporated in the magnetic storage device as a Head Gimbal Assembly (HGA). The present embodiment uses a slider of femto-type measuring 0.85 mm×0.7 mm×0.23 mm, which may be a thin femto type measuring about 0.2 mm in height or a long femto type measuring about 1 mm in length depending on its use.

The reproduction head part 10 includes: a magnetic shield layer 11 that shields the reproduction head part from the recording head part; a reproduction sensor element 12; upper and lower magnetic shields 13, 14 to enhance reproduction resolution, and the like. The reproduction sensor element 12 plays a role of reproducing a signal from the medium, and may be configured to exert a Tunneling Magneto-Resistive (TMR) effect, a Current Perpendicular to Plane (CPP)—Giant Magneto-Resistive (GMR) effect or an Extraordinary Magneto-Resistive (EMR) effect as well as a sensor utilizing a Spin Torque Oscillator (STO) effect, a $Co_2Fe(Al_{0.5}Si_{0.5})/Ag/Co_2Fe(Al_{0.5}Si_{0.5})$ scissors type including the lamination of Heusler alloy or a differential type. The element width, the element height and the shield gap (reproduction gap) may be designed or processed suitably for recording track density and recording density as a target, and the element width may be about 50 nm to 5 nm, for example. FIG. 1 does not illustrate a leading terminal of the reproduction output.

The recording head part 20 includes: first and second recording magnetic poles 22 and 24 and a high-frequency magnetic field oscillator (STO) 40 that is provided in a recording gap 25 between the first and second recording magnetic poles 22 and 24 to generate recording magnetic field 21 and intense and uniform STO oscillation control magnetic field 26 (hereinafter called oscillation control magnetic field) at the recording gap 25; a coil 23 to excite the recording magnetic poles and the like. High-frequency magnetic field 45 generated by the STO 40 is controlled by the oscillation control magnetic field 26 for the rotation direction and the oscillation frequency. In this example, the first and second recording magnetic poles 22 and 24 are configured to have a large volume in the vicinity of the recording gap 25 and have a substantially magnetically-symmetrical ring-shape structure. In this example, the coil 23 made of a Cu thin film, for example, is wound around the recording magnetic pole 24, which may be wound around a rear-end part 27 of the recording magnetic pole or around the first recording magnetic pole 22, or may be multilayer winding. The recording gap 25 may be made of a non-magnetic thin film such as an $Al_2O_3$ or $Al_2O_3$—$SiO_2$ film formed by sputtering or CVD.

For uniform and intense magnetic field at the recording gap, magnetic layers of the magnetic poles in the vicinity of the gap have thicknesses of 40 nm to 3 μm. The recording gap length $G_L$ is determined with consideration given to the thickness of STO 40, uniformity and intensity of the oscillation control magnetic field 26 in the recording gap, intensity and recording field gradient of the recording magnetic field 21, a track width, a gap depth $G_d$ and the like. The gap depth is preferably the track width and the gap length of the recording magnetic poles or more in terms of the uniformity of magnetic field, and so the track width of the second recording magnetic pole 22 on the trailing side (rear part in the head traveling direction) is 40 to 250 nm, the gap depth is 40 to 700 nm and the gap length is 20 to 200 nm. For improved frequency response, smaller yoke length YL and smaller number of coil turns are preferable, and so the yoke length is 0.5 to 10 μm and the number of coil turns is 2 to 8. Especially in the case of a magnetic head for high-speed transferring magnetic storage device used for a server or enterprise, the yoke length is 4 μm or less, and if needed, the magnetic head preferably has a multilayer structure including the lamination of magnetic thin films with high specific resistance or high-saturation magnetic flux magnetic thin films via a non-magnetic intermediate layer.

The first recording magnetic pole 22 includes a high-saturation magnetic flux soft magnetic film made of FeCoNi, CoFe, NiFe alloy or the like, which is formed by a thin-film formation process such as plating, sputtering or ion beam deposition to be a single layer or a multilayer. The width $T_{ww}$ of the recording element may be designed suitably for the recording magnetic field and the recording density as targets and be processed by a semiconductor process, and may be about 200 nm to 30 nm in size. The magnetic pole in the vicinity of the recording gap may be a film that is flat and parallel to the recording gap face or may surround the STO. More preferably, a high-saturation magnetic flux material is used in the vicinity of the recording gap for improved recording magnetic field intensity, and the shape thereof is narrowed toward the recording gap. Similarly to the first recording magnetic pole 22, the second recording magnetic pole 24 also may include a soft magnetic alloy thin film made of CoNiFe alloy, NiFe alloy or the like, and may have a controlled shape.

Magnetic recording by the thus configured recording head is governed by the recording gap, and so a recording trace by static recording on a perpendicular magnetic recording medium has a substantially shape of the recording gap. In this way, the magnetic pole is configured as a ring shape so as to concentrate intense magnetic field governing the recording on the vicinity of the recording gap, whereby recording magnetic field intensity, uniformity of the magnetic field in the gap, oscillation performance of the STO 40 and a recording assist effect can be dramatically improved as compared with a conventional main pole-shield magnetic pole type magnetic recording head. Additionally, the recording head has high effective recording magnetic field intensity, excellent controllability and has the polarity well matching with the STO, thus enabling effective superimposition of the recording magnetic field and the high-frequency magnetic field to the magnetic recording medium and narrow track recording, and so such a recording head is particularly preferable.

The STO 40 includes: a high-frequency magnetic field generation layer (FGL) 41; an intermediate layer 42 and a spin injection layer 43, where the FGL 41 is made of soft magnetic alloy such as FeCo or NiFe, hard magnetic alloy such as CoPt or CoCr, magnetic alloy having negative perpendicular magnetic anisotropy such as $Fe_{0.4}Co_{0.6}$, $Fe_{0.01}Co_{0.99}$ or $Co_{0.8}Ir_{0.2}$, Heusler alloy such as CoFeAlSi, CoFeGe, CoMnGe, CoFeAl, CoFeSi or CoMnSi, Re-TM amorphous alloy such as TbFeCo, or magnetic artificial super-lattice such as Co/Fe, Co/Ir, Co/Ni or CoFeGe/CoMnGe, the intermediate layer 42 is made of a non-magnetic conductive material such as Au, Ag, Pt, Ta, Ir, Al, Si, Ge, Ti, Cu, Pd, Ru, Cr, Mo or W, and the spin injection layer 43 gives spin torque to the FGL.

Materials, structures and magnetic anisotropy of these magnetic layers are decided so that the spin injection efficiency, the high-frequency magnetic field intensity, the oscillation frequency, and effective magnetic anisotropy including demagnetizing field can be most suitable for the high-frequency oscillation and microwave assisted recording. For instance, since high-frequency magnetic field increases in proportion to the saturation magnetization of the FGL, the FGL layer preferably has a higher saturation magnetization Ms. Although a larger thickness leads to higher high-frequency magnetic field, too thick films make the magnetization receptive to disturbance, and so the thickness of 1 to 100 nm is preferable. Intense control magnetic field applied using the above-stated ring shape magnetic pole enables stable oscillation with any one of a soft magnetic material, a hard magnetic material or a negative perpendicular magnetic anisotropy material.

The FGL 41 may have a width $W_{FGL}$ that is designed and processed suitably for the recording magnetic field and the recording density as targets, and the width is 50 nm to 5 nm in one example. For a larger $W_{FGL}$, more intense control magnetic field is preferable. In the case of combination with Shingled Magnetic Recording (SMR) described later, $W_{FGL}$ is preferably two or three times the recording track width. The intermediate layer 42 preferably has a thickness of about 0.2 to 4 nm for high spin injection efficiency. The spin injection layer 43 preferably is made of an artificial magnetic super-lattice such as Co/Pt, Co/Ni, Co/Pd or CoCrTa/Pd because such a material having perpendicular magnetic anisotropy enables stable oscillation of the FGL. For stabilization of high-frequency magnetic rotation of the FGL 41, a rotation guide ferromagnetic layer having a structure similar to that of the spin injection layer 43 may be provided adjacent to the FGL 41. The lamination order of the spin injection layer 43 and the FGL 41 may be reversed.

Although not illustrated in FIG. 1, an under layer and a cap layer may be further provided to improve the controllability of film properties and film characteristics of the spin injection layer and the FGL, the oscillation efficiency and reliability, where these layers may be made of a single layer thin film, an alloy thin film or a lamination thin film made of Cu, Pt, Ir, Ru, Cr, Ta, Nb and the like. Since the STO is formed after the formation of the reproduction element, the manufacturing process thereof preferably is performed so as not to adversely affect the characteristics of the reproduction element.

A driving current source (or voltage source) and an electrode part of the STO are schematically represented with reference numeral 44, and the recording magnetic poles 22 and 24 may be used as electrodes by magnetically coupling the recording magnetic poles 22 and 24 at the rear-end part 27 of the magnetic head but electrically insulating and further by electrically connecting them with the side face of the STO at the gap. Except under the special circumstances, current is applied to the STO from a DC power supply (voltage driven or current driven) 44 from the side of the spin injection layer, thus driving microwave oscillation of the FGL.

(Perpendicular Magnetic Recording Medium)

The perpendicular magnetic recording medium 30 includes the lamination on a super-smooth and heat-resisting non-magnetic substrate 36 made of glass, Si, plastics, NiP plated Al alloy or the like, the lamination including a soft magnetic under layer 35, first and second recording layers 34, 33, a protective layer 32 and a lubricant layer 31, for example. The soft magnetic under layer 35 is made of FeCoTaZr and the like. The first and second recording layers 34, 33 include magnetic films that are mainly made of CoCrPt, $L1_2$-$Co_3Pt$ base alloy, $L1_2$-$(CoCr)_3Pt$ base alloy, $L1_1$-$Co_{50}Pt_{50}$ base alloy, m-$D0_{19}$ base $Co_{80}Pt_{20}$ base alloy, $CoCrSiO_2$/Pt, CoB/Pd magnetic artificial super-lattice, $L1_0$ FePt or the like, to which an additive such as $SiO_2$, $TiO_2$, C, B, Ag, Cu, Au, Ni, Fe, Cr, Mn or Pd is added as needed. The protective layer 32 is made of C or FCAC. These layers are formed by magnetron sputtering facility including an ultrahigh vacuum chamber, protective film formation facility and lubricant layer formation facility and the like. The perpendicular magnetic recording layer is formed by mixing appropriate oxide, carbide, nitride or boride of Ti, Nb, Zr, Cu, Si, Al or the like or the mixture thereof to a target material and adjusting film formation conditions, thus segregating a non-magnetic material of 0.5 to 2 nm in crystalline grain boundary, and thus controlling magnetic exchange interaction among crystalline grains. Arrows 37, 38 indicate upward and downward magnetization recorded in the perpendicular magnetic recording medium, respectively. Since the magnetic film has increased average anisotropic magnetic field of the magnetic film and so has a high coercive force, sufficient recording cannot be performed with magnetic field from a conventional main pole type magnetic head, and such a configuration is particularly suitable for narrow track magnetic recording.

The perpendicular magnetic recording layer is not limited to a two-layered structure, but may be single-layered structured, gradient composition film structured or multilayer-structured including three or more layers as long as it has a high coercive force. It may further include an intermediate layer between the layers as needed to control magnetic coupling. When the structure and magnetic characteristics of perpendicular magnetic recording are close to those of a single-layered medium, the resonant frequency of the magnetization and the oscillation frequency of the high-frequency magnetic field of the STO 40 are preferably not different so much. In the case of a multilayered structure, a damping constant α of the magnetic layer may be relatively made larger, whereby flexibility of energy absorption from the high-frequency magnetic field can be adjusted, and the oscillation frequency of the STO can be made lower.

At least one layer that is a non-magnetic layer for characteristics control may be provided between the soft magnetic under layer 35 and the substrate 36, and further at least one layer that is a non-magnetic intermediate layer for characteristics control made of Ru or the like as well as an intermediate layer made of a non-magnetic or magnetic member may be provided between the soft magnetic under layer 35 and the magnetic layer 34 to improve crystalline grain orientation, crystalline grain size and magnetic characteristics and the uniformity of the magnetic layers 34 and 33. The soft magnetic under layer 35 further may be two-layer structured via Ru or the like to improve the soft magnetic characteristics and the uniformity. Although FIG. 1 shows the example of the magnetic layers 33, 34 disposed on a single side of the substrate 36, they may be disposed on double sides of the non-magnetic substrate 36.

A servo pattern includes lots of long-period (low-frequency) patterns. Additionally, when a DC erasure area exists at a surrounding area of a servo signal, a DC signal component reproduced from these low-frequency patterns is influenced by a high pass filter made up of a coupling capacitor, thus greatly deforming a reproduction waveform in the perpendicular magnetic recording at the base line vertically (vertical base line shift). Then, in the present embodiment, AC demagnetization is performed at the area surrounding a servo signal by gradually moving a magnet away from the medium surface while rotating the perpendicular magnetic recording medium beforehand, so that such deformation due to the DC magnetization component from the surrounding area does not occur at least (zero magnetization state). In the present specification, the residual magnetization amount within ±25% is called zero magnetization as the effective amount of magnetization that can suppress the influences from the waveform distortion due to base line shift.

Figure 2:
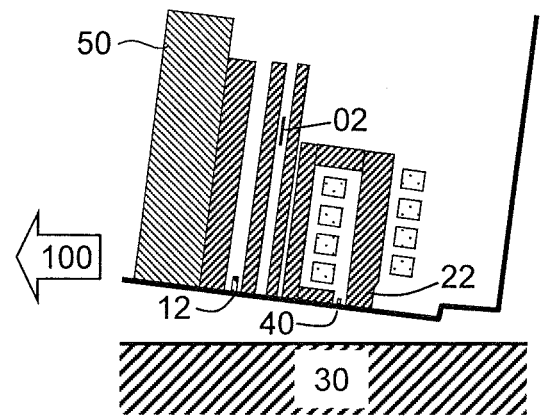
FIG. 2 is a schematic cross-sectional view of a magnetic head and a perpendicular magnetic recording medium in a magnetic storage device.
Figure 3:
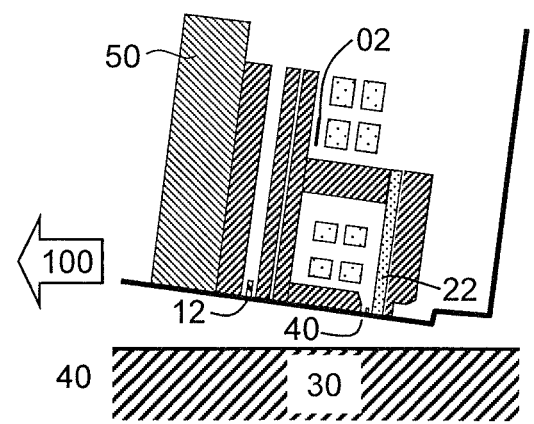
FIG. 3 is a schematic cross-sectional view of a magnetic head and a perpendicular magnetic recording medium in a magnetic storage device.
Figure 4:
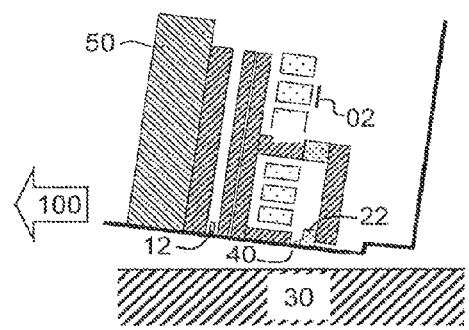
FIG. 4 is a schematic cross-sectional view of a magnetic head and a perpendicular magnetic recording medium in a magnetic storage device.

FIGS. 2 to 4 are schematic cross-sectional views of a magnetic head and a perpendicular magnetic recording medium of a magnetic storage device provided with a microwave assisted magnetic recording head of the present embodiment. The details are as follows:

(1) Structure of a Magnetic Storage Device Shown in FIG. 2
  slider 50: thin long femto type (1×0.7×0.2 mm)
  head protective film (FCAC): 1.8 nm
  sensor element 12: TMR ($T_{wr}$=30 nm)
  first recording magnetic pole 22: FeCoNi ($T_{ww}$=100 nm, 80 nm)
  STO: CoFeGe (10 nm)/Cu(2.5 nm)/Co/Ni(10 nm)
  FGL width: $W_{FGL}$=36 nm
  medium substrate: 3.5-inch NiP plated Al alloy substrate
  medium structure: lubricant film (1 nm)/C (2 nm)/CoCrPt (SiTi)$O_2$ (2 nm)/CoCrPtSi$O_2$C (10 nm)/Ru (10 nm)/CoFeTaZr (10 nm)/Ru(0.5 nm)/CoFeTaZr (10 nm)

(2) Structure of a Magnetic Storage Device Shown in FIG. 3
  slider 50: femto type (0.85×0.7×0.23 mm)
  head protective film (FCAC): 1.4 nm
  sensor element 12: CPP-GMR ($T_{wr}$=23 nm)
  first recording magnetic pole 22: CoFe($T_{ww}$=100 nm, 65 nm)
  STO: Co/Fe(11 nm)/Cu(3 nm)/Co/Ni(9 nm)
  FGL width: $W_{FGL}$=28 nm
  medium substrate: 2.5-inch glass substrate
  medium structure: lubricant layer (0.8 nm)/C (1.6 nm)/CoCrPt(SiTiNb)$O_2$C (11 nm)/Ru (10 nm)/CoFeTaZr (15 nm)/Ru (0.5 nm)/CoFeTaZr (15 nm)

(3) Structure of a Magnetic Storage Device Shown in FIG. 4
  slider 50: thin long femto type (1×0.7×0.2 mm)
  head protective film (FCAC): 1 nm
  sensor element 12: CPP-GMR ($T_{wr}$=16 nm)
  first recording magnetic pole 22: CoFe($T_{ww}$=100 nm, 50 nm)
  STO: Co/Fe (12 nm)/Cu (2 nm)/Ni/Co (8 nm)
  FGL width: $W_{FGL}$=20 nm
  medium substrate: 2.5-inch glass substrate
  medium structure: lubricant layer (0.6 nm)/C (1.1 nm)/CoCrPtFe(SiTi)$O_2$C (3 nm)/CoCrPtAuSi$O_2$C (7 nm)/Ru (10 nm)/CoFeTaZr (20 nm)/Ru (0.5 nm)/CoFeTaZr (20 nm)

As shown in the drawings, the magnetic head slider 50 is provided with a thermal expansion element (TFC) 02 including a W thin film with resistance of 100Ω for clearance control. Microwaves from the microwave assisted magnetic recording head of the present embodiment is circularly polarized on both sides of the FGL film and is linear polarized just thereunder, and has typical oscillation frequency of 10 to 35 GHz and typical microwave magnetic intensity is 500 Oe to 3 kOe.

(Null Servo Pattern in Present Embodiment)

Figure 5:
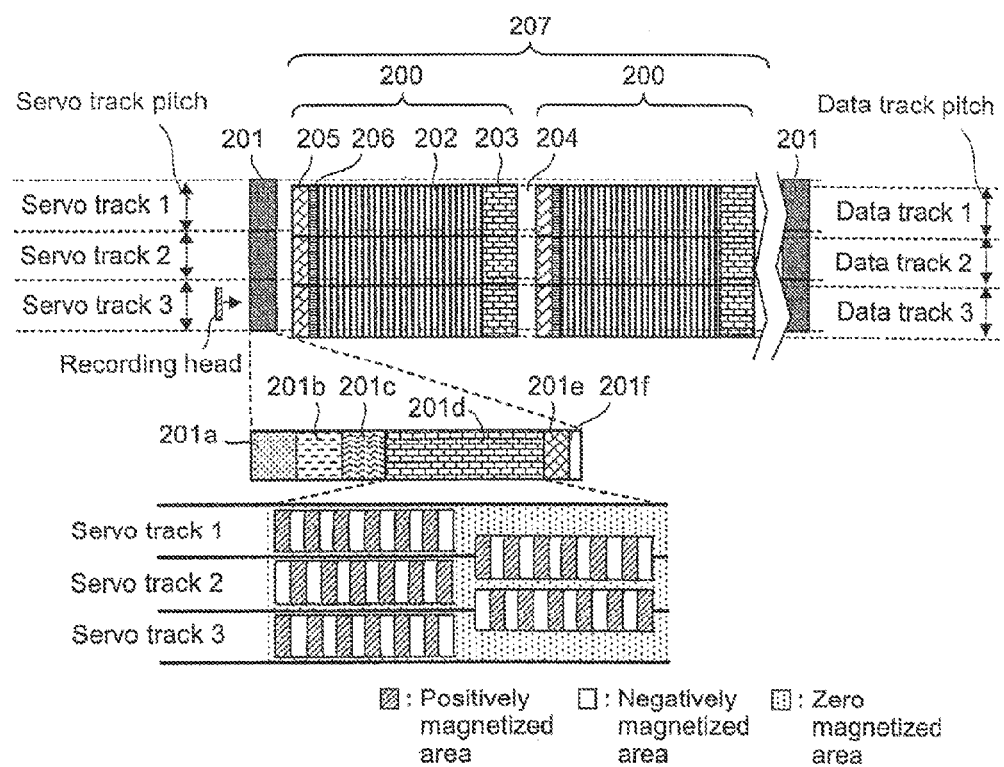
FIG. 5 is a conceptual diagram showing an exemplary structure of a servo track and a data track.

FIG. 5 is a schematic view of the structure of a servo track and a data track on the perpendicular magnetic recording medium of the present embodiment recorded by a magnetic recording/reproducing device equipped with a function of recording servo information or a servo track writer and using one microwave assisted magnetic recording head as stated above and one perpendicular magnetic recording medium, and an exemplary null servo pattern of the present embodiment.

Figure 43:
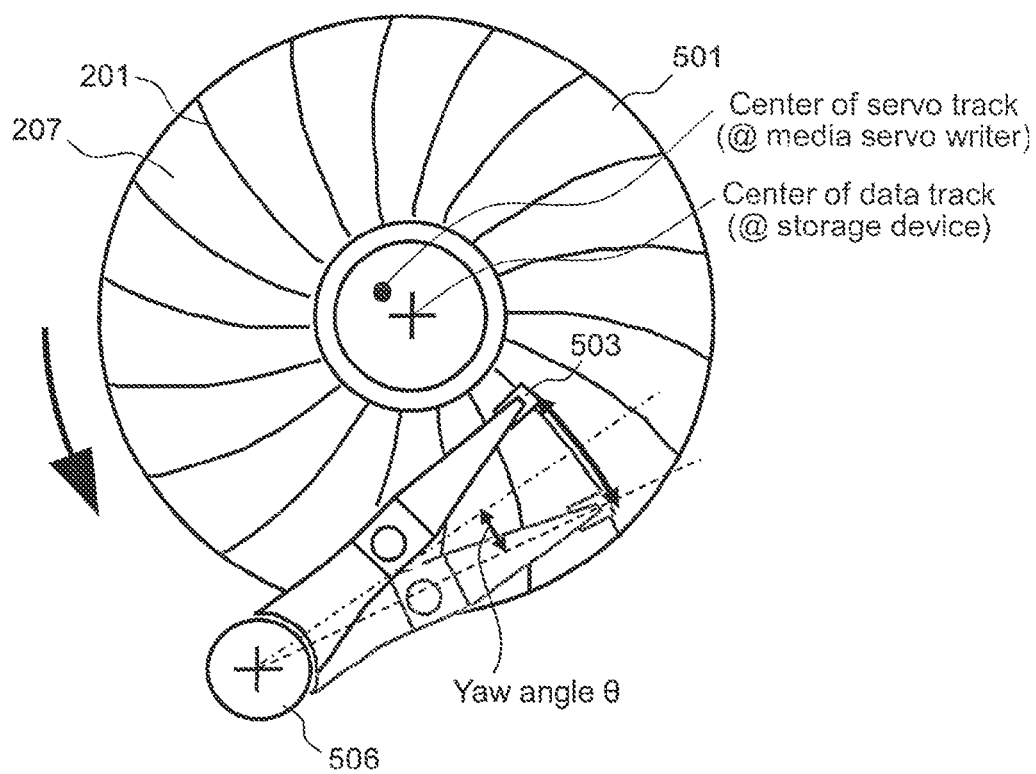
FIG. 43 is an example illustrating the center of servo track and the center of data track for reference.

In this drawing, white bits are negatively magnetized patterns with normalized magnetization of −1, and cross-hatched bits are positively magnetized patterns of +1. The base of the servo area is in a zero magnetization state. In the null servo pattern, the polarity reversal position agrees among all servo tracks, and a burst pattern having the center line at the center of a data track and a burst pattern of opposite phase having the centerline at a center (or boundary) of an adjacent data track are provided. The null servo pattern performs positioning utilizing the output becoming zero at the data track center (or boundary) with good linearity. The following describes an example of providing a servo burst pattern at the center and the boundary of a data track to improve linearity of positioning in the track. FIG. 43 is an example illustrating the center of servo track and the center of data track for reference.

A data track is made up of: a preamble servo part 201; a plurality of data sectors 200 including a data part 202 of 512 B (Bytes) or 4 kB (kilo Bytes); a parity, ECC and CRC part 203 and a data sector gap part 204; and a plurality of servo sectors 207 divided by a servo area including the preamble servo part. FIG. 5 shows the example for 512 B including a several data sectors in a servo sector, and in the case of 4 kB, they have a reversed relationship.

In the above, the preamble servo part 201 as the partition of servo sectors includes: a gain reference part 201a including a continuous pattern that is provided to reduce influences of variation of the magnetic characteristics and the floating amount of the magnetic recording head; a servo sector marker synchronization part 201b including a preamble part including a continuous pattern that gives a frequency of data clock for synchronization of data recording/reproducing and SAM (Servo Address Mark) unit indicating the leading of a servo signal and enabling recognition that the following signal is a servo signal; a gray code part 201c describing an index, a track number, a servo sector number of each track and the like, a servo burst (position burst) part 201d necessary for precise following to the center of each track; a post servo part 201e indicating correction data such as eccentricity correction amount of the servo sector; and a pad part 201f provided to absorb and compensate delay of a demodulating circuit system so as to keep clock generation during reproduction of a servo area by a servo demodulating circuit, for example. At the beginning of the data sector 200 mainly configuring data, a synchronization part 205 to adjust output, frequency and phase of the data part and a data address mark (DAM) part 206 indicating the beginning of the data part exist, which may be divided into the former half and the latter half across the servo part 201. In this case, at each of the divided former half and latter half, a synchronization part and a DAM part are provided.

The mark part and the track code part represent data 1 in the magnetization pattern of +1, −1 and data 0 in the magnetization pattern of −1, +1 (phase shift encoding). This is preferable because the total sum of the magnetization amount can be 0 irrespective of the appearance ratio between data 1 and 0. Each servo burst data is written at a constant frequency from the inner radius side to the outer radius side of the perpendicular magnetic recording medium without influences from zones. For improved format efficiency, the servo recording frequency may be increased at an outer radius part so as to shorten the servo bit length, or servo information may be written toward a middle radius part from an inner radius part and an outer radius part. Servo clock to write servo data and data clock to write data sector have different frequencies, and the frequency of the servo clock is about ⅕ of the highest frequency of the data clock at the innermost radius zone. In the present embodiment, examples of the magnetic disk devices of 1.8", 2.5" and 3.5" are examined, and servo frequencies of 75 to 400 MHz are examined.

(Servo Pattern and Recording Method Therefor)

Figure 6:
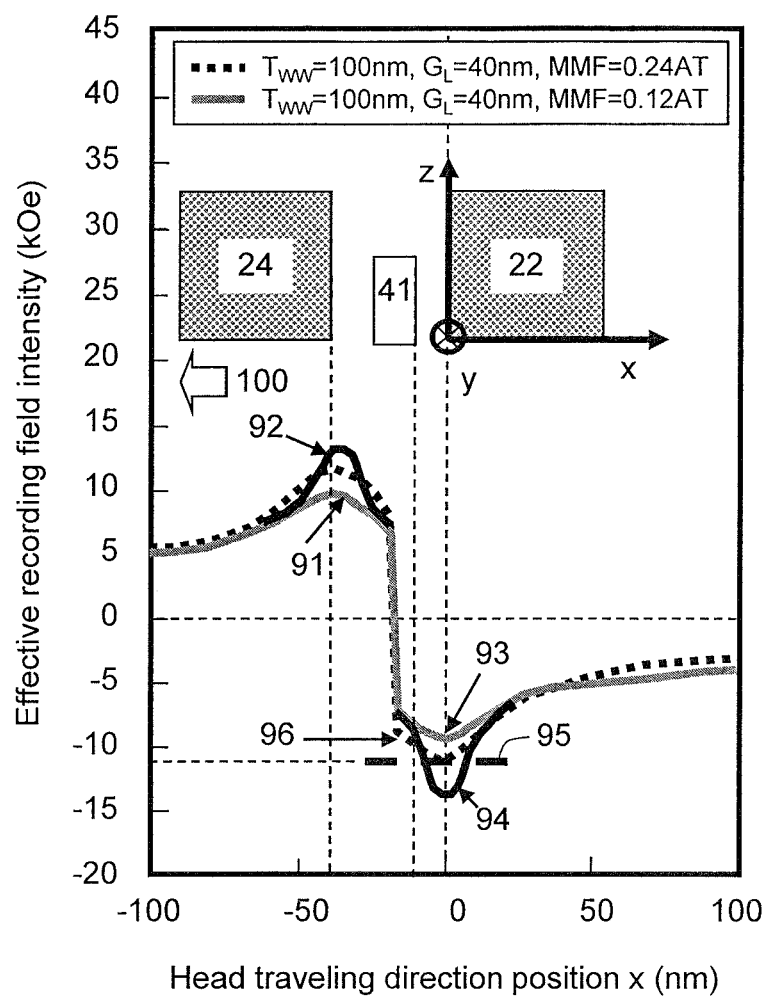
FIG. 6 shows the superimposition effect of effective recording magnetic field and effective high-frequency magnetic field during recording process.

Referring to FIG. 6, the following describes a method for recording a null servo pattern, using microwave assisted magnetic recording heads shown in FIGS. 2 to 4, on perpendicular magnetic recording media of these magnetic storage devices. FIG. 6 shows the superimposition effect of the effective recording magnetic field and the effective high-frequency magnetic field by the microwave assisted magnetic recording head of the present embodiment.

As shown with the calculation result of magnetic field in FIG. 6, intense recording magnetic field 93 is generated from the recording magnetic pole 22 of the microwave assisted magnetic recording head on the trailing side as bias magnetic field, and steep high-frequency magnetic field 94 is further applied from the FGL 41 in a superimposed manner thereto, thus finally generating total magnetic field exceeding switching magnetic field 95 of the perpendicular magnetic recording medium, whereby steep magnetic recording with less side writing is enabled on the perpendicular magnetic recording medium. Herein, the track width $T_{ww}$ of the ring shape magnetic core is 100 nm, the recording gap length $G_L$ is 40 nm, and the magnet-motive force (MMF) is 0.12 AT.

Figure 7:
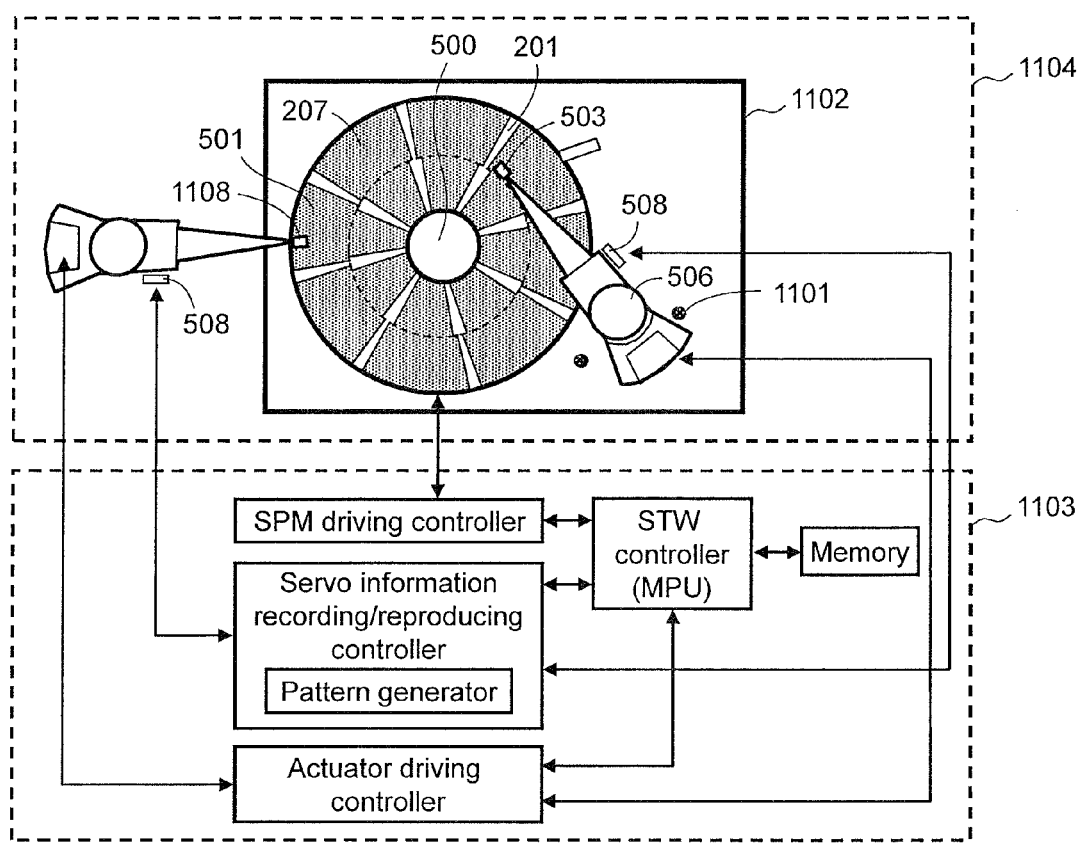
FIG. 7 is a conceptual diagram showing the structure of a servo track writer.

Based on this principle, a null servo pattern for positioning of continuous three tracks is recorded at a servo area 201 of a perpendicular magnetic recording medium using the servo track writer STW shown in FIG. 7. In this drawing, reference numeral 1102 denotes a Head Disk Assembly (HDA) and 1103 denotes a STW driving controller. The servo track writer is provided with a servo information recording/reproducing controller, and has a function of making a ring-shape microwave assisted magnetic recording head controlled by the servo information recording/reproducing controller record a null servo pattern. This internally writing process is described below, with reference to a flowchart of FIG. 8 and a timing chart of FIG. 13.

Firstly, a clock head 1108 records a clock pattern generated by the servo information recording/reproducing controller equipped with a clock pattern generator function on a clock pattern disk. Next, a rotary encoder coupled with an actuator 506 detects the position of the actuator, feeds back an error between the detected position and a target position to the actuator, and makes a magnetic head 503 follow the target position. This operation may be performed by driving the actuator by a push-pin. In this following operation, servo information generated by a pattern generator of the servo information recording/reproducing controller is recorded by the magnetic head 503 as described below in detail while synchronizing with a clock signal read from the clock pattern disk. Herein, an encoder may be directly coupled with a spindle 500 and a spindle motor driving the same to measure a rotational angle of a perpendicular magnetic recording medium 501. As stated above, a dedicated (external) servo track writer always compares the clock frequency and a frequency of the clock pattern signal, thus enabling precise control of the rotation of the spindle motor as well as precise recording of a servo pattern.

The servo information recording/reproducing controller (controller) of the servo track writer includes: a Microprocessor Unit (MPU) that instructs an operation for each zone of each microwave assisted magnetic recording head; a pattern generator that generates a pattern required for servo pattern formation in response to the input of a servo gate that instructs information recording; and a register that stores current waveforms and current values including an operation timing and overshoot for means that supplies preliminary current and recording signals and for STO driving control means, clearance control power and preliminary current and recording signals to a recording magnetic pole and their control parameters and operating timings. Values for zones may be provided only for a specific representative zone at inner, middle and outer radius parts, and approximation or interpolation may be performed as needed for other zones using a relational expression (polynomial equation) found beforehand by an experiment.

Figure 8:
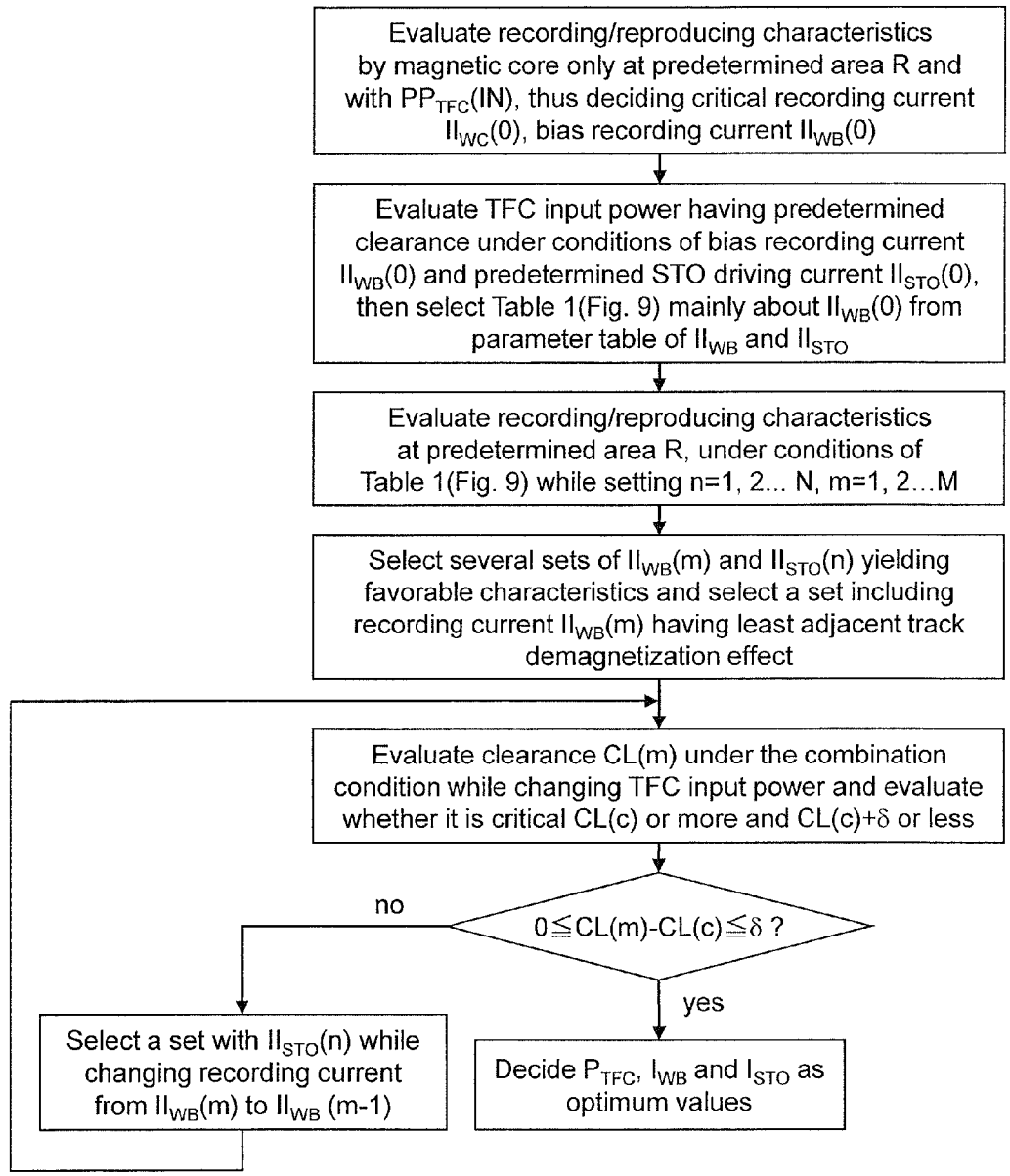
FIG. 8 shows an exemplary flowchart of setting parameters.

In the present embodiment, parameters are firstly adjusted as follows (FIG. 8).

(i) Using a microwave assisted magnetic recording head and a perpendicular magnetic recording medium satisfying specifications beforehand, recording/reproducing characteristics are evaluated at a predetermined area and with such clearance, thus finding recording current and STO driving current that can yield the most favorable characteristics for predetermined linear recording density. Then, a set of clearance (TFC input power), recording current and STO driving current to be examined is set as a parameter table as shown in FIG. 9, while considering variations of the characteristics, which are stored in a predetermined memory.

(ii) Critical recording current $II_{wc}(0)$ is found, which gives critical effective recording magnetic field 96 that is a lower limit enabling recording on a perpendicular magnetic recording medium with recording magnetic field only using a predetermined microwave assisted magnetic recording head $H_0$, with predetermined linear recording density, at a predetermined area R (e.g., a predetermined track at an innermost radius zone $Z_1$) and at TFC input power $PP_{TFC}(IN)$ (clearance CL(IN), and then bias recording current $II_{WB}(0)$ smaller than the critical recording current $II_{wc}(0)$ by a predetermined amount is set (in the present embodiment, 0.12 AT as magnet-motive force).

(iii) Clearance CL is evaluated while changing the TFC input power under the bias recording current $II_{WB}(0)$ and predetermined $II_{STO}(0)$, and then TFC input power $PP_{TFC}(0)$ that gives predetermined clearance CL capable of securing sufficient reliability is found.

(iv) In accordance with a parameter table ($II_{STO}$, $II_{WB}$) summarizing the range to be examined for each value of $PP_{TFC}(0)$, recording/reproducing characteristics are evaluated under the condition of $PP_{TFC}(0)$, with predetermined linear recording density and at a predetermined area R (predetermined recording track at zone $Z_1$) while setting n=1, 2, ..., N and m=1, 2, ... M.

(v) Some of the sets of $II_{WB}(m)$ and $II_{STO}(n)$ yielding favorable recording/reproducing characteristics are selected, and among them, some of the sets including recording current $II_{WB}(m)$ having the smallest adjacent track demagnetization effect, squeeze or the like are selected.

(vi) While TFC input power is changed under the above-mentioned combined conditions, clearance CL(m) under such a recording condition (TFC input power: $PP_{TFC}(m)$) is evaluated.

(vii) If CL(m, n) is the minimum clearance CL(c) or more, the CL(c) securing reliability that is determined beforehand by a reliability experiment, and CL(c)++δ or less, then the above-mentioned values of $PP_{TFC}(m)$, $II_{WB}(m)$, $II_{STO}(n)$ are set as optimum values $P_{TFC}(0,1)$, $I_{WB}(0, 1)$, $I_{STO}(0, 1)$ for the head $H_0$ and at the zone $Z_1$. On the other hand, if CL(m, n) is not within the range, (viii) is executed. Herein, δ is the amount of margin.

(viii) Reducing recording current from $II_{WB}(m)$ by one level, then clearance is evaluated again with the set of $II_{WB}$ (m−1) and $II_{STO}$ of (iv), and (vi) or later is executed again.

When recording servo information in the magnetic disk device, for example, and when head characteristics are measured at the inner radius part, the characteristics may be evaluated by rotary-driving a perpendicular magnetic disk while pressing the actuator against a crash stop 1101 (see FIGS. 7 and 19) disposed on the inner radius side of the device. The bias recording current is examined in the range of 5 to 60 mA, the STO driving current is examined in the range of 1 to 15 mA, and overshoot $II_{WOV}$ and $II_{SOV}$ are preferably provided for the bias recording current and the STO driving current, respectively, thus speeding-up their rising time for optimization of the above-stated characteristics. Herein, the above-mentioned optimization and setting of TFC profile are one of especially important steps for the servo information recording because a HGA incorporated into the magnetic storage device typically has different floating posture of the magnetic head, meaning that the position of the magnetic head adjacent to the magnetic recording medium changes slightly.

Figure 11:
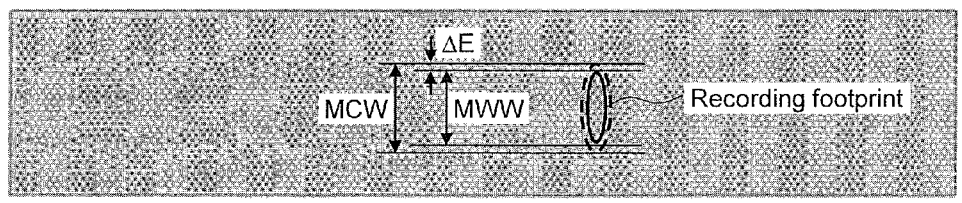
FIG. 11 shows recording footprint of a microwave assisted magnetic recording head as an example.
Figure 12:
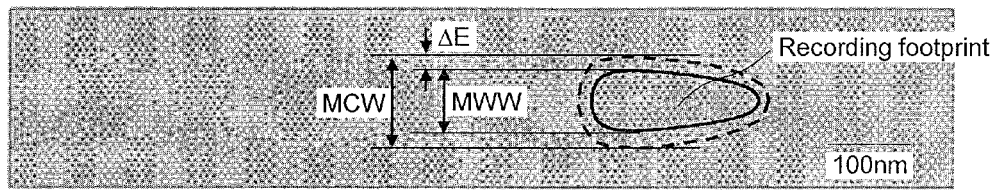
FIG. 12 shows recording footprint of a microwave assisted magnetic recording head as a comparative example.

The thus found optimum values $P_{TFC}(0,1)$, $I_{WB}(0,1)$ and $I_{STO}(0,1)$ for the TFC input power, the bias recording current and the STO driving current with the head $H_0$ and at the zone $Z_1$ are stored in a memory as a parameter control table (see FIG. 10), and necessary parameters may be set as needed at the register of a head driver. While driving a microwave assisted magnetic recording head using such data, a predetermined recording pattern is recorded at a predetermined servo track of the zone $Z_1$ at a predetermined frequency and under predetermined recording track environment for evaluation. That is, (a) a recording track width MWW (0,1) is found from a half-value width of full track profile recorded at the frequency of about 10 to 20% of the highest frequency, (b) MCW (0,1) (Magnetic Core Width) is found by recording a recording track while narrowing a track interval toward both adjacent tracks of the center recording track, evaluating the interval dependency (747 curve) of the off-track characteristics, and extrapolating of an adjacent track interval that is a limit where the off-track characteristics of the center recording track does not change, and (c) the recording track (signal intensity E(0,1)) recorded at the above-stated frequency is partially removed from both sides, thus creating a narrow track (called micro-track) having the signal intensity of 10 to 30%, and a reproduction track width MWR (0, 1) (Magnetic Write Width) is created from the half-value width thereof. Herein, (0,1) is an index indicating the optimum value with the head $H_0$ and at the zone $Z_1$. As shown in FIGS. 11 and 12, the effective track width MCW by STO includes side erasing width ΔE on both sides of the recording track width MWW.

As can be understood from the above description, MCW may be used as a track pitch originally. However, it is important for positioning to secure linearity of a servo signal with reference to position deviation. To this end, a servo pattern is typically recorded as dense as possible in the track width direction, and conventionally a servo track pitch has to be smaller than the MCW that is to be set as a data track pitch by about 15 to 20% so as to secure the linearity with the track density of 500 kTPI or more. A microwave assisted magnetic recording head of the present embodiment can reduce side writing and side erasing to a fraction of the conventional one, and so sufficient linearity can be secured for the positional controllability of a servo signal without recording a pattern as dense as conventional techniques. Thus, in the present embodiment, a servo track pitch is determined using the following equations (1a) and (1b) for the microwave assisted magnetic head Hi and the zone Zj, i.e., for each index (i,j):

$$TP=MCW/0.95 \quad (1a);$$

and $$TP=MCW-(MWW-MRW)/2+const \quad (1b).$$

In the above equation, "const" is determined based on adjacent track interference (ATI) characteristics and margin in a squeeze experiment conducted beforehand. The above parameters may be evaluated for each magnetic head beforehand to select the magnetic head, and such values may be used, whereby the above process can be omitted or can be shortened.

FIG. 11 shows recording footprint of a ring-shape microwave assisted magnetic recording head of the present embodiment (narrow and thin footprint), and FIG. 12 shows recording footprint of a conventional main-pole/shield type microwave assisted magnetic recording head (wide and thick footprint). Both of the drawings show results of LLG simulation. In the combination with the ring-shape microwave assisted magnetic recording head, recording is performed by not the thick main pole of about 200 nm as shown in FIG. 12 but the FGL of about 20 nm that is one digit thinner as shown in FIG. 11, and so the amount of side easing and fringe reduces up to about ⅓ of the main-pole/shield type microwave assisted magnetic recording head even at the inner radius and the outer radius parts having large yaw angles of ±10 to 15°, and a different from the middle radius part can be substantially ignored with consideration given to the positioning accuracy of the mechanism. As a result, the above $TP_{op}(i, j)$ can be substantially equal to a single servo track pitch $TP_{op}(0,1)$ that is determined based on an appropriate track pitch calculation equation including a predetermined margin, which is found beforehand by experiments from the relationships between the above MWW(0,) MCW(0,1), MRW(0,1) and MWW, MCW, MRW at the inner radius, the middle radius and the outer radius parts. That is, evaluation at the zone $Z_1$ only enables setting of a common servo track pitch $TP_{op}$ that is applicable to all magnetic heads and zones, thus greatly shortening the servo duration.

Figure 13:
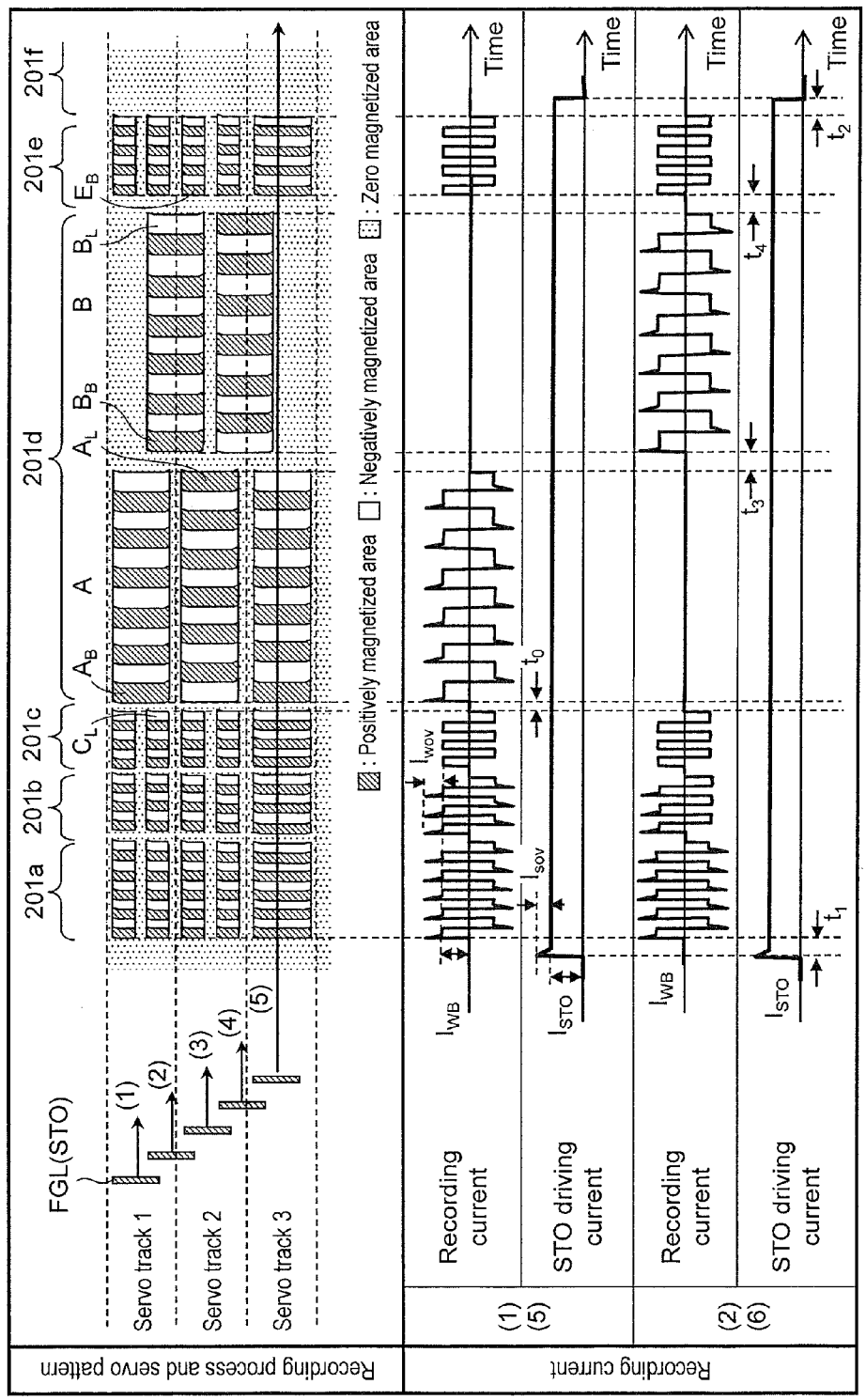
FIG. 13 shows an exemplary servo pattern and a timing chart for recording process thereof.

Referring to a timing chart, the following describes process to record a servo pattern at the above zone using the above-stated parameters, with the track pitch $TP_{op}$ determined by the above-stated method, using a microwave assisted magnetic recording head and based on a servo gate signal, where the servo pattern is recorded at a predetermined frequency $F_0$ on a servo track toward the right side of FIG. 13. The perpendicular magnetic disk is demagnetized beforehand.

In servo track recording step (1), bits of a servo track of the perpendicular magnetic recording medium is recorded in a continuous magnetization state as in the magnetization state of track 3 recorded at step (5). That is, in the servo track recording step (1), STO driving current $I_{STO}$ is firstly applied predetermined duration $t_1$ before a predetermined timing of preamble recording based on the servo gate signal. Then, at the predetermined timing (after $t_1$), bias recording current at a predetermined frequency is applied to a ring shape magnetic core of the microwave assisted magnetic recording head for recording at a preamble part 201a, a servo sector marker synchronization part 201b and a gray code part and 201c. At the timing of 0.1 to 0.3 ns after the application of the bias recording current, magnetization of the magnetic core is reversed, and 0.1 to 0.3 ns afterwards magnetization of the spin supply layer is reversed, then magnetization of the FGL is rotated, and 0.1 to 0.2 ns afterwards the rotation (oscillation) becomes stable. In this way, at least about 0.3 to 0.8 ns earlier than the stable oscillation, current $I_{STO}$ has to be applied. Since the present embodiment uses the circuit of 20 ns as the rising time of the STO driving current, $t_1$ is set by adding 1 ns to this time as the stabilization time. Subsequently, $t_0$ afterwards, recording is started from $A_B$ part, and a servo burst pattern 201*d* of A is recorded. Next, after a predetermined delay time $t_3$, a recording time of servo burst B and a delay time $t_4$, a post servo part 201*e* is recorded.

The delay time $t_0$, $t_3$ and $t_4$ are decided as follows. A servo burst pattern is slightly distorted in the recording magnetization state like a half-moon shape (FIG. 13), and the phase is very slightly delayed at the peripheral part. Then, an effective phase delay time thereof is found separately, and the delay time $t_0$ is decided with consideration given to the amount of this effective phase delay time so that the end bit $C_L$ of the gray code part 201*c* does not demagnetize the first bit $A_B$ of the servo burst part 201*d* recorded at step (1) when the gray code part 201*c* is recorded at step (2). Then, $t_3$ is selected so that the B burst leading bit $B_B$ recorded at step (2) is not demagnetized when bit $A_L$ at the end of A burst pattern at the servo burst part 201*d* is recorded at step (3). Then $t_4$ is selected so that $B_L$ recorded at step (2) is not substantially demagnetized when leading bit $E_B$ of the post servo part 201*e* is recorded at step (3).

In the present embodiment, $t_0$ may be time required to record 1 bit of preamble, and $t_3$ and $t_4$ may be time required to 1 bit of servo burst, and sufficiently high-quality servo information is recorded. They are preferably reevaluated and tuned with a predetermined program for each medium as needed. Standard values of these values are found beforehand by an experiment, and are stored in a parameter table, which are then stored in the register of the servo information recording/reproducing controller (see FIG. 7, FIG. 19) as needed during recording and are used during servo information recording.

Based on the servo gate signal, immediately after the completion of recording at the post server part 201*e*, the bias current is turned off to stop the recording, and finally after predetermined delay time $t_2$, the STO driving current is turned off. Herein, $t_2$ may be 0 ns or longer, and in the present embodiment $t_2$ is 1 n. However, $t_2$ of about 200 ns or longer may cause malfunction of STO due to leak magnetic field from the outside and so erroneous recording, and $t_2$ less than 200 ns is preferable.

A two-dimensional state of the servo pattern may be observed by taking out a disk and placing the disk on a spin stand for evaluation in combination with a microwave assisted magnetic recording head. As a result of such an observation, the servo burst pattern of a track 1 recorded by the above steps is recorded in a magnetization state including continuous bits. As shown in FIG. 13, the bias current has a frequency of $F_0/2$ during servo burst recording and otherwise of $F_0$.

As shown in FIG. 13, for stable driving of the STO, the STO driving current $I_{STO}$ includes overshoot current $I_{SOV}$ of the magnitude of 10 to 50% of the base part at the beginning of the recording. At the recording parts 201*a*, 201*b* to start the recording of servo information, overshoot current $I_{WOV}$ of the magnitude of 10 to 100% of the bias part $I_{WB}$ of the recording current is provided in addition to the bias part $I_{WB}$, thus accelerating and stabilizing STO oscillation, and similarly at the burst part 201*d*, overshoot current is set so that the intensity and the phase of the recording magnetization become equal to those of the thus recorded gain reference part 201*a* and the preamble part 201*b*. Thereby, the servo signal output and the phase are stabilized by several points. Since control of the phase is especially important for the null burst pattern of the present embodiment, it is preferable to record the preamble part 201*b* and the null burst part 201*d* with the same current waveforms, and adjustment to an optimum phase (phase compensation) is effectively made as needed by write pre-compensation during recording at 201*d* for improved positioning precision during manufacturing and testing process.

After recording the servo information while rotating once, the microwave assisted magnetic recording head is moved in the track width direction by a half of the track pitch $TP_{op}$ at the servo write step (2). Then, predetermined time $t_1$ before a predetermined timing of recording at 201*a* part, the STO driving current $I_{STO}$ is applied firstly, and then after the delay time $t_1$, the bias recording current of the same phase as the recording at 201*a* part one round before is applied to the ring shape magnetic core of the microwave assisted magnetic recording head so as to record 201*a* to *c* patterns while overwriting a lower half of the 201*a* to *c* pattern recorded on round before. Thereafter, the application of the bias current is turned off until the recording of the servo burst pattern B at the servo burst part 201*d*, i.e., for $t_0$, the servo burst pattern A recording time and $t_3$. Then, predetermined bias recording current is applied to the ring shape magnetic core to record the B burst pattern, and then the bias recording current is turned off, and after delay time $t_4$, bias recording current $I_{WB}$ is applied again to the ring shape magnetic core to record the post servo part 201*e*. Then, the application of current is finished. At the servo sector gap part 201*f*, after predetermined time $t_2$, the STO driving current also is turned off.

Similarly, every time the magnetic disk rotates, the recording head is moved in the track width direction by a half of the track pitch $TP_{op}$, and the servo information is recorded at the steps (3), (4), (5) . . . , whereby tracks 1, 2, 3 . . . are recorded sequentially. In this example, at step (3), the application of the bias recording current $I_{WB}$ is delayed by one bit at A burst pattern position, and then B burst pattern is recorded.

When recording of the servo information progresses to a different zone, an optimum TFC input power value $P_{TFC}(0, j)$, an optimum bias recording current value $I_{WB}(0, j)$ and an optimum STO driving current value $I_{STO}(0, j)$ are estimated using a conversion equation found by an experiment beforehand from the values of the innermost radius zone $Z_1$, and then servo information is recorded using these values on the entire radius of the perpendicular magnetic recording medium by the same process as above. Evaluations may be performed at a typical zone of the inner radius, the middle radius and the outer radius, and parameters of other zones may be set by approximation using a conversion equation such as a fourth-order equation, whereby more favorable characteristics can be obtained.

In this way, recording at the ISG part and the SAM part can be a continuous pattern in the track width direction other than the separation due to side writing, and as shown in FIG. 13, the entire pattern can be recorded so that the total sum of the negative and positive magnetization becomes 0. Although FIG. 13 shows the magnetization state of the preamble servo part 201 in a simple manner, the SAM part includes 9 to 16 cycles, the ISG part includes 15 to 60 cycles, the gray code part 201*c* includes 7 to 33 cycles, the servo burst part 201*d* includes 24 to 72 cycles, and the post servo par 201*e* (RRO (Repeatable Run-out) field part) includes 20 to 36 cycles. The number of servo sectors is 260 to 520 for 2.5", 320 to 540 for 3.5", and 440 to 660 for server use. The servo frequency $F_0$ is 75 to 150 MHz for 2.5", 160 to 320 MHz for 3.5" and 220 to 330 MHz for server use.

Figure 19:
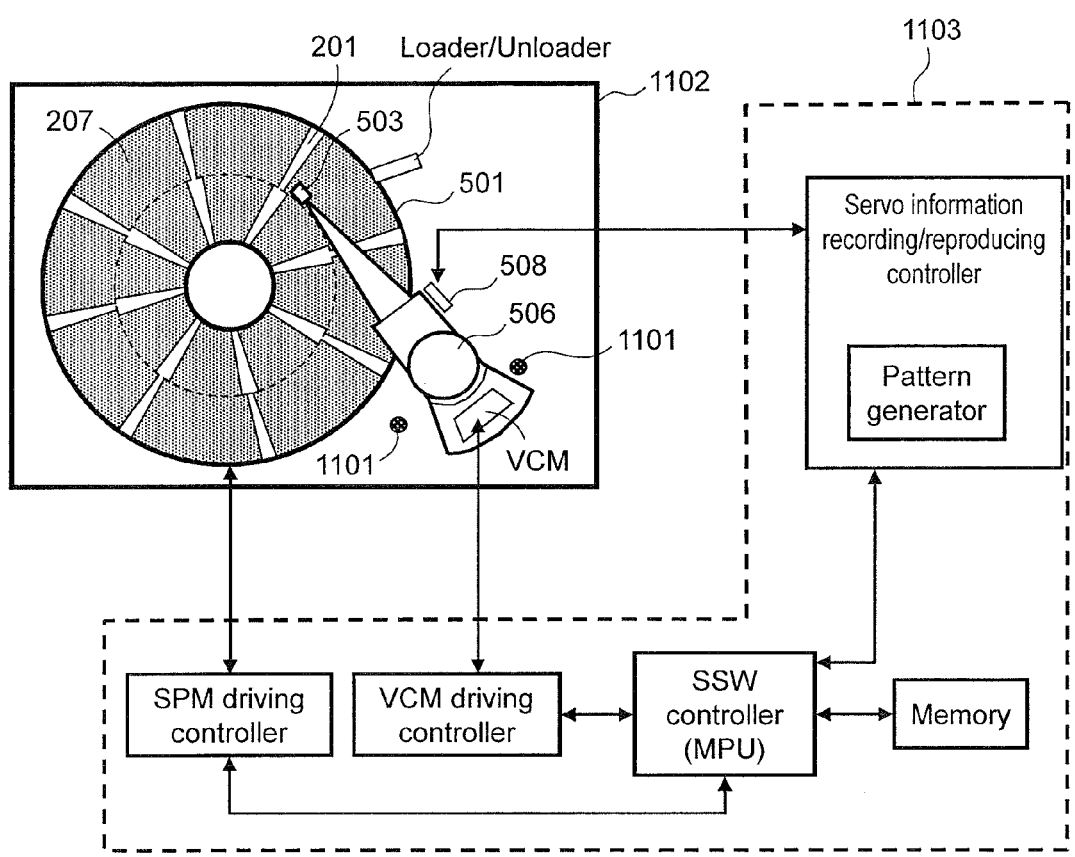
FIG. 19 shows an exemplary self-servo track writer.

As schematically shown in the servo area 201 of FIGS. 7 and 19, different servo frequencies may be set for the outer radius area and the inner radius area so that the servo frequency is about 1.4 times higher in the outer radius area. Such a configuration is preferable because the servo area on the outer radius side can be shortened, and so the usage efficiency can be increased. A correction value of Repeatable Run-Out (RRO) of the servo sector may be compressed and recorded in a semiconductor, and an ID of the gray code part may be recorded in a distributed manner in the tracks for improved servo usage efficiency.

Figure 14:
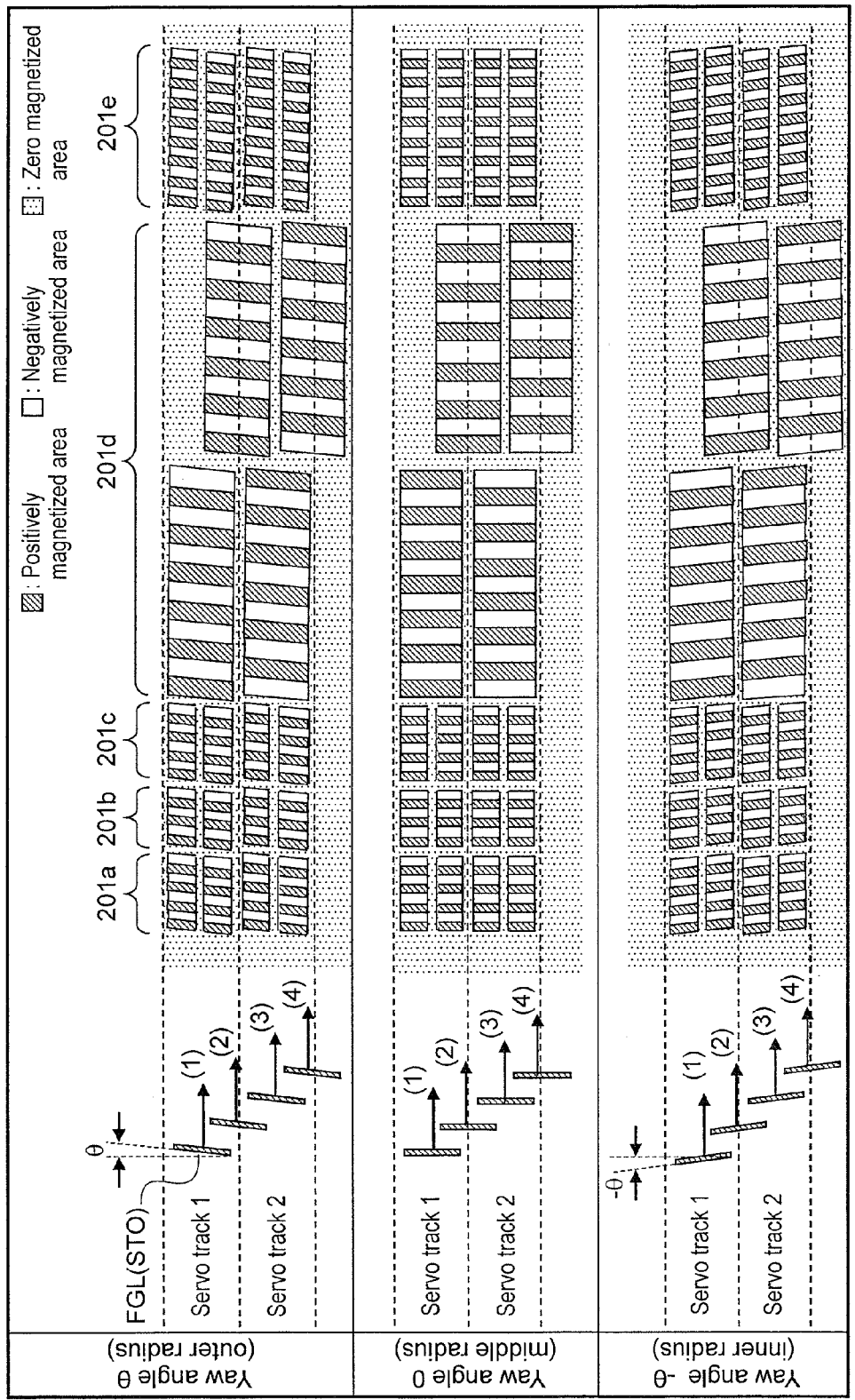
FIG. 14 schematically shows magnetizations state at a servo area on inner radius, middle radius and outer radius.

Since the FGL has recording magnetic field including side recording/erasing of 1 to 2 nm, magnetization patterns at the parts $201a$ to $201c$ and the part $201e$ are separated in the servo track to be seamed patterns. On the other hand, the servo burst pattern is not separated and becomes a seamless pattern because overwriting is not performed to both of the burst patterns A and B recorded at the previous step. Especially according to the microwave assisted magnetic recording head and the servo recording of the present embodiment, even when the application of current is finished after the recording of the final bit, footprint of the recording is a size that can be substantially ignored. Further in the case of azimuth recording in a yaw angle, the fringe effect can be substantially ignored. As such, as in FIG. 14 schematically showing the magnetization state of the servo area at the inner radius, the middle radius and the outer radius, the servo track pitch $TP_{op}$ can be set substantially equal to the MCW, and at any area, the servo burst pattern can be arranged effectively, thus achieving high format efficiency.

With these steps, the total sum of positive (+) and negative (−) magnetization at the servo part 201 becomes substantially zero, the recording bits at the servo burst part $201d$ are not separated and do not include a residual part of recording footprint left at the end part, and the servo burst pattern can be recorded at a pitch interval $TP_{op}$ substantially equal to MCW all over the entire radius of the magnetic recording medium.

As described above for the equations (1a) and (1b), in order to secure the linearity of positioning, the servo track pitch is set smaller than the data track pitch substantially corresponding to MCW by about 5%. Thus, track density and linear recording density BPI of the data track has to be readjusted in the manufacturing and the test process for the track density of the servo track in order to achieve the required device capacity and areal recording density (TPI×BPI).

For the magnetic storage device of the present embodiment, firstly, the values of TPI are divided into 10 to 20 levels with consideration given to manufacturing variations of the track width of the magnetic head and the TPI and in the range capable of covering the variations while reflecting the variations. Then, for each TPI, an error rate is evaluated while changing the linear recording density beforehand, and with consideration given to a transfer rate having an increasing tendency toward the outer radius side, an appropriate set of BPI profiles for each zone with lower BPIs toward the outer radius side is found beforehand by an experiment so that the error rate can be substantially uniform over the entire zone. Herein, a RS (Reed-Solomon) channel is used as a signal processing circuit, based on RS codes enabling measurement of an error rate before error correction. Then, recording of tracks is performed with the BPI profile during the manufacturing process, and adjacent interference characteristics, squeeze characteristics and the like are evaluated, thus deciding an optimum BPI profile and a data track pitch thereof, i.e., TPI of the data track. High-density recording signals to be recorded on a data track is 5 to 10 times the BPI of the servo track information, and according to the microwave assisted magnetic recording head of the present embodiment, side erasing and side writing are small, and MCW of the high-density recording signals is smaller than MCW of equation (1a) used to decide the servo track. This means that a data track pitch to achieve the required device capacity for the servo pattern of the present embodiment can be 3% or less of the servo track pitch, and additionally a linear recording density profile with less variations of the error rate among zones can be decided.

According to the magnetic storage device of the present embodiment, recording/reproducing is performed as follows based on the above-stated servo track profile. The following describes a method for creating a head position signal from the servo pattern recorded at the servo area 201, by way of an example of reproducing of the track 2 shown in FIG. 5 in the direction of the arrow from left to right.

At the servo sector marker synchronization part $201b$, a servo demodulating circuit turns auto gain control (AGC) ON to reproduce the ISG part, and at the time of detection of the SAM part, turns the AGC OFF to standardize the reproduction amplitude of the following signal at the amplitude of the ISG part so as to reduce influences of unevenness of the magnetic characteristics and the floating amount of the recording films of the magnetic disk. Then, information such as a servo sector number and a track number is read from the gray code part $201c$ describing such information, and then the center position of each track is precisely followed using information of the pattern burst part $201d$ to obtain a precise position in the radius direction. As shown in FIG. 13, this pattern is configured so that a reproduction signal becomes zero at the boundary (center line) position of the edge in the track direction of B burst, and, when deviating from the center line position, a signal strength changes to positive and negative in proportion to the deviation amount, and so this configuration enables the magnetic head to be located at the center part of each data track. In the case of the presence of eccentricity, however, such eccentricity of the servo sector is corrected, for example, using RRO correction data of the post servo part $201e$. The pad part 204 absorbs and compensates delay of the demodulating circuit, thus allowing clock generation to be maintained during reproduction of the servo area 201 by the servo modulation circuit. In the servo patterns of Embodiments 2 to 9 described below as well, a positioning mechanism to drive a magnetic head is controlled while setting the position with the position signal becoming 0 as a target of following.

(Advantageous Effects)

Since the perpendicular magnetic recording medium is demagnetized beforehand and all of the patterns are such that their total sum of magnetization becomes zero, the baseline of the reproduction waveforms can be made approximately zero, a DC signal component, generating a large bias magnetic field to a reproduction element, can be suppressed, non-linear transition shift during recording of a servo pattern due to shift of an oscillation frequency of a microwave assisted element due to intense bias magnetic field can be suppressed, or jitter noise due to easy/hard shifts can be suppressed, and so phase controllability can be increased. Since the null burst pattern of the present embodiment has a less area where the burst pattern is not recorded, the total sum of magnetization of positive (+) and negative (−) at the servo part 201 is substantially zero even when the perpendicular magnetic recording medium is not demagnetized, and the baseline of the reproduction waveforms also becomes approximately zero. As a result, any problem for positioning is not found, and the configuration examples of FIGS. 2, 3 and 4 including one perpendicular magnetic recording medium and one magnetic head can achieve the servo track densities of 600 kTPI, 770 kTPI and 1,000 kTPI, respectively.

The seamless servo burst pattern of the present embodiment further can achieve S/N higher by about 5 dB and phase margin and signal quality more excellent by 10% than those of a conventional recording method that divides a servo burst pattern. The servo pattern has a very large bit length, and so has poor usage efficiency of the area. For this reason, an area ratio of a data part, called format efficiency, indicating how effectively the entire area of the magnetic disk is used is approximately 90%. The present embodiment enables recording of a servo burst pattern without recording footprint, and so the format efficiency can be increased by 0.5 to 1 point.

Under the actual usage environment, a data track profile of a magnet head has to be decided based on conversion equations from optimum data track profiles at the inner radius, the middle radius and the outer radius, linear recording density and a servo track profile. Conventional perpendicular magnetic recording has to use a fifth to seventh-order conversion equation as this conversion equation due to large recording footprint and such fringe effect, meaning a large calculation load. On the other hand, the present embodiment can use a simplified reference curve of a first-order equation to a third-order equation, and so high positioning precision and positioning speeding-up can be achieved. Especially the magnetic storage device that can be adjusted easily as in the present embodiment having one magnetic head has high positioning linearity of a servo pattern and a small difference between the servo pitch and the data pitch of 3% only, and so the value of MCW of a magnetic head, which is evaluated while considering influences of the adjacent interferences using data during mass production or the like, can be used as $TP_{op}$ instead of the equation (1a), whereby manufacturing yields of the device of 80% or higher can be achieved for agreement of the servo pitch and the data pitch of FIG. 5 over the entire perimeter of the magnetic recording medium and for making the servo track and the data track identical. Thereby, time for manufacturing test can be shortened by 10 to 20%, which is especially preferable.

Additionally due to high signal quality of the servo pattern of the present embodiment, the maximum bit-length of the servo pattern can be reduced by 20%. Thereby, not only format efficiency but also overwrite performance to a magnetic recording medium can be further improved. This means alleviation of thermal demagnetization of a low-density bit specific to perpendicular magnetic recording by about 10%, and so a reliable perpendicular magnetic recording medium and such a magnetic storage medium can be provided.

Embodiment 2

Embodiment 1 describes an example including one perpendicular magnetic recording medium and one head. The present embodiment describes an example including at least one perpendicular magnetic recording medium and a plurality of (m+1) microwave assisted magnetic recording heads mounted to one actuator.

(Magnetic Storage Device)

Figure 15:
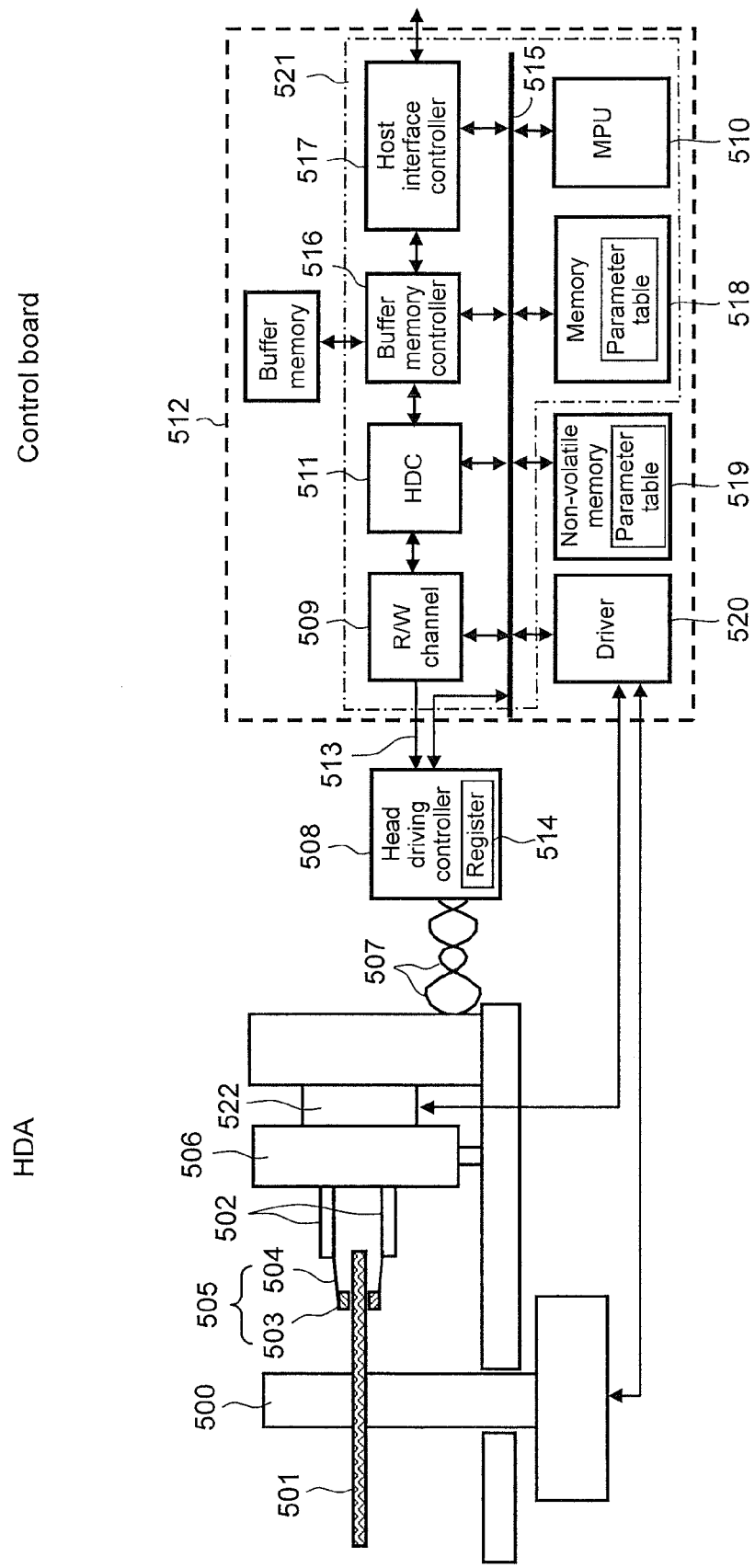
FIG. 15 is a conceptual diagram of a magnetic storage device.

FIG. 15 schematically shows a magnetic storage device as an embodiment including a microwave assisted magnetic recording head shown in FIG. 1 and FIG. 4 and a perpendicular magnetic recording medium having a servo pattern of the present embodiment. Although FIG. 15 shows an example of one perpendicular magnetic recording medium and two magnetic heads, obviously other number of the medium and the magnetic heads may be applied.

The magnetic storage device includes: a spindle motor 500; a perpendicular magnetic recording medium 501 recording a servo pattern of the present embodiment thereon; a high-rigidity arm 502; a HGA (this may be simply called a magnetic head) 505; an actuator 506; a head driving controller (R/W-IC) 508; a R/W channel 509; a microprocessor (MPU) 510; a disk controller (HDC) 511; a buffer memory controller 516 that controls a buffer memory; a host interface controller 517; a memory 518 including a RAM or the like to store a control program and control data; a non-volatile memory 519 such as a flash memory, a FROM or the like to store a control program; a driver 520 including a VCM (Voice Coil Motor) driver, a spindle motor driver, a temperature sensor and the like; a bus 515 of the MPU and the like.

The HGA 505 includes a magnetic head slider 503 including a STO, a recording/reproducing element, a TFC and the like, and a high-rigidity suspension 504. The head driving controller 508 has a STO driving control function to generate a driving signal (driving current signal or driving voltage signal) to drive the STO, and includes a recording amplifier and a reproducing amplifier. The R/W channel 509 functions as a recording modulation unit and a RS channel using Reed-Solomon codes as one kind of forward-direction error-correcting code, or a signal processing, reproducing modulation part such as a non-RS channel using the newest LDPC (low density parity check) code.

The HGA 505 is connected to the head driving controller 508 via a signal line, and selects one of the magnetic heads in response to a head selector signal based on a recording instruction or a reproducing instruction from a host (not illustrated) as a higher-level device for recording and reproducing. The R/W channel 509, the MPU 510, the HDC 511, the buffer memory controller 516, the host interface controller 517 and the memory 518 are configured as one LSI (SoC: System on Chip) 512. The LSI 512 includes a control plate with the LSI, a driver, a non-volatile memory and the like mounted thereon. If needed, the high-rigidity suspension and the high-rigidity arm may be made of a vibration-absorbing and suppressing body, to which a damper may be attached for further vibration suppression. The high-rigidity suspension 504 and the slider 503 may be preferably provided with a micro-position movement adjustment mechanism (dual actuator, micro-stage actuator) including a piezoelectric element, an electromagnetic element, a thermal deformation element or the like, because it enables high-speed and high-precision positioning for high-track density.

The MPU 510 is a main controller of the magnetic storage device, and performs servo control required for recording/reproducing operations and positioning of the magnetic heads. For instance, the MPU sets parameters required for such an operation at a register 514 included in the head driving controller 508. Each register, as described later, includes parameters set independently and as needed, the parameters including a predetermined temperature, a clearance control value for each perpendicular magnetic recording medium area (TFC input power value), a STO driving current value, a preliminary current value, a recording current value, their overshoot values, timings, time constants for environmental change and the like.

The R/W channel 509 is a signal processing circuit. The R/W channel 509 outputs a signal 513 obtained by encoding recording information transferred from the disk controller 511 to the head driving controller 508 during information recording, and outputs a reproduction information, which is a reproduction signal output from the magnetic head 505, is amplified by the head driving controller 508 and then is decoded, to the HDC 511 during information reproduction.

The HDC 511 configures an interface between the magnetic storage device and a higher-level host system (not illustrated), and outputs a write gate (recording timing) to instruct the starting of information recording of the signal data 513 on the perpendicular magnetic recording medium to the R/W channel 509, thereby performing transfer control of recording/reproducing information, conversion of data format, and ECC (Error Check and Correction) processing.

The head driving controller 508 is a driving integrated circuit that, in response to the input of a write gate, generates at least one type of recording signal (recording current) at least corresponding to the recording data supplied from the R/W channel 509 and corresponding to recording data 513 and supplies the recording signal together with a STO driving signal with a controlled current-application timing to the magnetic head. The head driving controller 508 includes at least a ring-shape head driving circuit, a ring-shape head driving current supplying circuit, a STO driving current application timing delay circuit, a STO driving current supplying circuit, a STO driving circuit and the like, and has a register including values set by the MPU, such as a recording current value, a STO driving current value, a TFC input power value and an operation timing. Each register value can be changed for each condition such as an area of the perpendicular magnetic recording medium, environment temperature, pressure or the like. The head driving controller 508 preferably functions to supply bias recording current to the magnetic heads and start a recording operation at timing of the write gate output from the HDC in response to a direct instruction from the MPU as an interface with the host system, the MPU controlling recording/reproducing operation (transfer of recording/reproducing data) and controlling positioning servo of the magnetic heads as a main controller of the magnetic storage device. In this way, the head driving controller of the present embodiment can freely set operation timing of means that supplies preliminary current and recording signals and STO driving control means in response to the input from the MPU instructing an operation of the magnetic storage device and the input of a write gate instructing information recording, their current waveforms and current values, clearance control power and preliminary current and recording current to the recording magnetic pole.

The following describes the outline of a recording/reproducing operation of the magnetic storage device of the present embodiment. In accordance with an instruction to recording/reproducing information from a host or higher-level system such as a PC, and under the control of the MPU 510 as a main controller of the magnetic storage device, the perpendicular magnetic recording medium 501 is rotated by the spindle motor 500 at a predetermined number of revolutions. Then, a reproduction element detects a position on the medium using a signal from servo information recorded on the perpendicular magnetic recording medium recorded beforehand during manufacturing process of the magnetic storage device, and the high-rigidity actuator 506 moves and controls the magnetic head HGA 505 via the high-rigidity arm 502 by a VCM 522 driven by a motor driver of the driver 520, whereby a magnetic head moves (seek operation) to a predetermined data track of the perpendicular magnetic recording medium 501 rapidly and precisely for stable following operation of the magnetic head at that position. Then, on that track, information is recorded/reproduced in accordance with a firmware program of the MPU.

For information recording, the host interface controller 517 receives a recording instruction from the host and recording data. Then, the MPU decodes the recording instruction, and stores the received data to the buffer memory 516 if needed, and then the HDC converts the same into a predetermined data format and adds ECC code through ECC processing. Then, the recording modulation system of the R/W channel 509 performs scrambling, RLL code conversion and recording compensation (write pre-compensation), and the HDC outputs a write gate to the R/W channel 509 to instruct start (recording timing) of data recording to write the recording data 513 on the perpendicular magnetic recording medium. In response to the input of this write gate, a recording signal (recording current) corresponding to the recording data 513 supplied from the R/W channel 509 is generated, and a driving signal, together with a STO driving signal with the current-application timing controlled, is supplied to the recording head of the magnetic head 503 via FPC wiring 507, whereby recording is performed by microwave assisted magnetic recording at a predetermined data track on the perpendicular magnetic recording medium.

For information reproducing, the host interface controller 517 receives a reproduction instruction from the host. Then, the magnetic head 503 selected and positioned similarly to the recording reads magnetization information recorded on the perpendicular magnetic recording medium, thus obtaining a reproduction signal. The reproduction signal is amplified by the head driving controller 508, which is then transferred to the R/W channel 509 for decoding. The HDC detects an error and corrects the error by ECC processing, and then the resultant is buffered in a buffer memory 521. Then, reproduction data is transferred from the host interface controller 517 to the host.

(Servo Pattern and Recording Method Therefore)

The aforementioned magnetic storage device (HDA) is placed at a precise position of the servo track writer provided with the servo information recording/reproducing controller of the present embodiment for installation. Similarly to Embodiment 1, a perpendicular magnetic recording medium is rotary-driven for evaluation of predetermined characteristics at the innermost radius zone $Z_1$ in accordance with the flowchart of FIG. 8, while pressing the actuator against a crash stop 1101 (see FIG. 19) disposed on the inner radius side of the magnetic storage device.

$P_{TFC}(i,1)$, $I_{WB}(i,1)$ and $I_{STO}(i,1)$ found by process similar to Embodiment 1 for each head Hi (i=0, 1, ... m) are stored in the register of the head driving device, and a microwave assisted magnetic recording head is driven based on the data, thus recording a predetermined recording pattern at the innermost radius zone $Z_1$ with predetermined recording density and at a predetermined frequency such as servo clock frequency. Then, reproduction output E(i, 1), MWW(i, 1), MCW (i, 1) and the like are evaluated at the zone. This is just a simplified explanation, and overshoot is given to the STO driving current and the bias recording current similarly to Embodiment 1 for optimization of parameters. Then, based on this result and the result of an experiment conducted beforehand, and preferably an appropriate track pitch calculation equation decided based on data on yields related to servo during mass production, an appropriate servo track pitch TPo(i, 1) is decided for each magnetic head Hi (i=0, ... m). For the appropriate track pitch calculation equation, values of MWW, MCW and MRW at not only the zone $Z_1$ but also all zones including the inner radius, the middle radius and the outer radius or representative zones, and the positioning precision K of the device are considered comprehensively, to which predetermined margin decided by an experiment using data for mass production is added, thus deciding a track pitch.

In the magnetic storage device of the present embodiment, the actuator in which the (m+1) magnetic heads are integrally installed is driven, and all of the magnetic heads form a servo pattern and a servo track on their corresponding to perpendicular magnetic recording media with the same track pitch.

Even with strict selection, the magnetic heads have different track widths due to variations during manufacturing. Then, some magnetic heads may have large deviation that cannot be compensated by adjustment of the width of a data track at the manufacturing step following the servo step depending on how to select the track pitch. Especially a magnetic head having a large track width cannot avoid a phenomenon, so-called squeeze write or off-track write where data on adjacent tracks is erroneously erased.

Then, servo information is recorded at all zones similarly to Embodiment 1, using the value of $TP_{op}$ (i, 1) decided using MWW(i, 1), MCW(i, 1) and MRW(i, 1) of each magnetic head. Herein, similarly to the process for mass production, an optimum TFC input power value $P_{TFC}(0, j)$, an optimum bias recording current value $I_{WB}(0, j)$ and an optimum STO driving current value $I_{STO}(0, j)$ are found for each zone Zj from the values of the innermost radius zone $Z_1$ using the conversion equation found beforehand by an experiment, and servo information is recorded at all zones of the perpendicular magnetic recording medium using the values. Finally, a data track is decided in the manufacturing process in a similar manner to the mass production.

Next in the test process, the (m+1) pieces of servo information of the magnetic storage device is evaluated for ATI characteristics, squeeze write characteristics and off-track write characteristics. When such evaluation is performed for a large number of magnetic heads and magnetic storage, a servo track formed by a magnetic head having parameters such as MCW, MWW and MRW with the highest yield of device manufacturing leads to a magnetic storage device having high adjacent track interference resistance at a high rate. Such a track width is approximately an average value of the all heads mounted at the device. This is because TP has typically the following limitation, and the average value is advantageous statistically.

$$2\times(MWW-MRW)<TP<MWW+MRW \quad (2),$$

wherein MWW is a recording track width including the width of side writing in addition to the FGL width $W_{FGL}$, and MRW is a reproduction track width including the width of side reading in addition to the reproduction element width Trw. Equation (2) is a relational expression enabling appropriate recording/reproducing of servo information. This relationship does not hold for shingled magnetic recording to perform overwriting.

Figure 16:
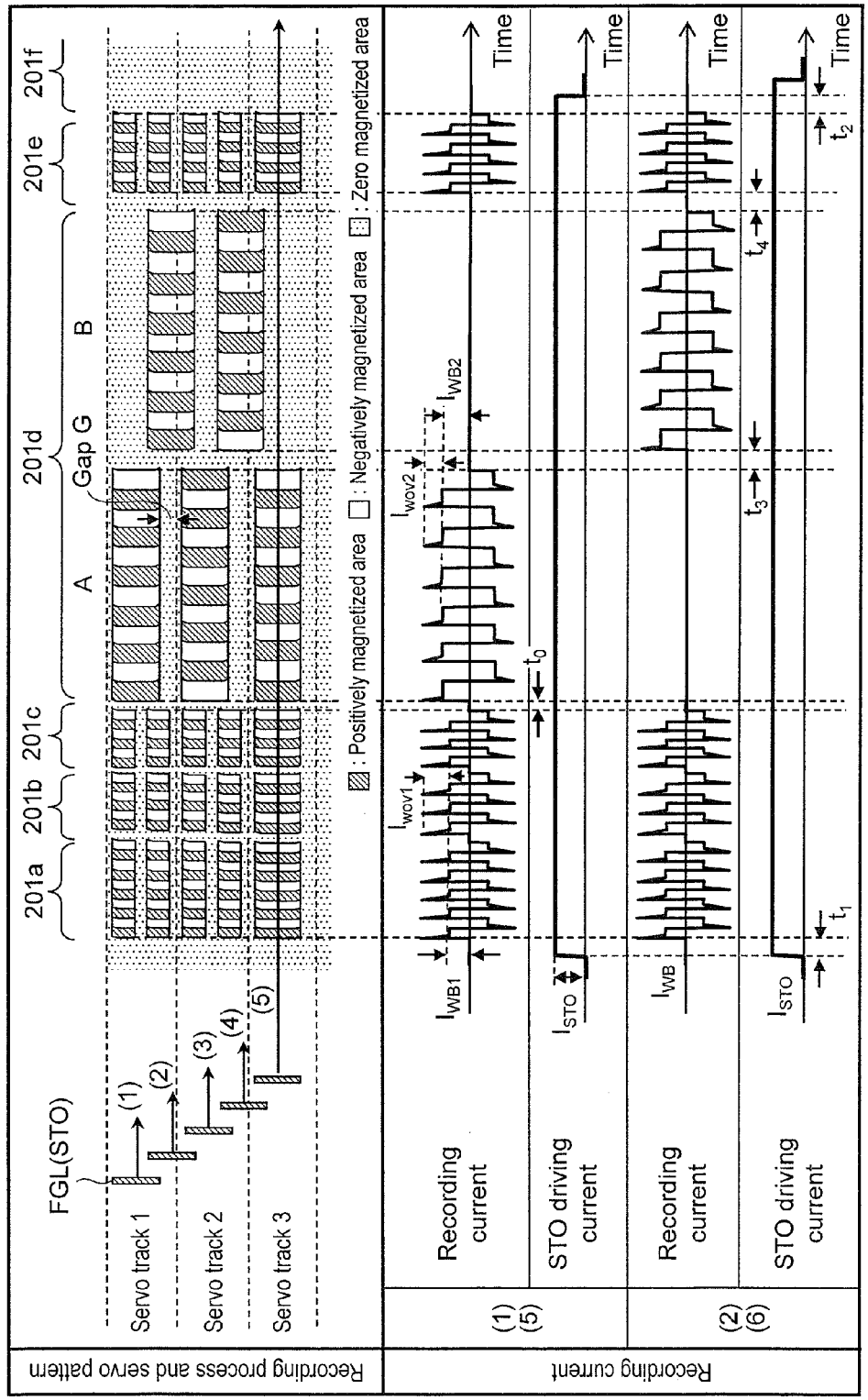
FIG. 16 shows an exemplary servo pattern and a timing chart for recording process thereof.

FIG. 16 shows a timing chart to record a servo signal similarly to the case including one head of Embodiment 1, and schematically shows the state of a servo track formed while selecting optimum $TP_{op}$ with the magnetic head giving the highest device yield among a large number of heads, which was determined by a preliminary experiment.

Overshoot is set for all of the bias recording current during operation, and the amount of overshoot $I_{WOV1}$ at the parts 201a to 201c is set similarly to base part $I_{WB1}$ of the bias recording current for recording with short bits, and at part 201d, the ratio of base part $I_{WB2}$ of the bias recording current is increased for recording with long burst patterns. The track pitch $TP_{op}$ is wider than the servo magnetization pattern width MWW by the amount corresponding to the positioning precision K of the device compared with FIG. 13, and the gap area at the servo track boundary become wider. However, compared with the conventional techniques where recording is governed by the main pole, the gap area especially at the outer radius part can be reduced to 30 or 40% or less for the conventional one, which is especially preferable for a servo pattern of a device provided with a plurality of magnetic heads.

Then, similarly to Embodiment 1, a magnetic recording medium described referring to FIG. 2, two, four, five or ten magnetic heads are provided at a 3.5" magnetic storage device, and servo information is recorded at $F_0$ of 180 MHz by the aforementioned process. Next, in the manufacturing test process, characteristics of the magnetic heads such as adjacent interference characteristics, squeeze characteristics and 747 characteristics are evaluated similarly to Embodiment 1, and an optimum data track profile and such a linear recording density profile for each magnetic head are decided depending on the MCW and the squeeze characteristics of the magnetic head. Although Embodiment 1 includes only one magnetic head, the present embodiment includes a plurality of magnetic heads, and these magnetic heads usually have variations in their characteristics. Thus, in the present embodiment, the BPI target value profile described in Embodiment 1 is reduced by one level (smaller BPI value will be selected) for the head having the worst performance (error rate) and, instead the BPI target value profile is raised by one level (larger BPI value will be selected) for the head having the best performance, so that all of the heads have substantially the same error rate after the adjustment, thus satisfying predetermined areal recording density (adaptive formatting).

Since the present embodiment includes a plurality of magnetic heads, each magnetic head has a different MCW and has a different servo track pitch and such a data track pitch. In this case, a conversion equation from the servo track to the data track can be found for each head. A magnetic storage device of predetermined capacity stores parameters necessary for conversion and optimized recording/reproducing in a memory, and their characteristics are evaluated.

(Advantageous Effects)

The microwave assisted magnetic recording head of the present embodiment has small side erasing width $\Delta E$ and such a fringe effect of about ⅓ of those of the conventional perpendicular recording head, and can adaptively reduce a bad influence of distribution of the track width and MCW of the plurality of magnetic heads provided at the magnetic storage device, and the TPI profile of the data track in the radius direction can be set while allowing for margin for each magnetic head with reference to the TPI of the servo track. Hence it can be achieved that the servo track density of 580 kTPI and 560 kTPI for four heads and ten heads, respectively, as their averages, and the data track density of 540 kTPI and 510 kTPI, respectively. Although these are inferior to Embodiment 1 including one head, a magnetic storage device with high track density of 500 kTPI can be realized.

The microwave assisted magnetic recording head of the present embodiment has a small variation of MCW, and the track pitch of the present embodiment can have a smaller difference between the data track and the servo track than the conventional techniques. This means that, similarly to Embodiment 1, a conversion equation (reference curve) from the servo track to the data track can be simplified to a second-order to fourth-order one (conventionally fifth- to seventh-order conversion equation), and so calculation load necessary for positioning can be reduced and complicated positioning operation can be shortened. Thus, a magnetic storage device provided with a microwave assisted magnetic recording head of the present embodiment and provided with a perpendicular magnetic recording medium having a servo pattern of the present embodiment can shorten the access time to a data track, and so the performance of the device can be improved by 2 to 3 points. This effect is preferably notable for a large-capacity magnetic storage device including ten heads for enterprise use, which have been demanded rapidly and increasingly these days.

Embodiment 3

In the present embodiment, another null servo pattern where preamble servo parts 201a to c are not separated is recorded on a perpendicular magnetic recording medium described referring to FIG. 3, using the microwave assisted magnetic recording head shown in FIG. 3.

(Servo Pattern and Recording Method Therefor)

A perpendicular magnetic disk is demagnetized beforehand, and such a perpendicular magnetic disk, together with the microwave assisted magnetic recording head of FIG. 3, is incorporated to a 2.5" magnetic storage device configured as in FIG. 15. The R/W channel 509 used is of a non-RS channel type using LDPC codes. The magnetic storage device has two perpendicular magnetic recording media and four magnetic heads.

FIG. 7 schematically shows a servo track writer (STW) used for the present embodiment. The STW is provided with a HDD sealed chamber 1104, and a HDA 1102 that is a mechanical system of the magnetic storage device is placed in the HDD sealed chamber 1104. The STW of the present embodiment has a structure similar to the conventional STW including a clock head, and the clock head 1108 used is a microwave assisted magnetic recording head, which is driven by the servo information recording/reproducing controller of the present embodiment and driving means shown in FIGS. 8 and 9. Alternatively, it may be configured as in conventional techniques, for example, using an external position detection/positioner such as an encoder motor (rotary encoder) and a push-pin for positioning.

Similarly to Embodiment 2, a predetermined recording pattern is recorded at the innermost radius zone $Z_1$ with predetermined recording density and at a servo clock frequency $F_0$ for each head Hi (i=0, 1, . . . m), and then reproduction output E(i, 1), MWW(i, 1), MCW(i, 1) and the like are evaluated at the zone. Based on an appropriate track pitch calculation equation decided based on data on device manufacturing yields related to servo during mass production, an appropriate servo track pitch TPo(i, 1) is decided for each magnetic head Hi (i=0, . . . m).

Next, a magnetic head having the highest parameter for device yield in the manufacturing process is selected as a reference head Hs, and using a track pitch $TP_{op}$ (s, 1) decided from its MWW(s, 1), MCW(s, 1) and MRW(s, 1), servo information is recorded at the zone $Z_1$ similarly to Embodiments 1 and 2. This track pitch is set as $TP_{op}$.

The servo pattern of the present embodiment, where the preamble servo parts 201a to 201c are not separated, is recorded as follows. That is, in the servo track recording step (1), STO driving current $I_{STO}$ is firstly applied duration $t_1$ before the recording at 201a part based on a signal from the servo gate. Then, $t_1$ afterwards, bias recording current at a appropriate predetermined frequency is applied to a ring shape magnetic core of the microwave assisted magnetic recording head for recording at parts 201a to 201c, and then $t_0$ afterwards, part A of the servo burst pattern 201d is recorded. Finally, $t_3$, duration required for recording of servo burst B and delay time $t_4$ afterwards, part 201e is recorded, and then $t_2$ afterwards, STO driving current is set at zero. Herein, overshoot of the bias recording current is set similarly to FIG. 16, and overshoot of the microwave driving current is set similarly to FIG. 13. Similarly to Embodiments 1 and 2, the bias current has a frequency of $F_0$ and then $F_0/2$ during servo burst recording, thus recording the servo information.

After recording the servo information while rotating once, at the servo write step (2), the microwave assisted magnetic recording head is moved in the track width direction by a half of the track pitch $TP_{op}$, and then bias recording current is applied to B burst part only of 201d in response to the servo gate, thus recording servo information. Herein, at time $t_1$ before turning-ON of the B burst recording current, the application of STO driving current is started, and at time $t_2$ after turning-OFF of the bias recording current, the STO driving current is turned off. Herein, the values of $t_0$ to $t_4$ are the same as those in Embodiments 1 and 2. Then, every time the magnetic disk rotates, tracks 1, 2, 3 . . . are formed sequentially through the servo track recording steps (3), (4), (5) . . . .

After finishing the recording of the servo information at zone 1, similarly to Embodiments 1 and 2, servo information is recorded by the head Hi at a servo track pitch $TP_{op}$ common to the heads at all zones including the zone 2, zone 3 . . . . Herein, similarly to the process of mass production, an optimum TFC input power value $P_{TFC}(i, j)$ an optimum bias recording current value $I_{WB}(i,j)$ and an optimum STO driving current value $I_{STO}(i, j)$ are found using a conversion equation found by an experiment beforehand from the values of the innermost radius zone $Z_1$, and these values are stored collectively in a parameter table. Then, predetermined parameters are copied in a register as needed, thus recording servo information at all zones of the perpendicular magnetic recording medium.

Similarly to Embodiment 2, the magnetic storage device of the present embodiment undergoes manufacturing test process therefore after recording the servo information. In this manufacturing test process, characteristics of the magnetic heads such as adjacent interference characteristics, squeeze characteristics and 747 characteristics are evaluated, and so an optimum data track profile and such a linear recording density are decided and a conversion equation from a servo track profile is found. Next, a data track profile for each magnetic head and for each zone is decided using this conversion equation, and optimum track density and optimum linear recording density profile are decided for each zone and for each magnetic head so that the error rate of all zones and all heads becomes uniform while satisfying predetermined areal recording density (adapting forming), predetermined parameters necessary for conversion and recording/reproducing are stored in a memory, and then a magnetic storage device having predetermined capacity is evaluated. Herein, a non-RS channel using LDPC code can measure only an error rate after error correction. Since an error rate after error correction typically has very small probability of occurrence (about $10^{-9}$), it is not possible to precisely evaluate an error rate in a short time at the manufacturing test. Thus, the present embodiment limits error rate correction ability, and evaluation is performed intentionally under a condition that is likely to cause a predetermined error rate.

Through this process, seamless ISG part and SAM part are recorded as a continuous pattern in the track width direction except for the separation at a track boundary. Further, as shown in the drawings, all patterns are selected so that the total sum of positive and negative magnetization becomes zero. In this way, the servo pattern recorded including a constant pitch is configured so that the total sum of positive (+) and negative (−) magnetization is substantially zero at the servo part 201 and so as to include seamless recording bits without recording footprint residual at the end thereof at the entire area of the servo part.

(Advantageous Effects)

A servo signal can be checked by placing a differential probe at a line 513 of a reproduction signal between the head driving controller 508 and the R/W channel 509 of the magnetic storage device of FIG. 15, to which a servo trigger is applied, and by observing waveforms with an oscilloscope.

Figure 18:
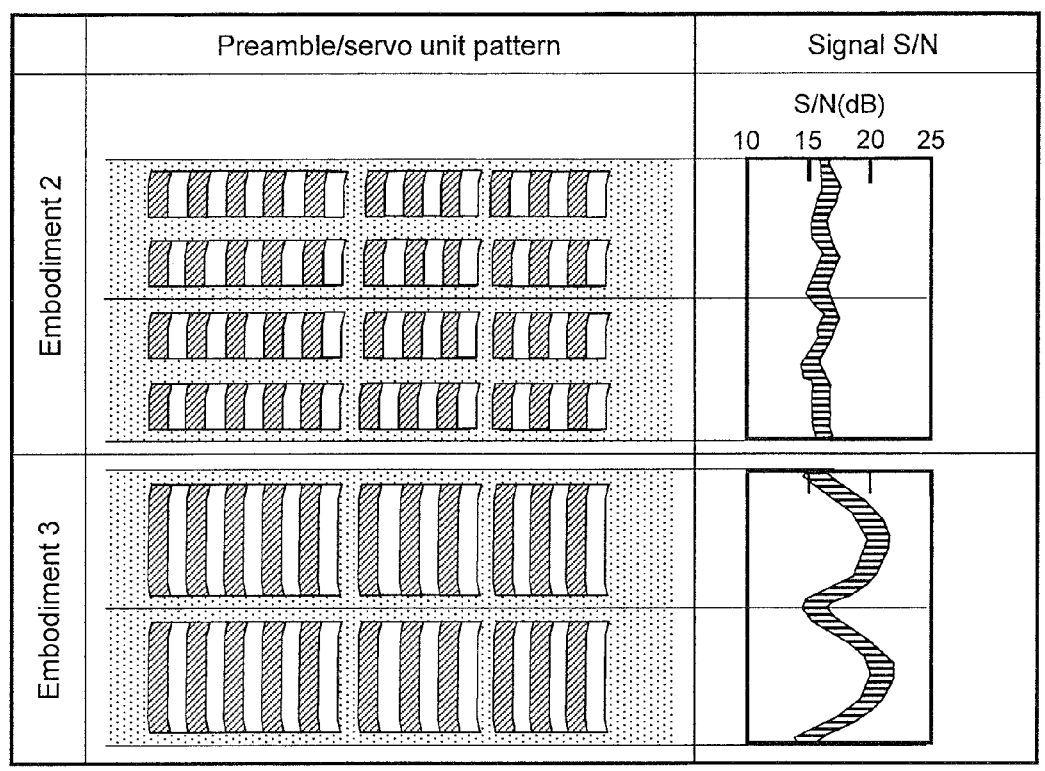
FIG. 18 shows an example of signal quality of a seamed pattern and a seamless pattern.

FIG. 18 shows a comparison of a recording magnetization state at parts 201a to 201c between the present embodiment and Embodiment 2 and of S/N of a position error signal (PES) obtained when reproduction is performed by a reproduction element of a microwave assisted magnetic recording head while changing the position in the radial direction. Both of them have S/N higher than 13 dB that is signal S/N necessary for servo, and the seamless pattern of the present embodiment can yield signal S/N at the track center higher than that of the seamed pattern of Embodiment 2 by about 5 dB. The same goes for the signal at part 201e.

As stated above, according to the servo pattern recording of the present embodiment, all patterns including the gain reference ISG part 201a, the servo sector marker synchronization part 201b and further the null servo burst pattern recording at a frequency of the servo clock to obtain highly precise positional information in the radial direction are not separated, and all of the patterns can be recorded of the same phase precisely. Thus, the present embodiment can achieve higher signal quality and higher phase precision than signals in a seamed pattern of Embodiment 1, and especially in a null burst pattern, which has to have high phase precision, positioning precision for on-track is higher than that of Embodiment 1. Further servo track density of 790 kTPI or higher and data track density of 735 kTPI or higher are favorably achieved.

In the present embodiment, servo pattern is recorded using a 2.5" device with medium rotational speed of 5,400 rpm while setting the servo signal frequency $F_0$ at 90 MHz, 110 MHz, 130 MHz, 160 MHz, 190 MHz, 220 MHz and 250 MHz. Then, at the frequency of 110 MHz or higher, the O/W property, thermal stability and format efficiency are improved, and at the frequency of 220 MHz or lower, deterioration of signal quality (signal jitter) is not so large, a well-balanced servo burst pattern could be obtained and format efficiency is improved by 2 to 3 points. The present embodiment used a non-RS channel using LDPC codes, whereby an error rate is improved by one digit compared with a RS channel using Reed-Solomon codes.

Embodiment 4

The present embodiment describes another servo burst pattern and recording process therefor based on self servo writing (SSW) that records servo information using a magnetic head and an actuator that the magnetic storage device itself has without using an external length measuring system. In the present embodiment as well, a non-RS channel type R/W channel 509 based on LDPC codes is sued similarly to Embodiment 3.

(Servo Pattern and Recording Method Therefor)

The following describes a method for recording servo information on a magnetic recording medium of the magnetic storage device of FIG. 15 by self-servo writing (SSW) using servo track writer of FIG. 19. The SSW refers to a pattern recorded by itself using components of the magnetic disk device shown in FIG. 15, and performs temporal (timing control in the circumferential direction) and spatial (position control in the radial direction) using temporal and spatial information obtained from the signal, thus recording a subsequent servo pattern at a position displaced by read-write offset in the radial direction. The following describes the case of wiring servo information (servo pattern) on a magnetic recording medium not by using a circuit on the control board 512 of the magnetic storage device of FIG. 15, but by directly controlling the internal mechanism of a mechanical system 1102 of the magnetic storage device by a STW driving controller 1103. Alternatively, servo writing of the present embodiment may be performed by incorporating a function executed by an external circuit into the internal circuit on the control board 512.

The STW driving controller 1103 includes a SSW controller that controls the SSW as a whole, and the SSW controller controls and executes the SSW of the present embodiment, such as positioning control of the microwave assisted magnetic recording head 503 and servo pattern generation control. The SSW controller includes a microprocessor MPU that operates in accordance with micro-codes stored in a memory beforehand, and makes a head driving controller 508 select one reference head (propagation head) for data access among a plurality of magnetic heads, amplifies a reproduction signal reproduced by the selected head at a constant gain, and sends the same to the servo information recording/reproducing controller. Based on the signal, the servo information recording/reproducing controller generates a recording signal (servo data), and the head driving controller 508 amplifies the recording signal. Then, the recording signal is transferred to all of the magnetic heads including heads (non propagation heads) other than the propagation head, and current is applied to the microwave assisted magnetic recording head 503, whereby a servo pattern is recorded on the magnetic recording medium 501.

As stated above, the SSW is a technique, in which the magnetic disk device mainly uses its internal circuit and mainly uses its own mechanism and circuit for self-writing a servo pattern. Unlike a dedicated external servo track writer, it is difficult for such a SSW system to precisely control rotation speed of a spindle motor, and so wobbling of a rotating speed (rotation jitter) occurs at the magnetic disk, which will degrade servo signal quality. There will be another problem caused by various noise induced during correcting the rotation jitter. The present embodiment uses the following two methods to record servo information while overcoming such issues.

(A) Concentric Seed Pattern Formation

In this method, a few to a few dozens of concentric patterns are formed as a seed pattern (base pattern) as a reference for positioning to record servo information.

Firstly, a carriage is pressed against an inner radius stopper 1101, whereby the propagation head Hs is positioned at the innermost radius part of the magnetic recording medium. Next, a concentric initial servo track including a predetermined number of reference patterns (sectors) is formed at a predetermined clock frequency with reference to an index signal generated once from one rotation of a spindle motor, and a plurality of seed patterns are formed as positioning references appropriately using elastic deformation effect of the inner-radius stopper while controlling the pressing forces. Sector numbers are assigned sequentially with reference to an index, and HDC/MPU can decide detection timing of each pattern using the R/W channel of the magnetic storage device. This seed pattern typically has irregular intervals due to rotation jitter of the spindle motor. Then, each reference pattern of the seed pattern is reproduced plural times, and an average of pattern interval is calculated, thus calculating a target value to record a new and more accurate servo track. Next, while reproducing this seed pattern, a new reference pattern in phase is recorded on the outer radius side of the seed pattern using a microwave assisted magnetic recording head provided away by the R/W offset amount to the outer radius side in the radial direction while correcting influences of the rotation jitter, thus forming a servo pattern of predetermined specifications. This correction is performed by recording each delay time adjusted for each sector at a clock frequency modified by PID control so as to adjust a difference between detected timing of a seed track reference pattern and the target value (correction value table).

Figure 20:
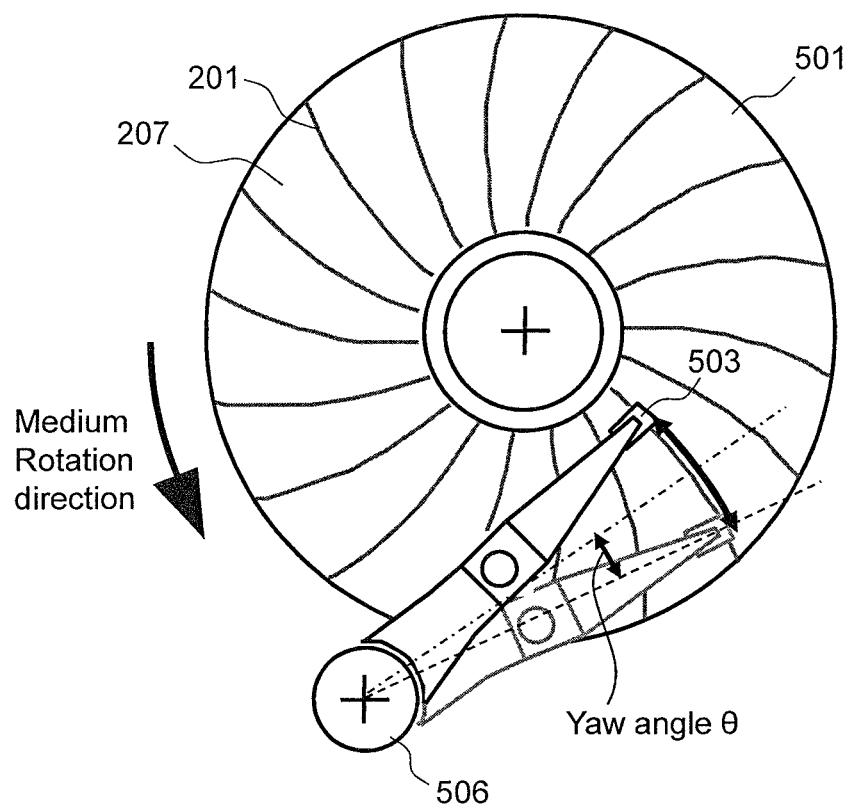
FIG. 20 is a schematic servo writing method.

Next, the servo pattern in the final format is reproduced by the reproduction element, and a predetermined (corrected) timing signal when each servo sector is detected is set as a servo gate signal. Then, the servo pattern in the final format is precisely copied (recorded) on the further outer radius side by a microwave assisted magnetic recording head by the process described below while correcting timing and a clock frequency so that a timing error during pattern recording does no propagate. Similarly, the servo pattern is continuously written while moving the recording head to the outer radius side sequentially, whereby a servo pattern can be recorded radially as shown in FIG. 20 on the entire magnetic recording medium (self propagation).

(B) Spiral Pattern Formation

Figure 21:
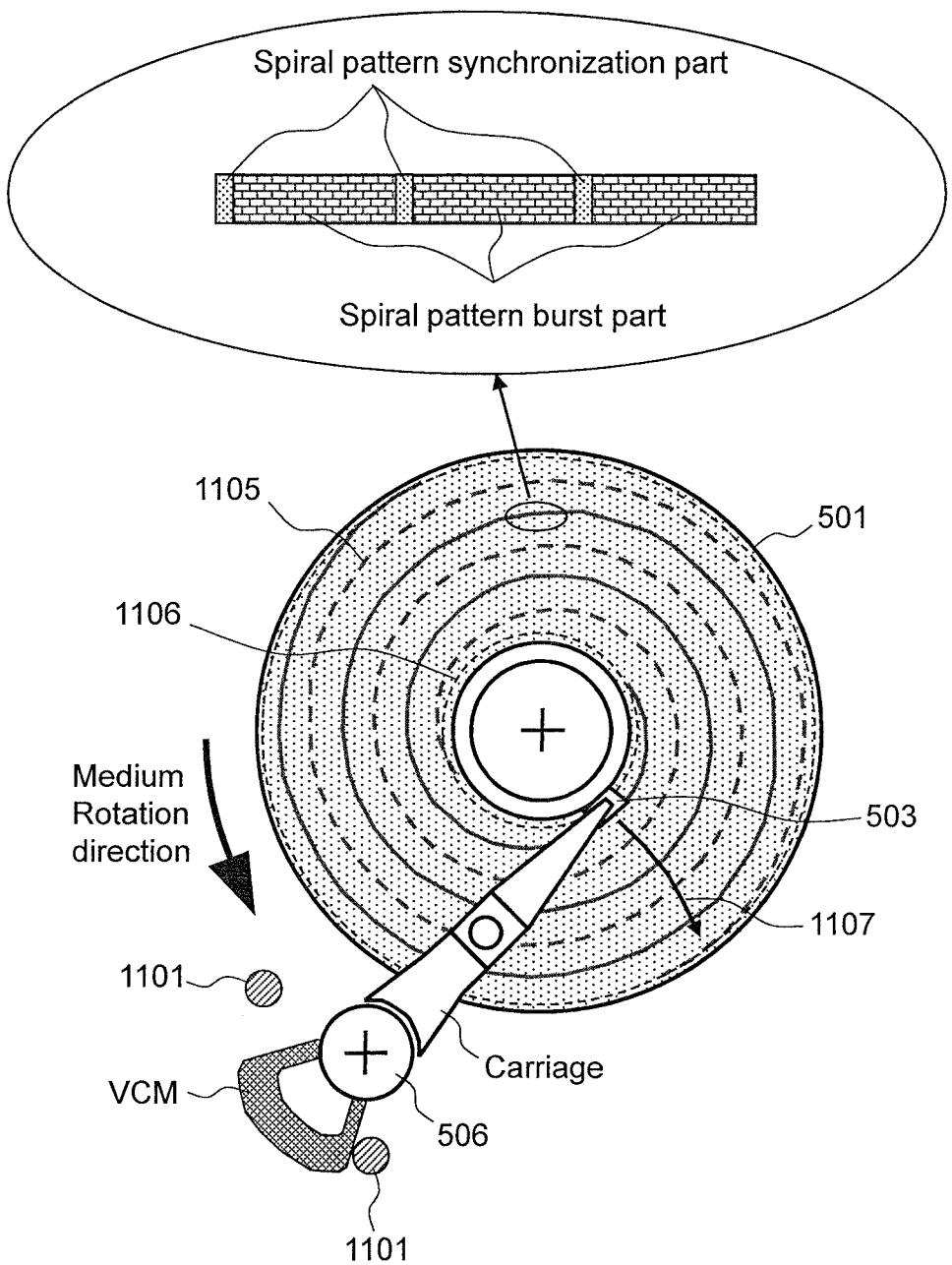
FIG. 21 is a schematic servo writing method.

In this method, a few to a few hundreds of spiral pattern (multi-spiral pattern) is formed as a seed pattern (base pattern) as a reference for positioning to record concentric servo information. For simplification, FIG. 21 shows an example of two multi-spiral patterns, and the outline of this method is described below, by way of this drawings.

Firstly, a carriage is pressed against an inner crash stop 1101, whereby the propagation head $H_s$ is positioned at the innermost radius part of the magnetic recording medium. Next, a plurality of concentric clock tracks 1106 is formed at a predetermined clock frequency with reference to an index signal generated once from one rotation of a spindle motor, and then a plurality of reference clock patterns at constant intervals and in phase are formed by the processing similar to the method (A). Next, this reference pattern is suitably reproduced, and a timing signal to start a spiral pattern is generated. Then, 200 to 500 ten- to thirty-turns spiral servo pattern 1105, including a synchronous part and a burst part toward the outer radius, is recorded at a constant speed with reference to a predetermined radial position (multi-spiral pattern). At the synchronous pattern, detection timing (sync mark), positional data and the like of the burst part (servo burst) are recorded. Similarly to Embodiment 3, the profile of the recording parameter is found beforehand as in FIG. 10, and recording parameters such as TFC input power, STO driving current and bias recording current are adjusted based on the magnetic head position (magnetic head moving speed in arrow 1107 direction×moving duration) during spiral pattern recording. A reference signal may be provided at the outer radius part, and a spiral pattern may be recorded from the outer radius to the inner radius.

Next, this multi-spiral pattern is suitably read by a reproduction element, and the positioning of the magnetic head is performed and the spiral pattern and the servo pattern are associated while securing linearity for the positioning. Further a (corrected) timing signal from the spiral pattern is set as a servo gate signal, and correction for rotation irregularity, clock frequency and the like is performed similarly to the method (A), whereby a servo pattern is recorded radially on the entire radius of the magnetic recording medium as shown in FIG. 20 by the below-described process. Herein, one of the spiral servo patterns may be used as a reference signal.

The following describes the details of the servo pattern recording process according to the present embodiment, by way of the method (A).

Typical number of revolutions for recording of servo information on a magnetic disk device is 5,400 rpm for 1.8" and 2.5" devices, 7,250 rpm for 3.5" device, and 6,000 rpm for 3.5" device for enterprise use. To suppress fluttering of a magnetic disk and vibrations of a suspension or the like of a magnetic head, particularly preferably the ABS face of the slider is designed so as to float with the same degree between air and He environment, and then servo information is recorded while filling the device with He temporally.

In SSW, at the initial sequence, a pattern (all-one pattern) at a constant frequency is recorded for each head Hi (i=0, 1, . . . , m) while pressing the actuator against the crash stop 1101 on the inner radius side of the zone $Z_1$. Herein, the perpendicular magnetic recording medium is demagnetized beforehand. Next, a position of each magnetic head is fine-adjusted by changing a VCM current value to acquire reproduction amplitude of the all-one pattern, thus learning a relative distance between the recording element and the reproducing element (hereinafter called R/W offset), output E(i, 1), MWW(i, 1) and MCW (i, 1) at the recorded track. Next, similarly to Embodiment 3, an appropriate servo track pitch TPo(i, 1) is decided for each magnetic head $H_i$ (i=0, . . . m) based on an appropriate track pitch calculation equation decided based on data on device manufacturing yields related to servo during mass production. Next, a magnetic head having the highest parameter for device yield in the manufacturing process is selected as a reference head Hs, and a track pitch $TP_{op}(s, 1)$ decided from its MWW(s, 1) and MCW(s, 1) is set as $TP_{op}$.

Figure 22:
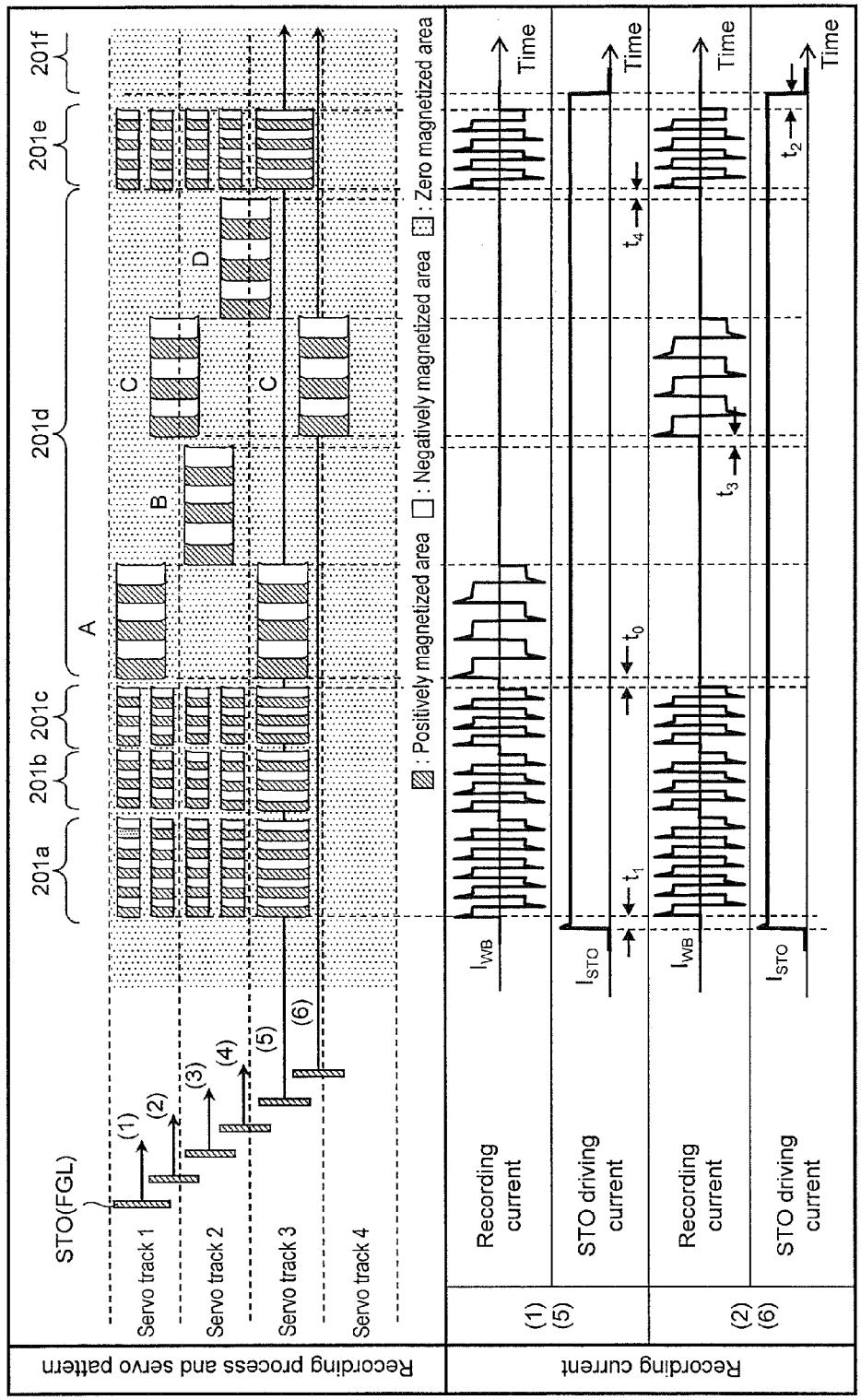
FIG. 22 shows an exemplary servo pattern and a timing chart for recording process thereof.

Referring to a timing chart, the following describes process to record a 4-bit burst servo pattern of the present embodiment using a microwave assisted magnetic recording head toward the right side in FIG. 22.

In servo track recording step (1) at zone $Z_1$, STO driving current is applied duration $t_1$ before recording at part 201a in accordance with a servo gate signal, and then $t_1$ afterwards, bias recording current at a servo frequency $F_0$ is applied to a ring shape magnetic core of the microwave assisted magnetic recording head for recording at parts 201a to 201c. At $t_0$ after recording completion, a servo burst pattern part A at 201d is recorded at the frequency of $F_0/2$, and the recording current is turned off. After a lapse of the total of time required for B, C and D burst recording, $t_3$ and $t_4$, the application of the bias recording current to the ring-shape magnetic core is resumed, thus recording repeatable run-out RRO information or the like at part 201e, and at $t_2$ after recording completion, the STO driving current is turned off. Although this is an example of the frequency of the bias current set at $F_0/2$ during servo burst pattern recording, and otherwise at $F_0$, the frequency of $F_0$ is preferable for the servo burst pattern recording as well because such an increased number of bits is favorable for servo signal quality and format efficiency.

After recording the servo information while rotating once, the microwave assisted magnetic recording head is moved in the track width direction by a half of the track pitch $TP_{op}$, and in the servo write step (2), similarly to step (1), STO driving current is applied in accordance with a servo gate. Then $t_1$ afterwards, bias recording current at the frequency $F_0$ is applied to the ring shape magnetic core, thus overwriting a lower half of parts 201a to 201c of track 1, and thereafter the recording current is turned off. Then, after a lapse of the total of $t_0$, time required for A, B burst recording and $t_3$, bias recording current at such a frequency is applied to the ring-shape magnetic core, thus recording servo burst pattern C, and then the application of current is completed. Finally, after a lapse of time required for D pattern recording and $t_4$, bias recording current at a frequency of $F_0$ is applied to the ring-shape magnetic core, thus recording RRO information or the like at the lower half track of part 201e. Then, at $t_2$ after recording completion, the driving current also is turned off.

Then, every time the magnetic disk rotates, servo tracks 1, 2, 3 . . . are formed sequentially through the servo track recording steps (3), (4), (5) . . . . At parts 201a to c, a continuous pattern is recorded in the track width direction except for the separation due to side recording. Herein, the part of track numbers is encoded by a phase shift method, and all of the patterns are selected so that the total sum of positive and negative magnetization becomes zero as shown in the drawing. In the above, $t_0$ to $t_4$ play the same role as in Embodiments 1 to 3. In this example, $t_1$ and $t_2$ are about 1 ns, and $t_3$ and $t_4$ are decided with consideration given to a phase shift that is delayed due to half-moon shaped distortion of the recording magnetization state, for which time required for 1-bit recording of the preamble is good enough. For them, a standard value is found by an experiment for magnetic head and for each zone beforehand, and the value is stored in a parameter table shown in FIG. 10. During recording, the value is stored in a register provided at the head driving controller of FIG. 15 as needed. Preferably, these values are reevaluated for each medium with a predetermined program and tuned.

In the case of method (B), a position error signal (PES) is calculated using an amplitude value of the multi-spiral patterned servo burst signal for each time frame, and based on the PES information, positional control (tracking) of the microwave assisted magnetic recording head is performed. Then, similarly to method (A), rotation irregularities, clock frequency and the like are corrected, and a servo pattern is recorded radially at the entire radius of the magnetic recording medium as shown in FIG. 20. When the moving speed of the magnetic head in the radial direction easily fluctuates, tracking may be performed in combination with method (A), thus reducing a propagation error.

Through this process, a 4-burst servo pattern at a constant pitch can be recorded so that the total sum of positive (+) and negative (−) magnetization at the servo part 201 of the perpendicular magnetic recording medium becomes substantially zero, which includes a recording bit that is not separated at the entire area of the servo part and does not include a residual part of recording footprint left at the end part.

(Magnetic Storage Device)

Similarly to Embodiments 1 to 3, two 1.8" perpendicular magnetic recording media each including the layers configured as in FIG. 4 on a 1.8" glass substrate and four microwave assisted magnetic recording heads shown in FIG. 4 are mounted at a 1.8" magnetic storage device. Then, under a He-filled environment at 1 atmospheric pressure, servo information is recorded by the aforementioned process at $F_0$ of 120 MHz, and then He is substituted with air, followed by sealing. Thereafter, a data track is decided by adaptive formatting by the manufacturing process similarly to Embodiments 2 and 3, and the characteristics of the magnetic storage device are evaluated.

In the present embodiment, since a non-RS channel type R/W channel based on LDPC codes is used similarly to Embodiment 3, an error rate after error correction only can be measured. Then, off-track margin is evaluated as follows using percentage defective of sectors during off-track, thus optimizing TPI/BPI. That is, recording is performed to an adjacent track at various linear recording densities BPIs while changing the amount of shifting from one of the sides of a center recording track (self track), thus measuring percentage defective after error correction. Then, a so-called bath-tub curve is found based on the relationship between this percentage defective and track positions, and off-track capability (OTC) is evaluated using the bath-tub curve width having the percentage defective of sectors of 50%.

In the present embodiment, the following margin tests are conducted with several linear recording densities BPIs decided beforehand for the center recording track. That is, (a) whether OTC of 0 or more can be secured or not when data are recorded at an adjacent track a plurality of times (ATI margin test); (b) whether OTC of the self-track of 0 or more can be secured or not when the self-track and an adjacent track are displaced by a maximum amount allowed (squeeze margin test); and (c) whether OTC of a predetermined off-track margin or more can be secured or not when data are recorded at both adjacent tracks that are not displaced (off-track margin test).

In the present embodiment, the sets of parameters of BPI and TPI are found based on the linear recording density and the track interval (pitch) passing the above margin tests, and among them, those giving the maximum areal recording density are set as the optimum BPI and TPI.

(Advantageous Effects)

Figure 40:
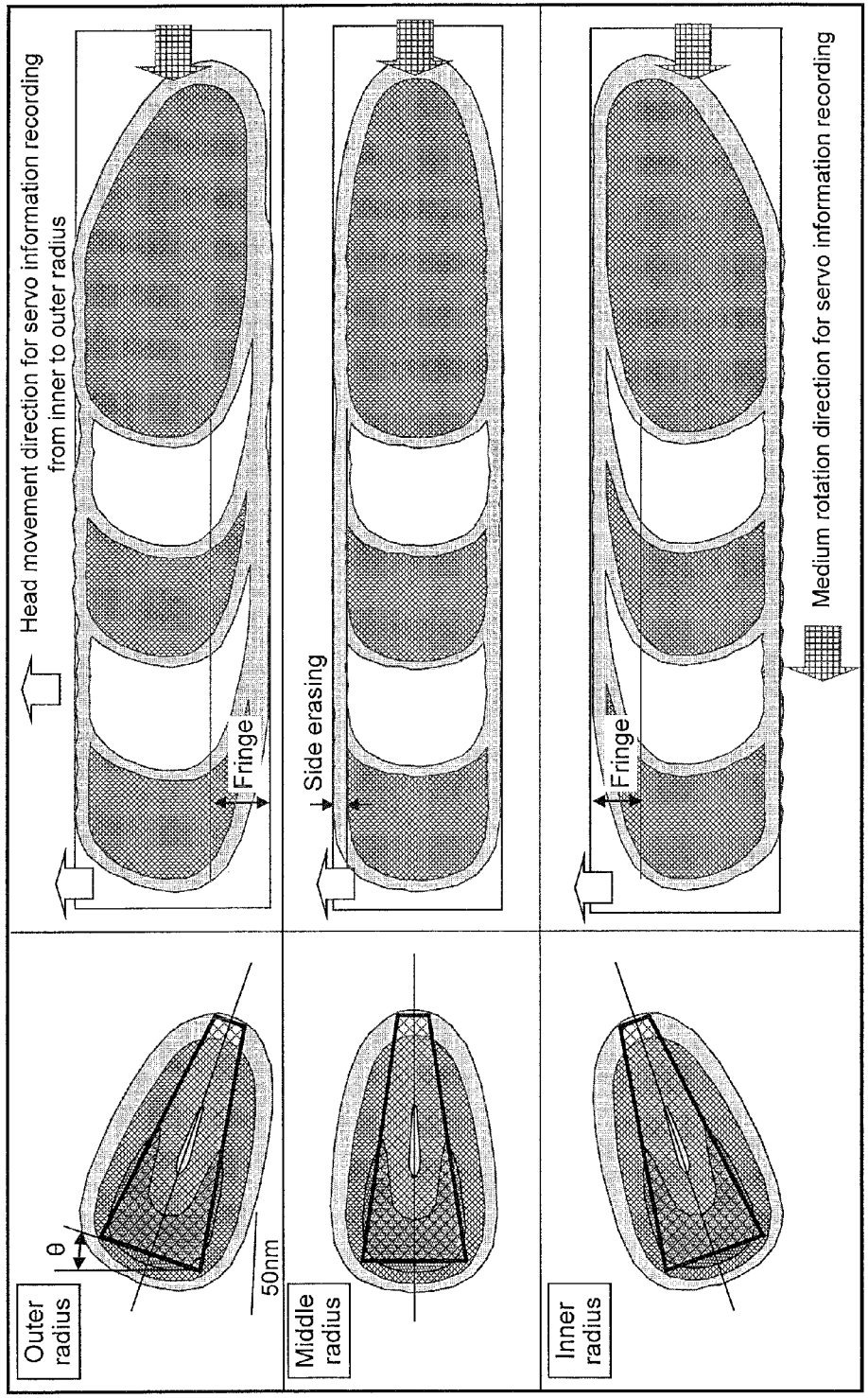
FIG. 40 shows recording magnetic field distribution of a conventional main-pole type perpendicular magnetic recording head.
Figure 41:
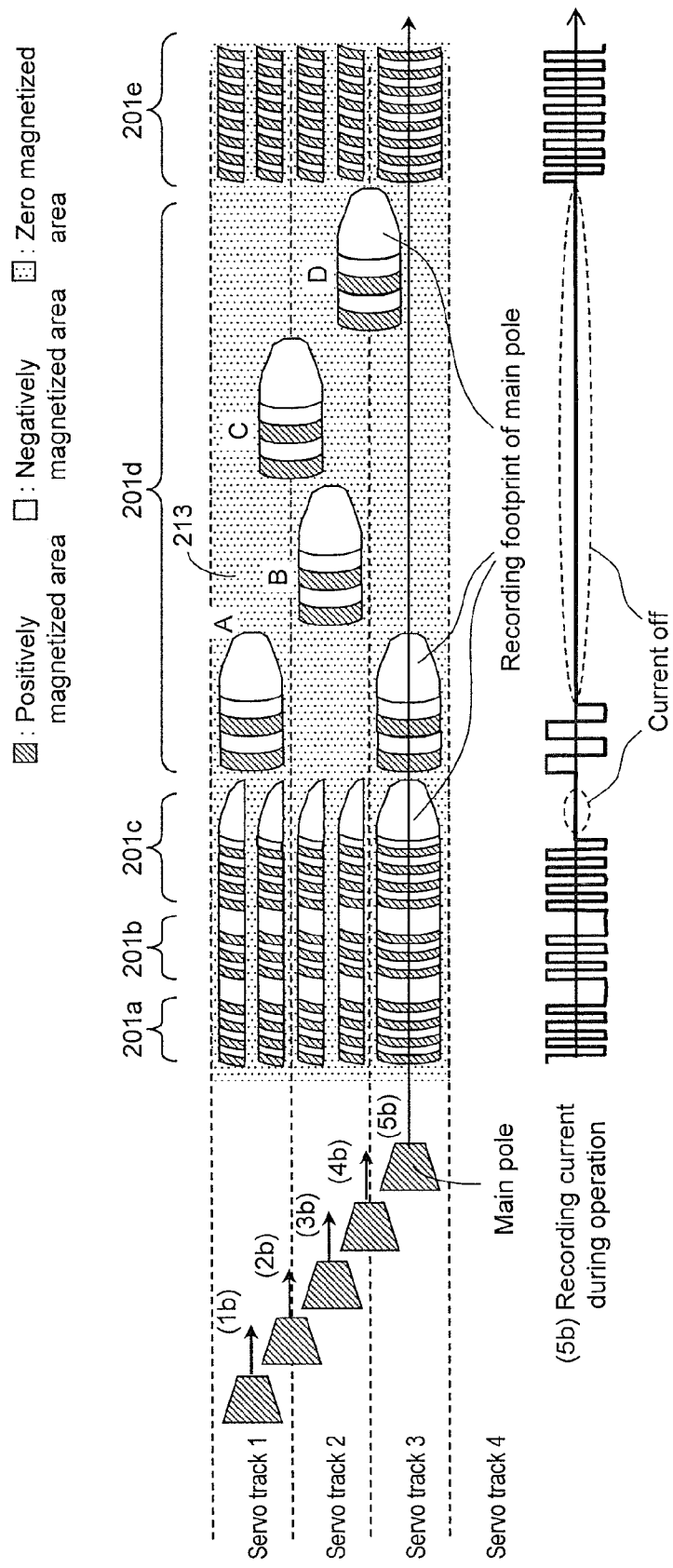
FIG. 41 shows a servo pattern including big recording footprint and a timing chart for recording process thereof by a conventional main-pole type perpendicular magnetic recording head.
Figure 42:
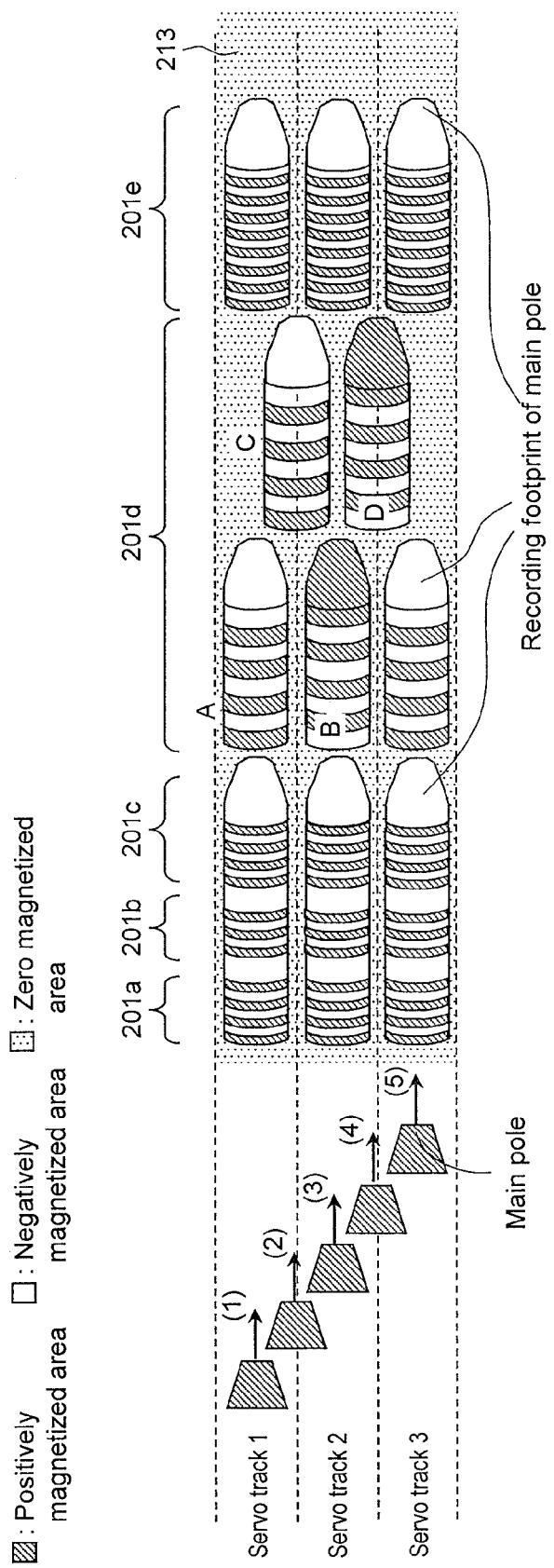
FIG. 42 shows a servo pattern including big recording footprint and a timing chart for recording process thereof by a conventional main-pole type perpendicular magnetic recording head.

The SSW method of the present embodiment can reduce manufacturing cost compared with a method of using a dedicated STW using an external positioner or clock head and a clean room. Further since this method can write a servo pattern while always observing a relative position between a magnetic recording medium and a magnetic head in the radial direction, high writing precision can be achieved. Signal quality of a base pattern is very important for the SSW, and self-propagation of a pattern with large side writing, side erasing and fringe in the conventional techniques from the inner radius to the outer radius as shown in FIGS. 11 and 40 will degrade the quality of servo signals gradually. According to the microwave assisted magnetic recording method of the present embodiment, signal quality of a servo pattern propagating is high, and so the excellent servo signal quality can be kept in the magnetic recording medium as a whole, and so such a method is preferable for the SSW.

Advantageous effect of improving the characteristics is found for the magnetic storage device having a 4-burst servo pattern of the present embodiment, in which a servo burst part is recorded at a servo frequency of $F_0/2$. In the method (A), servo track density of 1,030 kTPI and data track density of 930 kTPI are obtained, and in the method (B), servo track density of 980 kTPI and data track density of 885 kTPI are obtained. The SSW performed not filled with He also yielded favorable characteristics of servo track density of 990 kTPI and data track density of 895 kTPI.

Additionally, due to a seamless servo burst pattern formed, the signal quality is higher than the servo signal of Embodiment 1 including separated patterns by up to 5 dB in both of (A) and (B), and thus in the 4-burst servo pattern method, in which S/N of servo signal plays more important role, positioning precision during seeking can further be improved than Embodiment 1 by 10 points, and so the present embodiment is preferable in terms of the improved performance as well.

Then, the 1.8" magnetic storage device of the present embodiment, including a case filled with He, having a servo burst part recorded at the servo frequency $F_0$ without degrading format efficiency, and increasing the number of servo sectors and the number of sampling to 500 or more, suppressed malfunction due to disturbance such as vibrations from a speaker installed at a PC, rotating vibrations from a HDD installed adjacently, and suppressed performance deterioration of about 10 points that is found in conventional system, and therefore the present embodiment is especially preferable for information home appliance and consumer electronics (CE) applications with higher opportunity of disturbance than IT application.

Embodiment 5

The present embodiment describes an integrated servo pattern, a perpendicular magnetic recording medium with the servo pattern recorded thereon, and such a magnetic storage device.

(Integrated Servo Pattern and Recording Method Therefor)

Figure 23:
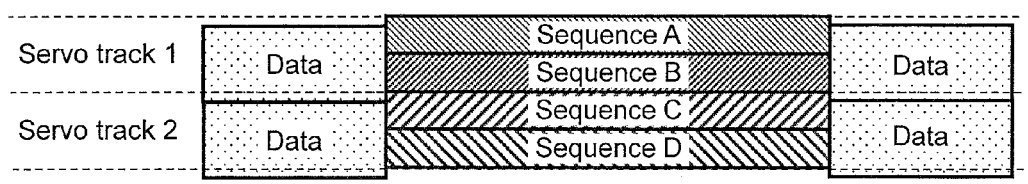
FIG. 23 is a conceptual diagram showing an integrated servo pattern.
Figure 24:
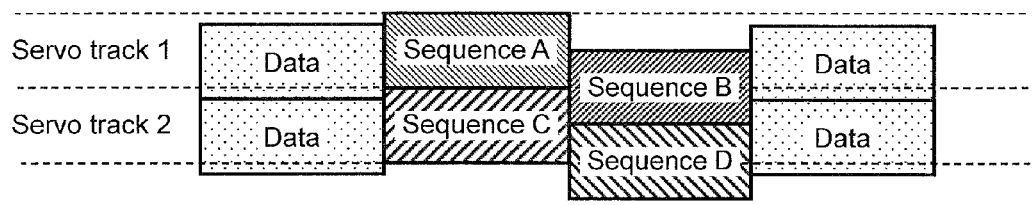
FIG. 24 is a conceptual diagram showing another integrated servo pattern.

As shown in FIGS. 23 and 24, an integrated servo pattern is servo information configured so that a part or all of a servo track mark, a positional error signal and positional information such as a track ID is included in an area (sequence) made up of encoded bits having a selected mathematical property and capable of providing a position error signal with reference to a center of a data track via the amplitude of a read signal to an adjacent area (sequence). In Embodiments 1 to 4, a servo signal is a periodic signal (all-one). On the other hand, in this method, a servo signal is a non-periodic signal including encoded bits. These methods, however, are the same in that a position error signal with reference to the center of a track is obtained from a difference in amplitude of a read signal between areas. The present embodiment uses the process of servo recording described refereeing to FIG. 17 and the like as it is, thus recording a servo burst part with an encoded bit string, whereby an integrated servo pattern is recorded similarly to Embodiments 1 to 4.

(Advantageous Effects)

Figure 17:
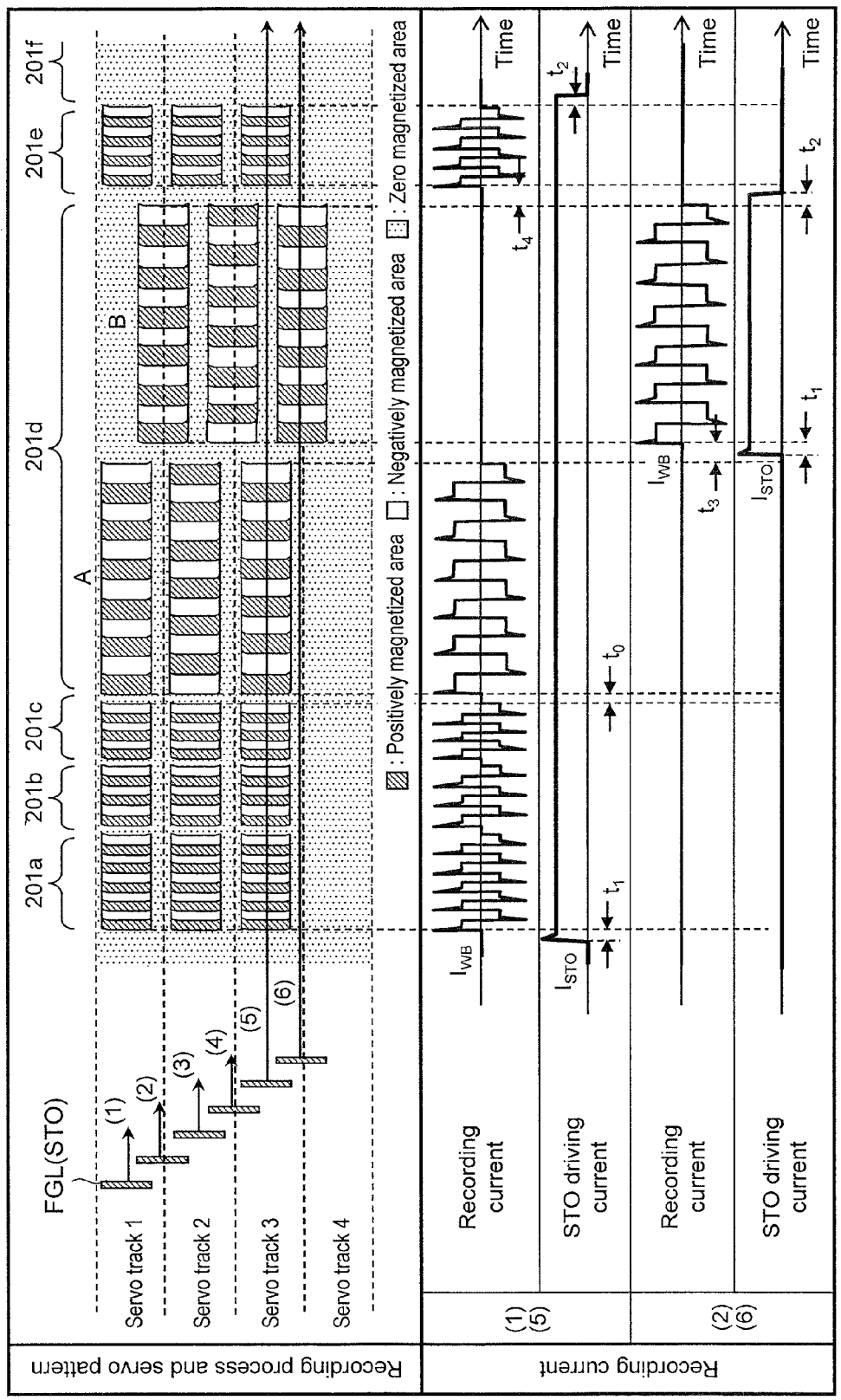
FIG. 17 shows an exemplary servo pattern and a timing chart for recording process thereof.

The integrated servo pattern of the present embodiment includes a seamless pattern as shown in FIG. 17 in the servo track, and as shown in FIGS. 23 and 24, a part or all of a servo track mark, a positional error signal and positional information such as a track ID is included in a plurality of areas (sequences) made up of encoded bits having a selected mathematical property. Then, a position error signal with reference to a center of a data track via the amplitude of a read signal can be provided to an adjacent area (sequence). With this configuration, the present embodiment requires only an area about a half of the servo area of Embodiments 1 to 4, and can provide a high position error signal.

Two 1.8" and three 2.5" perpendicular magnetic recording media having this servo pattern are mounted at a 2.5" magnetic storage device (media rotation speed of 20 krpm) and a 3.5" magnetic storage device (15 krpm) having an ultra high rotating speed of the present embodiment, respectively, and they are adjusted in the manufacturing process and then their characteristics are evaluated. Then, in spite of the configuration including a plurality of microwave assisted magnetic recording heads, the servo track density of 600 kTPI and the data track density of 540 kTPI are achieved similarly to Embodiment 1 including only one magnetic recording head. Further since lots of servo related information can be provided only by small amount of encoded bits as explained above, format efficiency can be improved, and thus a servo area is reduced to 1 to 2% of the entire area and the device capacity is improved by about 3 points.

Embodiment 6

The present embodiment relates to a method of recording by a media servo writer, in which still another servo pattern is recorded on the perpendicular magnetic recording medium described referring to FIGS. 2 to 4 by a microwave assisted magnetic recording head shown in FIGS. 2 to 4.

(Media Servo Writer)

Figure 25:
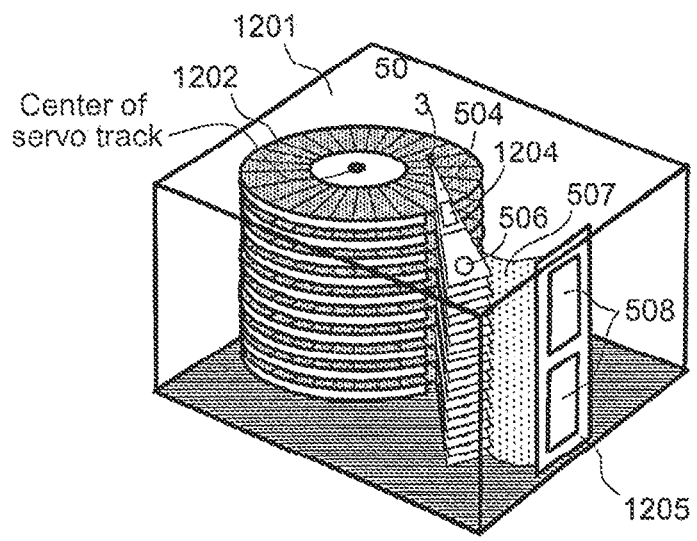
FIG. 25 is a conceptual diagram showing an exemplary media servo writer.

The media servo writer has a basic configuration similar to that shown in FIG. 7, using an external positioning equipment called a rotary positioner (encoder motor) or a laser length measurement equipment and a clock head that supplies a reference signal or a reference time signal. Herein as shown in FIG. 25, the mechanical part of part 1102 in FIG. 7 may be a configuration specific thereto, whereby high-quality servo information can be recorded at one time on a large number of magnetic recording media at low cost.

That is, similarly to FIG. 7, this media servo writer is directly coupled with an actuator 506. The rotary positioner (not illustrated) with a rotary encoder built therein to measure the rotary angle of the overall magnetic head (head stack assembly (HSA)) detects the position of the actuator, and an error between the detected position and a target position is fed-back to the rotary positioner, thus making a microwave assisted magnetic recording head 503 follow the target position. In such a following state, the magnetic head 503 records servo information as follows, the servo information being generated by a pattern generator of a servo information recording/reproducing controller while being in synchronization with a clock signal read from a clock pattern disk (not illustrated) provided beforehand at the lowermost part of a spindle 1200 using a clock head similar to FIG. 7 (not illustrated). In this example, the encoder may be directly coupled with the spindle 1200 and a spindle motor driving the same to measure the rotating angle of the perpendicular magnetic recording medium.

Figure 26:
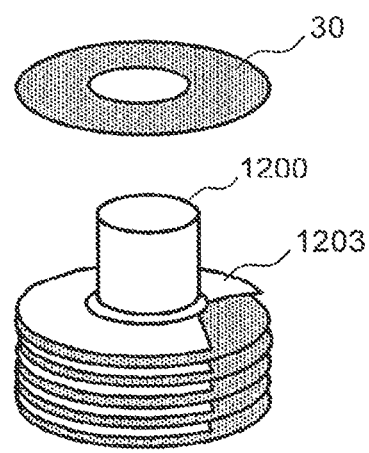
FIG. 26 is a conceptual diagram showing a state of magnetic disks being fixed to a spindle.

The media servo writer of the present embodiment includes: a He filling mechanism, a He sealing cover 1201, the magnetic head 503 having the same degree of MCW, MWW and MRW, having an ABS face stably floating with the floating amount of 4 nm or more and 12 nm or less under a He environment and including a TFC element, a microwave assisted magnetic recording head driving controller 508, a STW driving controller 1103, and a both-end supporting structured spindle capable of stably fixing 5 to 50 pieces of magnetic disks 30 via a disk flutter suppression plate 1203 (FIG. 26). The spindle preferably is both-end supporting structured.

Herein this perpendicular magnetic recording medium mounted at a magnetic storage device will have variations in MCW, MWW, MRW and the like of the magnetic head depending on the manufacturing process, and so three types of microwave assisted magnetic recording heads for high TPI, middle TPI and low TPI may be prepared for the servo writer, for example, and a magnetic recording medium including three types of servo information capable of absorbing and compensating such variations is preferably manufactured. Preferably, when being incorporated into a magnetic storage device actually, values of related recording conditions and the like are recorded at a predetermined area of the perpendicular magnetic recording medium, and such values are copied to the magnetic storage device during mounting to the device.

Figure 27:
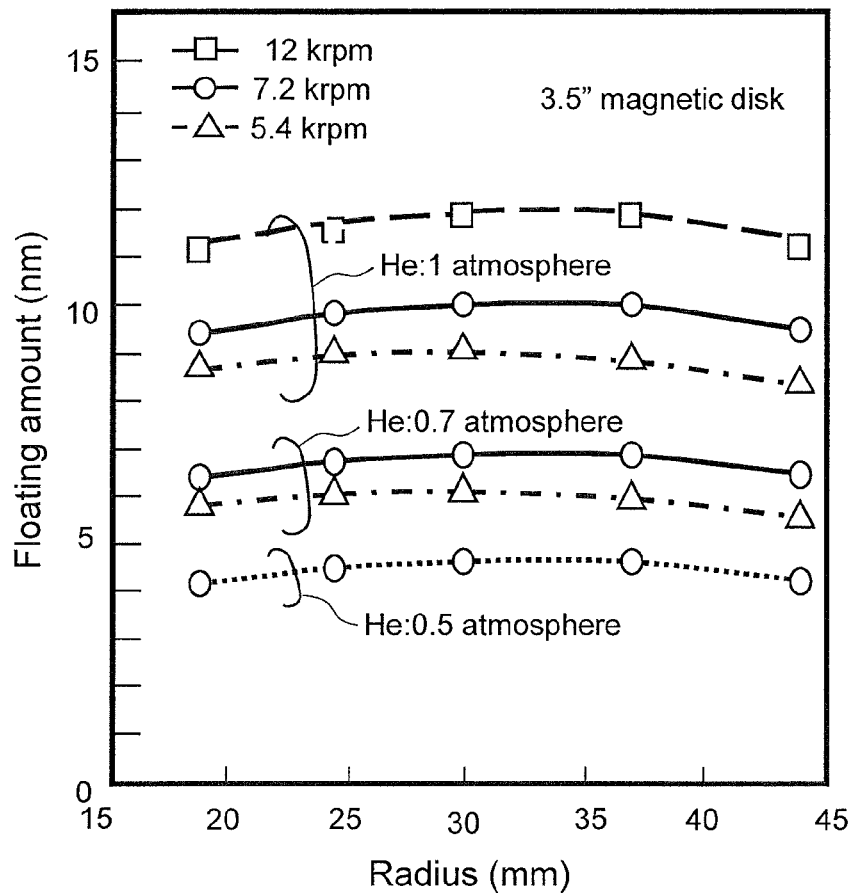
FIG. 27 shows typical floating characteristics of a magnetic head slider.

FIG. 27 shows typical floating characteristics of a magnetic head slider. The perpendicular magnetic recording medium used is a 3.5" magnetic disk. The horizontal axis of the drawing represents a radial position on the medium, and the vertical axis represents a floating amount. Setting the He filling pressure at 0.5, 0.7 and 1 atmospheric pressure and setting the rotating speed of the medium at 5.4 krpm, 7.2 krpm and 12 krpm, the floating characteristics are measured.

The both-end supporting spindle can suppress runout of the magnetic disk on the cover side, and the disk flutter suppression plate 1203 can suppress flutter vibrations of the magnetic disk by about 1 digit. The disk flutter suppression plate 1203 more preferably is provided at the lowermost face and the uppermost face as well of the magnetic recording medium. The suspension 504 provided with a vibration suppression damper 1204, the suspension provided with a dual stage actuator or a micro-actuator or the slider provided with a micro-actuator can improve the controllability for head driving.

For recording on a large number of magnetic recording media at one time as in the present embodiment, a recording duty ratio to record servo information is very high, and the magnetic head driving controller 508 generates heat greatly. From this state of servo information continuous recording, the head is stopped at one position to be in the state of continuous reproduction for adjustment of a track pitch, updating of a servo gain or the like. Then, the temperature of the magnetic head driving controller 508 decreases rapidly. This causes a head arm to be deformed by thermal expansion, and this thermal deformation unfortunately is recorded on the magnetic recording medium, and so a duty ratio of recording/reproducing has to be adjusted so as to suppress the temperature change. In the present embodiment, in order to minimize such an influence, the head driving controller 508 is attached on a cooling plate 1205 equipped with a cooling function, and further is connected via the FPC 507 with the magnetic head, thus thermally insulating from the arm as much as possible. As a result, even when the ratio of recording/reproducing is relatively high, a temperature change at the art is suppressed to about ±1° C.

(Microwave Assisted Magnetic Recording Head)

Figure 28:
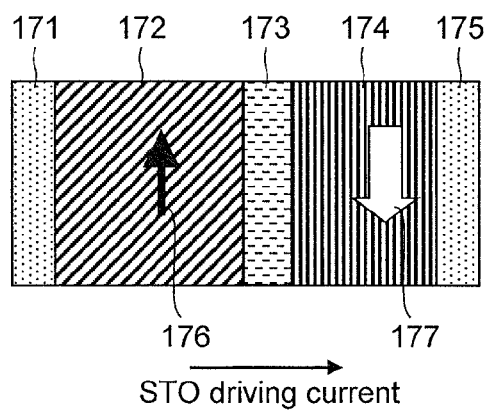
FIG. 28 is a schematic cross-sectional view showing a STO having an antiferromagnetic coupling structure.

Firstly a microwave assisted magnetic recording head having the basic configuration shown in FIGS. 2 to 4 and including a STO configured as shown in FIG. 28 is manufactured. That is, the STO includes: a FGL 172 made of magnetic alloy having negative perpendicular magnetic anisotropy such as $Fe_{04}Co_{0.6}$, $Fe_{0.01}Co_{0.99}$ or $Co_{0.8}Ir_{0.2}$, Heusler alloy such as CoFeGe, CoMnGe, CoFeAl, CoFeSi or CoMnSi or magnetic artificial super-lattice such as Co/Fe, Co/Ir, Co/Ni or CoFeGe/CoMnGe, the magnetization of the FGL being likely to be oriented effectively in a plane even considering demagnetizing field and a spin injection layer 174 configured so that magnetization is oriented in the film-surface direction, in which magnetization of the FGL 172 and the spin injection layer 174 are coupled antiferromagnetically via a non-magnetic intermediate layer 173 of 1 to 4 nm in thickness, made of a non-magnetic conductive material such as Au, Ag, Pt, Ta, Nb, Ir, Al, Si, Ge, Ti, Cu, Pd, Ru, Rh, Cr, Mo or W. Arrows 176 and 177 represent magnetization of the FGL 172 and the spin injection layer 174 that are coupled antiferromagnetically. This is configured, contrary to Embodiment 3 and typical STOs, so that driving current flowing from the FGL 172 to the spin injection layer 174 allows antiferromagnetic coupling of the magnetization and high-speed rotation of not only the FGL 172 but also the spin injection layer 174.

The spin injection layer is made of a material similar to that of the FGL and has a thickness smaller than that of the FGL. The FGL is designed so that the magnitude of magnetic anisotropic field resulting from materials and the magnitude of the effective demagnetizing filed in the direction perpendicular of the film surface of the spin injection layer are substantially the same in opposite directions. It is confirmed that such a configuration enables more stable oscillation even at a high frequency. The spin injection layer 174 and the FGL 172 have thicknesses of 3 to 30 nm preferably because such thicknesses enable stable coupling and high-speed rotation. In the drawing, 171 and 175 denote an under layer and a cap layer including a single-layer thin film, an alloy thin film made of Pt, Ir, Ru, Cr, Ta, Nb or Zr, or a lamination thin film of the foregoing. These layers 171 and 175 preferably have a larger film thickness, and appropriate thicknesses are set therefore with consideration given to balance with the recording gap length, which may be 1 to 15 nm for sufficient effects.

As stated above, the thus configured STO to rotate not only the magnetization of the FGL but also that of the spin injection layer at a high speed is close to linear polarization, and has oscillation magnetic field higher by about 10% and magnetic field gradient higher by about 10 to 20% immediately below the STO. As such, the STO is especially excellent in the compatibility with the ring-shape magnetic poles of FIGS. 2 to 4 that can generate intense bias recording magnetic field. The STO is actually configured to have the structure of FIG. 28, including the FGL 172 made of Fe/Co magnetic artificial super-lattice thin film of 12 nm in thickness; and the spin injection layer 174 made of Ni/Co magnetic artificial super-lattice of 9 nm in thickness having a smaller thickness than the FGL, which are laminated with Cu of 3 nm in thickness sandwiched therebetween. This STO is combined with the ring-shaped magnetic poles shown in FIGS. 2 to 4, which is configured to enable current application to the STO via magnetic poles 22 and 24. The recording gap length $G_L$ is 45 nm, the distance from the front end of the magnetic pole 22 to the FGL surface is 15 nm, and the STO element has a height of 40 nm. The FGL width $W_{FGL}$ is 36 nm (FIG. 2), 28 nm (FIG. 3) and 20 nm (FIG. 4) as described for FIGS. 2, 3 and 4.

(Servo Pattern and Recording Method Therefor)

Figure 29:
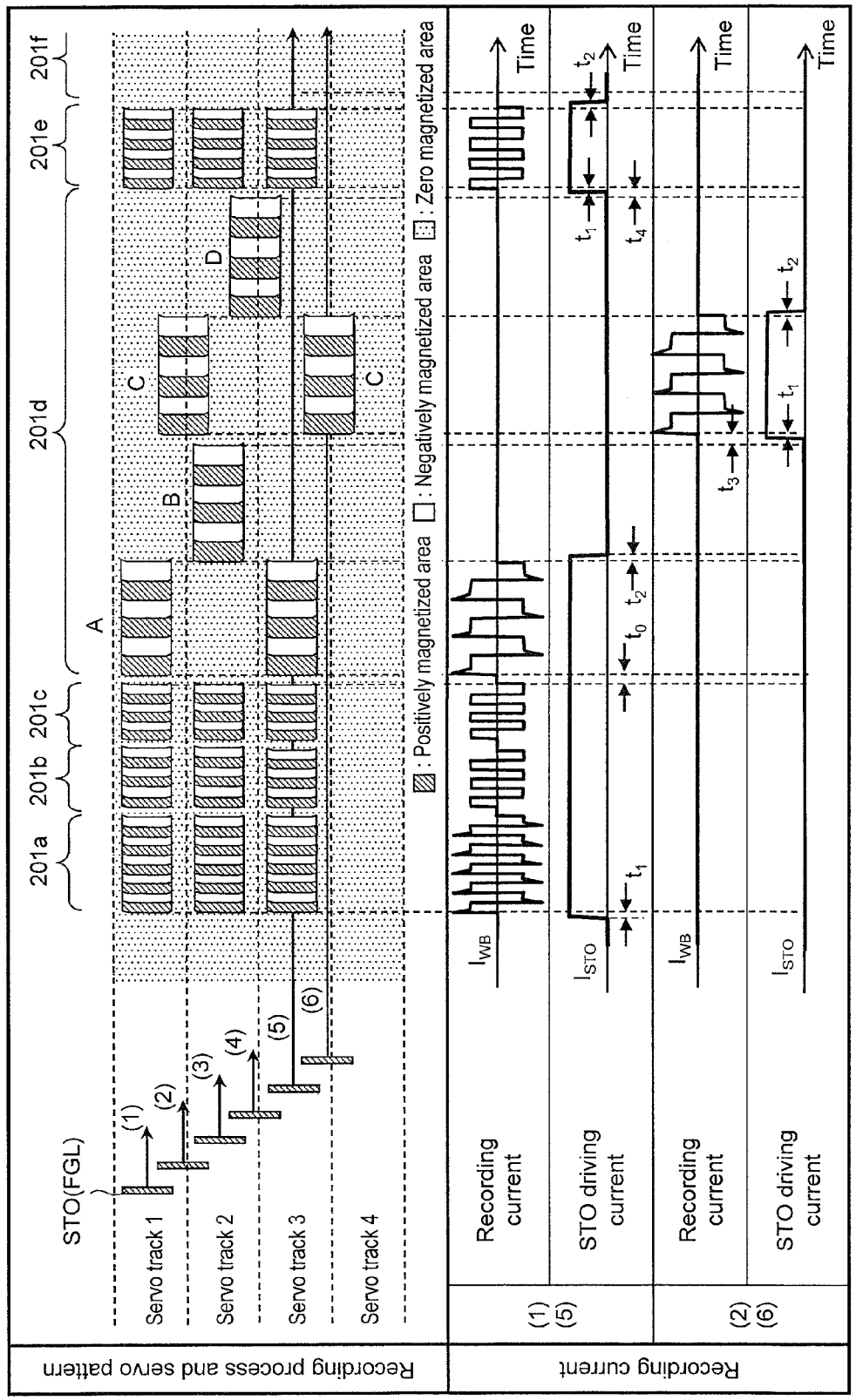
FIG. 29 shows an exemplary servo pattern and a timing chart for recording process thereof.

The present embodiment allows the characteristics of all magnetic heads such as reproduction output E, MWW, MCW, MRW and the like to be made uniform by strict screening conducted beforehand, and so an ideal servo pattern with less variation can be recorded. FIG. 29 shows the process chart of recording a servo pattern by a media servo writer of the present embodiment, describing the case of a servo pattern of a 4-burst pattern.

Forty pieces of perpendicular magnetic disks subjected to demagnetization beforehand are fixed to a rotary shaft of a spindle motor 1200 via a flutter suppression plate 1203 (FIG. 26), and a cover 1201 is provided, followed by substitution of the inside with He to be 0.7 atmospheric pressure (FIG. 25). Next, the spindle motor is rotary-driven at a predetermined number of revolutions so as to make the microwave assisted magnetic recording head float over the magnetic disks, and a predetermined pattern is recorded at a servo area by a method similar to those described in Embodiments 1 to 3. In the present embodiment, the servo information is recorded from the outer radius to the inner radius. $TP_{op}$ is 44 nm, 35 nm and 26 nm for FIG. 2, FIG. 3 and FIG. 4, respectively.

In servo track recording step (1), STO driving current $I_{STO}$ is applied duration $t_1$ before the timing of recording of a preamble pattern, and then $t_1$ afterwards, bias recording current at an appropriate predetermined frequency is applied to a ring shape magnetic core of the microwave assisted magnetic recording head. Thereby preamble servo parts 201a to 201c are recorded. Then $t_0$ afterwards, A servo burst pattern part at a servo burst pattern 201d is recorded. Next, after a lapse of B burst pattern recording time, predetermined delay time $t_3$, C burst pattern recording time, D burst pattern recording time and delay time $t_4$, a post servo part 201e of the same phase as the preamble is recorded. After a lapse of the delay time $t_2$ after the A burst pattern recording, the STO driving current applied is turned off, and at $t_1$ before the recording timing of the post servo part 201e, the current is applied again. Immediately after the recording at 201e, the bias recording current is turned off, thus stopping recording, and after a lapse of predetermined delay time $t_2$, the STO driving current is turned off.

The delay time $t_3$ is time that does not substantially demagnetize the C burst pattern recorded at step (2) during recording of B burst pattern at the subsequent step (3). Then, the delay time $t_4$ is time that does not substantially demagnetize the pattern 201e at the post servo part recorded at step (3) during recording of D burst pattern at the subsequent step (4).

Through this process, a servo burst pattern is recorded at track 1 so that their bits are in a continuous magnetization state. The drawing shows that the frequency of the bias current is $F_0/2$ during servo burst pattern recording and otherwise $F_0$, and similarly to Embodiment 5, the frequency of $F_0$ also during the servo burst pattern recording is preferable in terms of format efficiency.

After recording the servo information while rotating once, the actuator is driven to move the microwave assisted magnetic recording head in the track width direction by a half of a predetermined track pitch $TP_{op}$, from which the highest yield can be obtained with the magnetic storage device, and then the servo write step (2) is started. At the servo write step (2), the bias recording current is not applied to the ring-shape magnetic core of the microwave assisted magnetic recording head at a radius area corresponding to the preamble servo parts 201*a* to 201*c* of the perpendicular magnetic disk subjected to recording one rotation before, a radius area at the servo burst pattern A recorded one rotation before and the same radius area as the servo burst pattern B to be recorded at the step (3). Then, delay time $t_3$ afterwards, the bias recording current is applied to the ring-shape magnetic core, thus recording the servo burst pattern C, and the application of current is turned off. After lapse of $t_2$ after stopping of the current, the high-frequency driving current $I_{STO}$ also is turned off.

In the above process, overshoot is provided for the bias recording current waveforms only at the ISG part 201*a* and 201*d* that are most affected by the servo signal quality (S/N) in the 4-burst pattern so as to minimize a temperature rise of the head driver. As shown in the drawing, the STO driving current also is turned ON only at the range covering the bias recording current application part, thus shortening the current-application time as much as possible, thus securing STO lifetime. That is, the present embodiment provides FGL oscillation margin securing time of $t_1$ and $t_2$ before and after the bias driving current, respectively. Since the oscillation stabilization time is about 1 ns, the rising time of the STO driving circuit may be speeded up so that this time becomes about 1 to 2 ns. In terms of the format efficiency, $t_3$ and $t_4$ are preferably set at zero. Since the microwave magnetic head of the present embodiment can reduce the curvature and fringe of recording magnetization sufficiently, the time can be set at zero.

Hereinafter, every time the magnetic disk rotates, tracks 1, 2, 3 . . . are formed sequentially through the servo track recording steps (3), (4), (5) . . . . Similarly to Embodiments 1 to 4, servo information is recorded while changing a recording condition for each zone. This process is repeated at each zone, whereby a predetermined servo pattern is recorded at the entire radius of the magnetic recording medium.

In the servo pattern of the present embodiment, patterns at the ISG part, the preamble part, the gray code part and the like recorded are continuous patterns in the track width direction except for the separation due to side recording. As shown in the drawing, all of the patterns are selected so that the total sum of positive and negative magnetization becomes substantially zero. Then, $t_1$ and $t_2$ are about 1 to 30 ns, and $t_3$ and $t_4$ are approximately time required to record one bit of the preamble, the optimum values of which are found by an experiment beforehand for each of the microwave assisted magnetic recording head and for each zone of the corresponding perpendicular magnetic recording medium similarly to other recording parameters. The found values may be stored in the parameter table shown in FIG. 10, and may be stored during recording in a register provided at the head driving controller as needed and be used for recording at each zone. Herein, the servo pattern is generated by a servo information recording/reproducing controller of a media servo track writer. These values are preferably reevaluated and tuned with a predetermined program for each medium as needed. These parameters are recorded at a predetermined area of the perpendicular magnetic recording medium by a media servo writer, and are read for usage during the device manufacturing process.

Through this process, a 4-burst burst servo pattern at a constant pitch can be recorded so that the total sum of positive (+) and negative (−) magnetization at the servo part 201 becomes substantially zero, which includes a recording bit that is not separated at the entire area of the servo part and does not include a residual part of recording footprint left at the end part.

(Magnetic Storage Device)

Two of the perpendicular magnetic recording media and four microwave assisted magnetic recording heads are mounted at a 2.5" magnetic storage device shown in FIG. 15. Then, the perpendicular magnetic recording media undergo eccentricity correction in the manufacturing process, and thereafter the aforementioned information during servo write recording is read as needed, and similarly to Embodiment 2, characteristics of the microwave assisted magnetic recording heads such as adjacent interference characteristics, squeeze characteristics and 747 characteristics are evaluated, thus deciding the optimum data track profile and such linear recording density profile. Herein, similarly to Embodiment 2, the BPI profile described in Embodiment 1 is reduced by one level for the head having the worst performance (error rate) and instead the BPI profile is raised by one level for the head having the best performance, so that all of the heads have substantially the same error rate after the adjustment, thus satisfying predetermined areal recording density, and a conversion equation is found for each head from the servo track to the data track (adaptive formatting). A magnetic storage device of predetermined capacity stores parameters necessary for recording/reproducing in a memory, and their characteristics are evaluated.

(Advantageous Effects)

Since the servo track information during media servo writing is read by a magnetic storage device and is stored in a memory, tact time (cycle time) of the manufacturing process can be preferably shortened by 20 to 30 minutes when a perpendicular magnetic recording medium is incorporated to a magnetic storage device for adjustment and testing.

According to the servo information recording of the present embodiment, since microwave assisted magnetic recording heads used for servo writing can be the best ones selected for their characteristics and dimensions, an area (gap G of FIG. 16) to absorb and compensate the dimension variations of the magnetic heads can be narrowed compared with Embodiments 2 to 5. This corresponds to effectively widening of the MWW, and so MRW can be widened by the amount of widening the MWW based on the relationship of equation (2) described in Embodiment 2, and not only the reproduction sensitivity of the servo signal but also the S/N of the device can be improved by about 0.5 to 1 dB. Thereby, percentage defective of the magnetic head and the magnetic storage device during manufacturing can be decreased by 15 to 30%.

The media servo writer of the present embodiment can suppress windage vibrations of a suspension of the magnetic head, thermal variations of an arm or the like and flutter vibrations of the magnetic disk during servo information recording and so can suppress AC vibration components and DC deviations from being recorded on the perpendicular magnetic recording medium. As such, RRO in the perpendicular magnetic recording medium of the present embodiment can be reduced by 30% or more compared with the conventional techniques. Thereby, the devices configured as in FIGS. 2 to 4 achieves favorable high TPI performance of the data track density of 540 kTPI, 680 kTPI and 920 kTPI, respectively As stated above, the microwave assisted magnetic recording head especially has small degree of side writing and fringe, and can suppress various vibrating factors by a suspension with damper for vibration suppression, a dual stage actuator, a micro-actuator, a disk flutter suppression plate and the like. Further in the combination with a media servo writer of the present embodiment that writes servo information while reducing vibrations during servo pattern recording in He, excellent effect for higher track density is confirmed. In the magnetic recording medium of the present embodiment, which is mounted in a magnetic storage device, RRO deviation preferably may be compressed and recorded at another area, and may be copied to a memory of the magnetic storage device, whereby format efficiency can be improved by about 1 point and load of the magnetic storage device can be reduced.

A main pole/auxiliary pole type perpendicular magnetic recording in conventional techniques have large fringe effects, side writing and side easing on the outer radius and the inner radius sides of the perpendicular magnetic medium as shown in FIG. 40, and so it is very difficult to form a servo pattern for track density of about 500 kTPI or more even with a high-performance media servo writer. On the other hand, a servo pattern recorded by the media servo writing including the combination of the microwave assisted magnetic recording head and the manufacturing method of the present embodiment enables high-quality servo information of 540 kTPI or more to be recorded on a large number of perpendicular magnetic recording media at one time. As a result, without using a servo track writer requiring enormous equipment investment, a magnetic storage device can have high performance and achieve high device yields, and a magnetic recording medium with high-quality servo information can be manufactured at low manufacturing cost.

Embodiment 7

The present embodiment describes another method of forming a multi-spiral pattern and a servo pattern using the same by the microwave assisted magnetic recording head, the perpendicular magnetic recording medium and the media servo writer described in Embodiment 6.
(Servo Pattern and Forming Method Therefor)

Similarly to Embodiment 6, 50 pieces of 2.5" perpendicular magnetic recording media are mounted at a media servo writer, and a microwave assisted magnetic recording head is made to follow the target position (tracking). In this tracking state, similarly to (B) of Embodiment 4, a plurality of spiral servo seed patterns, e.g., about 200 to 500 patterns, are recorded at a constant speed from the outer radius to the inner radius. Herein, the microwave assisted magnetic recording head is position-controlled using a rotary positioner or a push-pin of the media servo writer. Similarly to Embodiments 4, 6 and the like, profile information similar to FIG. 10 found beforehand and radial direction positional information during the spiral pattern recording are used for recording while adjusting recording parameters such as TFC input power, STO driving current and bias recording current for each zone.

Such a perpendicular magnetic recording medium provided with the multi-spiral pattern is directly assembled to a magnetic storage device in the following, and similarly to (B) of Embodiment 4, a radially-arranged servo pattern is formed with the magnetic storage device by the SSW method. Alternatively, a final servo pattern may be formed similarly to (B) of Embodiment 4 using a media servo writer described in Embodiment 6, while setting, as an index, an index signal generated once from one rotation of the spindle motor or a rotary encoder or a signal from a predetermined one of spirals and using the multi-spiral pattern as a seed pattern, and such a servo pattern may be assembled to the magnetic storage device. Herein, the final servo area may be radially-arranged as in FIG. 7 or spiral, or may include the mixture thereof.
(Magnetic Storage Device)

Similarly to Embodiment 6, two perpendicular magnetic recording media provided with a multi-spiral servo pattern and four microwave assisted magnetic recording heads are mounted at a 2.5" magnetic storage device, and then the perpendicular magnetic recording media undergo eccentricity correction and recording parameters are adjusted, and 4-burst servo information is recorded by a servo track writer of self-servo writing (SSW) type or equipped with a microwave assisted magnetic recording control function. Herein, position error signal (PES) calculation is performed using an amplitude value for each time frame about a reproduction signal from a burst pattern of the multi-spiral pattern, and tracking of the microwave assisted magnetic recording head is performed based on this PES information. The above describes the case where the final servo pattern is a 4-burst pattern, but this may be a null or integrated servo pattern.

Next, at the final manufacturing process of the magnetic storage device, similarly to Embodiment 2 or the like, characteristics of the microwave assisted magnetic recording heads such as squeeze characteristics and 747 characteristics are evaluated using the recording parameters during the servo pattern recording as needed, thus deciding the optimum data track profile and such linear recording density profile. Thus, a magnetic storage device provided with a perpendicular magnetic recording medium with a multi-spiral servo pattern and a microwave assisted magnetic recording head and of predetermined capacity in adaptive formatting is prepared.
(Advantageous Effects)

A main pole/auxiliary pole type perpendicular magnetic recording in conventional techniques have large fringe effects, side writing and side easing on the outer radius and the inner radius sides of the perpendicular magnetic medium as shown in FIG. 40, meaning that much noise enters from an edge part, a positional signal quality of the spiral pattern is poor, and a servo pattern, formed using the spiral pattern as a seed pattern has insufficient S/N to be used as the track density of 500 kTPI or more. On the other hand, as can be understood from the results of FIGS. 13, 14, 16, 17, 22, 29, 34, 36 and the like, a multi-spiral pattern manufacturing method of the present embodiment using a microwave assisted magnetic recording head can form a spiral pattern with less noise entering from an edge part at both of the inner radius and the outer radius, having high S/N, and having a substantially uniform width at the entire radius. As a result, a servo pattern formed using this high-quality servo pattern as the seed pattern increases a linear response area of the position control signal by 10% compared with the conventional main pole/auxiliary pole type perpendicular magnetic recording.

The perpendicular magnetic recording medium of the present embodiment in combination with the microwave assisted magnetic recording head of the present embodiment are mounted at a magnetic storage device (HDA), and a servo pattern is formed by a servo track writer equipped with a microwave assisted magnetic recording head control function, thus configuring a magnetic storage device. In such a case, similarly to Embodiment 6 that forms a servo pattern directly by a media servo writer, RRO are reduced by about 30% compared with the conventional techniques. Thereby, the magnetic storage devices configured as in FIGS. 2 to 4 achieve high TPI performance of the data track density of 500 kTPI similarly to Embodiment 6, that is, of 525 kTPI, 665 kTPI and 890 kTPI, respectively Meanwhile, a perpendicular magnetic recording medium provided with a multi-spiral pattern created by the media servo writer of the present embodiment is mounted at a magnetic storage device, and servo information is recorded by self servo writing (SSW). Then, a reference pattern with less rotation jitter and in phase is favorably used as a seed pattern. As a result, compared with the method of Embodiment 4 performing the entire process including the formation of a seed pattern by SSW, propagation of side writing and side erasing and deterioration of S/N due to the propagation are suppressed by about 1 dB, and a servo defective sector and such a zone due to reproduction element variations are suppressed, which poses a problem in the self servo track writing SSW, and suppression of rotational delay due to writing error and re-reading is confirmed. As a result, positioning margin also is improved, resulting in designing of a wider track width of the magnetic head, and so the total manufacturing yield of the magnetic storage device is improved by 5 points or more from the method of Embodiment 4.

As stated above, a spiral pattern is formed by the media servo writer of the present embodiment provided with a microwave assisted magnetic recording head, and servo information is recorded using this spiral pattern as a seed pattern by SSW, whereby a perpendicular magnetic recording medium with high-quality servo information and a magnetic storage device provided with the same are successfully manufactured at a low equipment investment, and so such a configuration is especially preferable.

Embodiment 8

The present embodiment uses a media servo writer provided with a microwave assisted magnetic recording head having large MWW, and records a servo pattern by shingled magnetic recording.
(Microwave Assisted Magnetic Recording Head for Servo Writing and Perpendicular Magnetic Recording Medium)

For recording of servo information by singled magnetic recording, a microwave assisted magnetic recording head having a FGL width $W_{FGL}$ wider than the servo track pitch width is prepared.

A microwave assisted magnetic recording head having the basic configuration shown in FIG. 4 and having a configuration in the vicinity of its recording gap part 22 shown in FIGS. 30 to 33 is prepared. In FIGS. 30 to 33, the upper drawing is a sectional side view and the lower drawing is a view from the ABS face.

Figure 30:
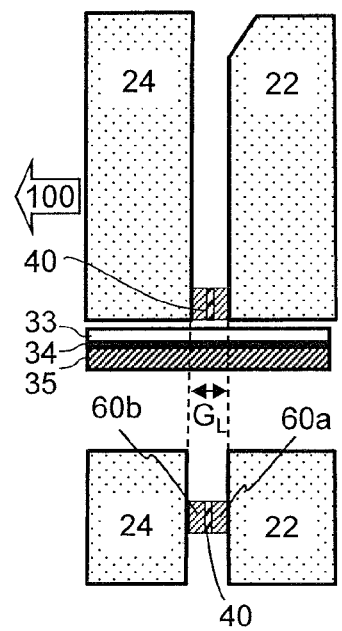
FIG. 30 shows an exemplary structure in the vicinity of a recording gap of a microwave assisted magnetic recording head.
Figure 31:
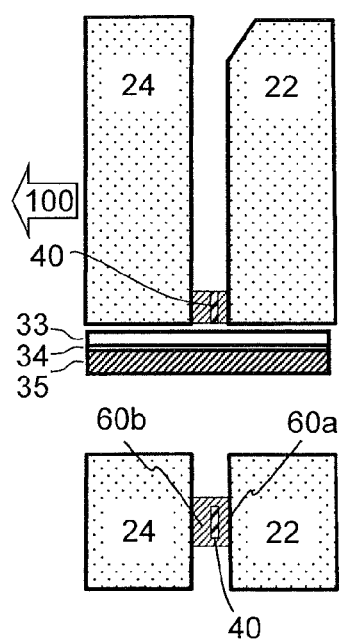
FIG. 31 shows an exemplary structure in the vicinity of a recording gap of a microwave assisted magnetic recording head.
Figure 32:
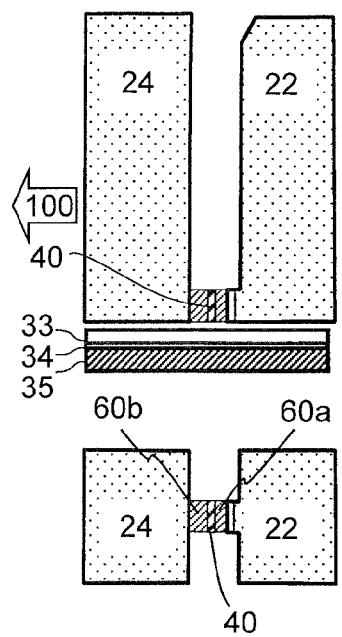
FIG. 32 shows an exemplary structure in the vicinity of a recording gap of a microwave assisted magnetic recording head.
Figure 33:
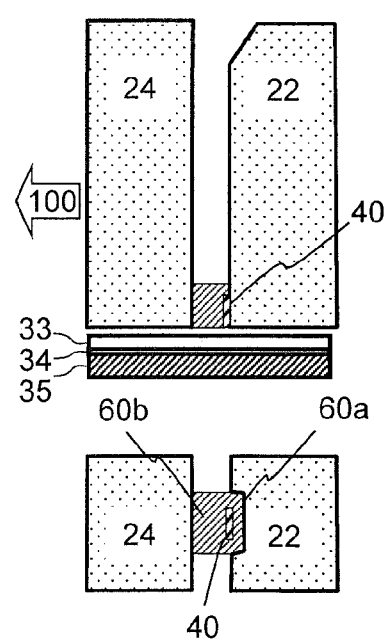
FIG. 33 shows an exemplary structure in the vicinity of a recording gap of a microwave assisted magnetic recording head.

In this example, first and second recording magnetic poles 22 and 24 are a single-layer of a soft magnetic layer made of CoFe having high saturation magnetic flux density formed by plating. FIG. 30 shows the structure where a STO 40 (especially FGL) is provided at a substantially center between the first and the second magnetic poles 22 and 24, thus utilizing a symmetric property of the recording magnetic field and the FGL. FIG. 31 shows the structure where a STO 40 (especially FGL) is positioned asymmetrically with reference to the gap center, for example, the FGL being provided in the vicinity of the first magnetic pole 22. FIG. 32 shows the structure where the first magnetic pole 22 has a protrusion having the same track width as that of a STO, and the STO 40 (especially FGL) in contact with the protrusion is provided at the substantially center between the first and the second magnetic poles or in the vicinity of the first magnetic pole, thus making a recording magnetic field area by recording magnetization and an assist magnetic field area of the FGL substantially agree with each other. FIG. 33 shows a structure where the first pole 22 has a recess wider than the track width of a STO 40, the STO 40 being substantially surrounded with the recess for steeper side magnetic field of the FGL.

Since the first and second magnetic poles 22 and 24 are used as STO driving terminals, the STO and the magnetic poles are electrically connected via conductive materials 60a and 60b, and a back gap part of the magnetic head (close to 27 of FIG. 1) is electrically insulated. Herein, the FGL has a width $W_{FGL}$ of 37 nm, the reproduction element has a width Twr of 15 nm, and the ring shape recording magnetic pole 22a has a width $T_{WW}$ of 100 nm.

Next, characteristics of the heads are evaluated in accordance with the flow shown in FIG. 8 with optimum parameters, using a recording/reproducing characteristics evaluation equipment (R/W tester) having the head driving controller of the present embodiment, whereby the heads with MWW of 39 nm, MCW of 42 nm and MRW of 19 nm are selected. The perpendicular magnetic recording medium used is a 2.5" perpendicular magnetic recording medium having the structure shown in FIG. 4. Herein, the slider ABS face of the microwave assisted magnetic recording head has a floating characteristic under a He environment shown in FIG. 27, and recording/reproducing characteristics also are evaluated under a He environment. Herein, the ABS face may be designed so as not to change between He and air environment, the recording/reproducing characteristics may be evaluated under an atmospheric environment.
(Servo Pattern Recording Process and Perpendicular Magnetic Recording Medium)

Firstly, data on yields during prototype fabrication or mass production about the magnetic storage devices described in Embodiments 1 to 5 are analyzed, and BPIs and TPIs, from which the highest manufacturing yield would be obtained with adapting formatting, are statistically analyzed, thus finding an optimum data track pitch (DTP).

Figure 34:
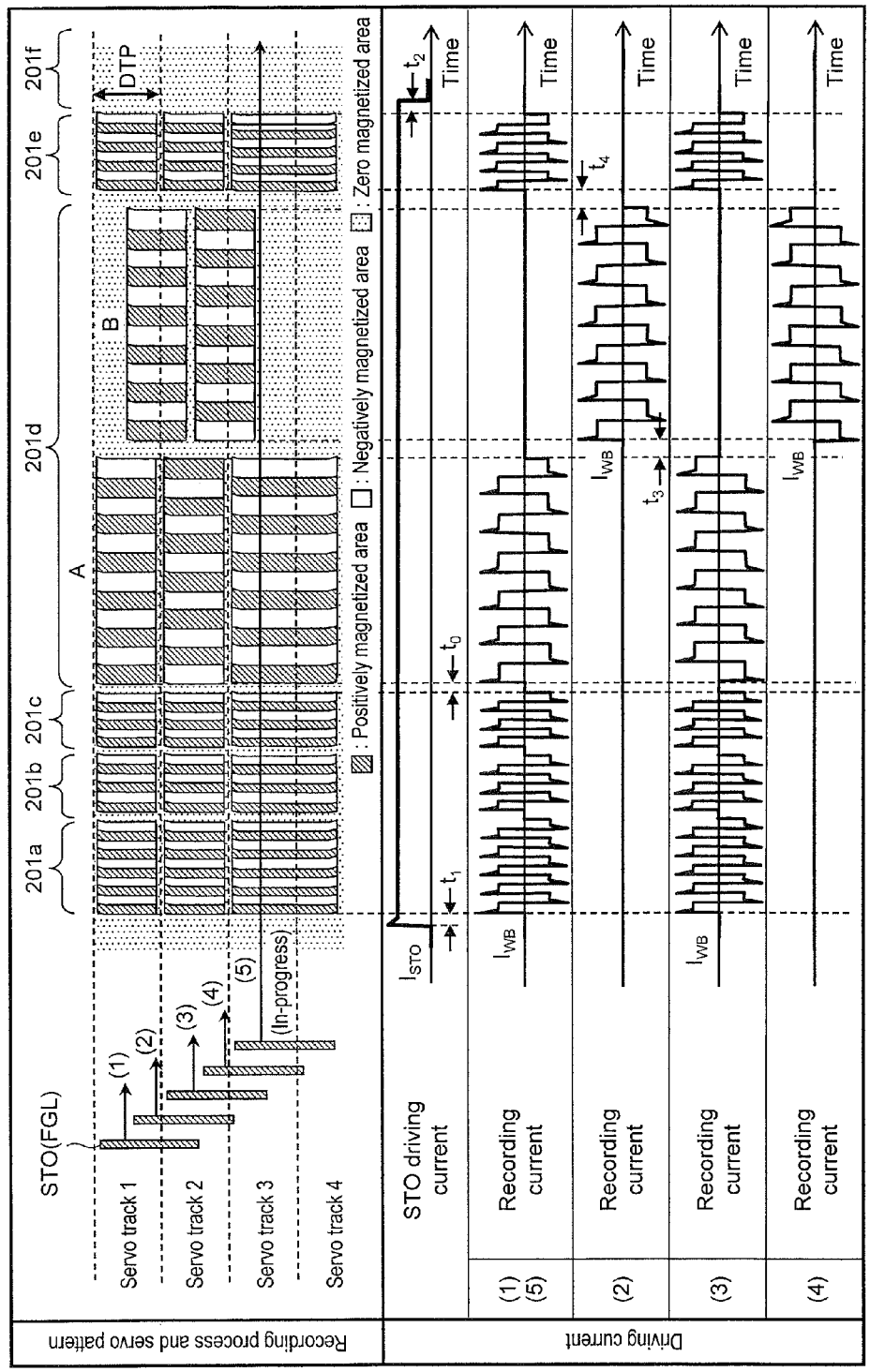
FIG. 34 is an exemplary servo pattern and a timing chart for recording process thereof.

The following describes the case where the data track pitch is 25 nm Referring to FIG. 34, the following describes the case of recording null burst servo information similar to FIG. 17 of Embodiment 3 on a perpendicular magnetic recording medium described in FIG. 4 using the aforementioned wide microwave assisted magnetic recording head with a track pitch of 25 nm.

The perpendicular magnetic recording medium is firstly demagnetized, and undergoes preparation similar to Embodiment 6, and thereafter a servo pattern is recorded toward the right of FIG. 34, following the steps (1), (2), (3), . . . using the microwave assisted magnetic recording head with a track pitch $TP_{op}$ of 25 nm. In the present embodiment, as shown in FIG. 34, STO driving current is turned ON during recording at all servo patterns 201a to 201e (including $t_1$ and $t_2$ before and after it), and burst recording current and STO driving current are provided with overshoot.

The shingled magnetic recording has a feature of using a wider (39 nm in MWW) microwave assisted magnetic recording head than the track pitch (25 nm), and so as shown in FIG. 34, for example, at step (5) to record servo track 3, servo information is recorded to extend to not only servo track 3 but also servo track 4. The bias recording current and the STO driving current are controlled similarly to the process of Embodiment 3 shown in FIG. 17.

As such, when recording servo information in servo track 1 at the first step (1) as well, the servo information is recorded to extend to not only servo track 1 but also servo track 2. After recording the servo information while rotating once, the microwave assisted magnetic recording head is moved in the track width direction by 12.5 nm that is a half of the track pitch (TP/2), and recording is performed at servo write step (2). At this time, since the current application timing at step (2) is not overlapped with step (1), the servo magnetization state at step (1) is not influenced.

When the microwave assisted magnetic recording head is further moved in the track width direction by 12.5 nm as a half track pitch for recording of the servo information at servo write step (3), however, recording current thereof has a phase opposite to the burst part but has current-application timing overlapped with step (1). Thus, such an overlapped part is over-written, so that predetermined servo information is recorded similarly to the case of FIG. 17. Through this process repeated for each zone, a predetermined null servo pattern is recorded finally except for several final servo tracks.

If needed, track pitch variation RRO may be evaluated by the media servo writer of the present embodiment, and corrected information may be recorded at a predetermined area or variations may be corrected. As can be understood from FIG. 34, the null servo pattern of the present embodiment can make the total sum of magnetization at the servo area substantially zero even without demagnetization performed firstly to the perpendicular magnetic recording medium.

(Magnetic Storage Device)

Microwave assisted magnetic recording heads to be mounted at a magnetic storage device are selected beforehand for each of the structures of FIGS. 30 to 33 so as to fit to the servo track width (25 nm) by recording/reproducing equipment, and such microwave assisted magnetic recording heads are mounted together with perpendicular magnetic recording media at the 2.5" magnetic storage device shown in FIG. 15. Three perpendicular magnetic recording media and six magnetic heads are mounted. Then, the perpendicular magnetic recording media undergo eccentricity correction in the manufacturing process, from which information on the servo write recording is read as needed, and similarly to Embodiments 1 and 2, characteristics of the microwave assisted magnetic recording heads such as adjacent interference characteristics, squeeze characteristics and 747 characteristics are evaluated, thus deciding an optimum data track profile and such linear recording density and finding a conversion equation from a servo track profile. Next, a data track profile is decided for each magnetic head and each zone based on this conversion equation, and an optimum track density and such a linear recording density profile are decided for each zone and each magnetic head so that all zones and all heads have a uniform error rate in the range satisfying predetermined areal recording density (adaptive formatting). Then, a magnetic storage device of predetermined capacity stores parameters necessary for conversion and recording/reproducing in a memory, and their characteristics are evaluated.

Instead of performing following (tracking) of a servo track by eccentricity correction, a data track including concentric sectors that is eccentric to the servo track center may be provided separately, and recording/reproducing may be performed by making the microwave assisted magnetic recording head follow the data track using the eccentricity amount and servo information.

(Advantageous Effects)

All of the magnetic pole structures of FIGS. 30 to 33 provide remanent magnetization of their servo patterns by the shingled magnetic recording type servo information recording shown in FIG. 34, in which the magnetization state reflects the shape of an end of the FGL footprint and is curved at the upper side of the recording bits (the side of starting recording of servo information, inner radius side in the present embodiment), but a part other than the part close of the footprint center is removed at the lower side (the side where the servo information is overwritten subsequently) to be more linear. The degree of curvature is the least in the magnetic pole structures of FIGS. 32 and 33, and then the structures of FIG. 31 and FIG. 30 follow. Since the curvature part decreases to half, noise information also decreases to substantially half compared with the servo pattern of FIG. 17, and their servo quality (S/N and phase) is improved by 0.5 dB in the structure of FIG. 30, by 0.7 dB in the structure of FIG. 31 and by 1 dB in the structures of FIGS. 32 and 33.

Further, since magnetization information of the servo pattern can be left at the entire track width, a gap area at the servo track boundary and at the servo track center can be narrowed, the gap area being for absorbing and compensating MCW distribution and positioning errors of all magnetic heads, compared with the case of FIG. 16 where servo information is recorded by a magnetic head having the average TPI performance (MCW). That is, the perpendicular magnetic recording media of the present embodiment can provide a very precise seamless servo information across almost the entire track width except for a side erasing area and an head position variation error. This means that, compared with the case of FIG. 16, the servo information reproduction signal at the preamble part and the servo burst part has improved quality by about 5 dB in the magnetic pole structure of FIG. 30, by about 5.5 dB in the magnetic pole structure of FIG. 31, by about 6 dB in the magnetic pole structures of FIGS. 32 and 33. Thereby the servo frequency can be improved 1.2 to 1.8 times as needed, and the servo area can be reduced by about 15 to 40%.

1.8" and 2.5" magnetic storage devices provided with two 1.8" perpendicular magnetic recording media and three 2.5" perpendicular magnetic recording media, respectively, each perpendicular magnetic recording medium including the servo pattern of the present embodiment can secure S/N (=about 16 dB) necessary for positioning with servo track density of 1 MTPI, data track density of 1.05 MTPI, thus enabling narrow track recording. The device yield obtained in the magnetic pole structures of FIGS. 32 and 33 is higher than the structures of FIGS. 30 and 31 by about 5 points.

When recording/reproducing is performed without performing following (tracking) of a servo track by eccentricity correction but by making the microwave assisted magnetic recording head follow the data track having the center at the rotating center, then vibrations in synchronization with the rotation hardly occur, and additionally high linearity is obtained with reference to positioning of the servo signal servo information recorded by the microwave assisted recording head. Such a method is compatible with the control method of the present embodiment, and so high-speed and precise positioning is enabled. Further, when a magnetic head has to be switched for recording/reproducing on a recording face of another magnetic recording medium, there is no need to stand by until the magnetic head follows the servo track (of the magnetic recording medium in another eccentric state during assembly), and so high-speed access is preferably enabled with a magnetic storage device including a plurality of magnetic recording media as well.

Embodiment 9

The present embodiment describes an example of recording, using a microwave assisted magnetic recording head having large MWW similarly to Embodiment 8, another servo pattern at the same track pitch $TP_{op}$ as the data track pitch by singled magnetic recording and using a media servo writer.

For instance, similarly to Embodiment 8, data on yields during prototype fabrication or mass production about the magnetic storage devices in Embodiments 1 to 5 are analyzed, and BPIs and TPIs, from which the highest manufacturing yield would be obtained with adapting formatting, are statistically analyzed, thus finding an optimum data track pitch. Then, since there is a possibility that the device capacity has to be reduced (downgraded) even with adaptive formatting due to variations of characteristics of the magnetic heads, a limit data track pitch leading to downgrade is found. As a result of the preliminary experiment, the upper and lower limit data track pitch obtained is within ±5% of the optimum data track pitch. The following describes the outline of the present embodiment by way of an example where the data track pitch of 38 nm gives the highest device yield and upper and lower limit data track pitches are 40 nm (+5%) and 36 nm (−5%), respectively.

(Microwave Assisted Magnetic Recording Head for Servo Writing)

Figure 35:
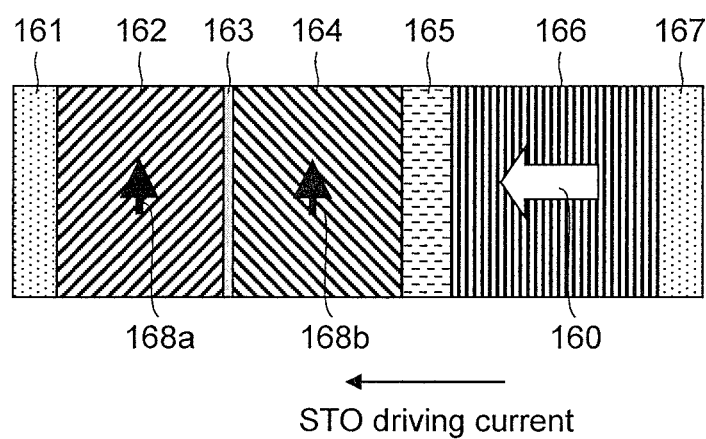
FIG. 35 is a schematic cross-sectional view of a STO of a laminated FGL structure.

In order to achieve the aforementioned specifications in the device configuration described referring to FIG. 4, a microwave assisted magnetic recording head for servo writing prepared is designed so that the magnetic core width $T_{WW}$ is 80 nm, the FGL width $W_{FGL}$ is 42 nm, and the reproduction element width Twr is 19 nm. The STO used has the structure shown in FIG. 35. That is, the STO includes: first and second FGL 162 and 164 made of magnetic alloy having negative perpendicular magnetic anisotropy such as $Fe_{0.4}Co_{0.6}$, $Fe_{0.01}Co_{0.99}$ or $Co_{0.8}Ir_{0.2}$, Heusler alloy such as CoFeGe, CoMnGe, CoFeAl, CoFeSi or CoMnSi or magnetic artificial super-lattice such as Co/Fe, Co/Ir, Co/Ni or CoFeGe/CoMnGe, the magnetization of the FGLs being likely to be oriented in a plane even considering demagnetizing field, these first and second FGLs being laminated via a coupling layer 163 made of a non-magnetic conductive material such as Au, Ag, Pt, Ta, Nb, Ir, Al, Si, Ge, Ti, Cu, Pd, Ru, Rh, Cr, Mo or W, while adjusting their film thicknesses so that the FGLs are coupled ferromagnetically, thus suppressing generation of a domain structure in the FGLs. Arrows 168a and 168b represent magnetization of the first and second FGL layers mutually strongly ferromagnetic-coupling, and arrow 160 represents perpendicular magnetization of a spin injection layer 166.

To the STO, driving current from a DC power supply is applied from the side of the spin injection layer 166, thus driving microwave oscillation of the FGL. Herein, the first and the second FGLs 162 and 164 preferably have a thickness of 2 to 25 nm in terms of suppression of a domain structure formation. In the drawing, 161 and 167 denote an under layer and a cap layer including a single-layer thin film, an alloy thin film made of Pt, Ir, Ru, Cr, Ta, Nb or Zr, or a lamination thin film of the foregoing, and 165 denotes an intermediate layer made of a non-magnetic conductive material such as Au, Ag, Pt, Ta, Ir, Al, Si, Ge, Ti, Cu, Pd, Ru, Cr, Mo or W.

The spin injection layer 166 is made of a material having perpendicular magnetic anisotropy, whereby oscillation of the FGL can be stabilized, and a magnetic artificial super-lattice material such as Co/Pt, Co/Ni, Co/Pd or CoCrPt/Pd is preferably used, for example. Although the stabilization of oscillation is slightly degraded, a material similar to that of the FGL may be used. The under layer and the cap layer preferably have a larger thickness, and appropriate thicknesses may be set therefor with consideration given to balance with the recording gap length, which may be 1 to 15 nm for sufficient FGL-oscillation stabilizing effects.

The coupling layer may have a lamination structure of CoFe and Cu or CoIr and Ta, for example, and favorable magnetic coupling is found for a specific thickness area such as Cu or Ta of 0.1 nm or more and 0.7 nm or less, 1.2 nm or more and 1.6 nm or less, or 2.7 nm or more and 3.2 nm or less, and the most favorable domain control effect is obtained from the thickness area of 0.2 nm or more and 0.6 nm or less. Similar domain control effects can be obtained from the lamination structure including a Co/Ni artificial super-lattice film and a Ta film, a Co/Fe artificial super-lattice film and a Cu film, a CoFeGe layer and an Au thin film, or a CoMnGe layer and an Ag thin film or three layers including CoMnGe and CoFeGe. Herein, the structure including Ag as an intermediate layer having a larger thickness is preferable. Although the intermediate layer including a magnetic thin film made of FeSi, NiFe or the like has a similar phenomenon, the domain structure suppression effect is not so large.

The STO is formed, including the first and the second FGL layers made of CoFeGe and Co/Fe of 10 nm in thickness, which are laminated via the coupling layer made of Cu or Ta of 0.2 nm, 0.3 nm, 0.4 nm, and 0.6 nm in thickness, to which the Co/Ni spin injection layer of 12 nm in thickness is laminated via a Cu layer of 2 nm in thickness, and the recording gap length $G_L$ is set at 40 nm. The distance from the front end of the magnetic pole 22 to the FGL surface is 10 nm, and the STO element has a height of 50 nm. $W_{FGL}$ is 42 nm.

Next, considering variations in manufacturing, MCW, MWW, MRW, $W_{FGL}$ E and the like of the microwave assisted magnetic recording heads of the present embodiment are evaluated, thus selecting magnetic heads satisfying the above required values as magnetic heads for servo writing. A perpendicular magnetic recording medium described referring to FIG. 4 is assembled onto a 3.5" Al alloy substrate of the media servo writer shown in FIGS. 25 and 26, and servo information is recorded by shingled magnetic recording using the aforementioned microwave assisted magnetic recording heads under a He environment. The microwave assisted magnetic recording head includes a slider ABS face having a floating characteristic under a He environment shown in FIG. 27, and recording/reproducing characteristics also are evaluated under a He environment. The ABS face may be designed so as not to change between He and air environment, and the recording/reproducing characteristics may be evaluated under an atmospheric environment.

(Servo Pattern Recording Process and Perpendicular Magnetic Recording Medium)

Figure 36:
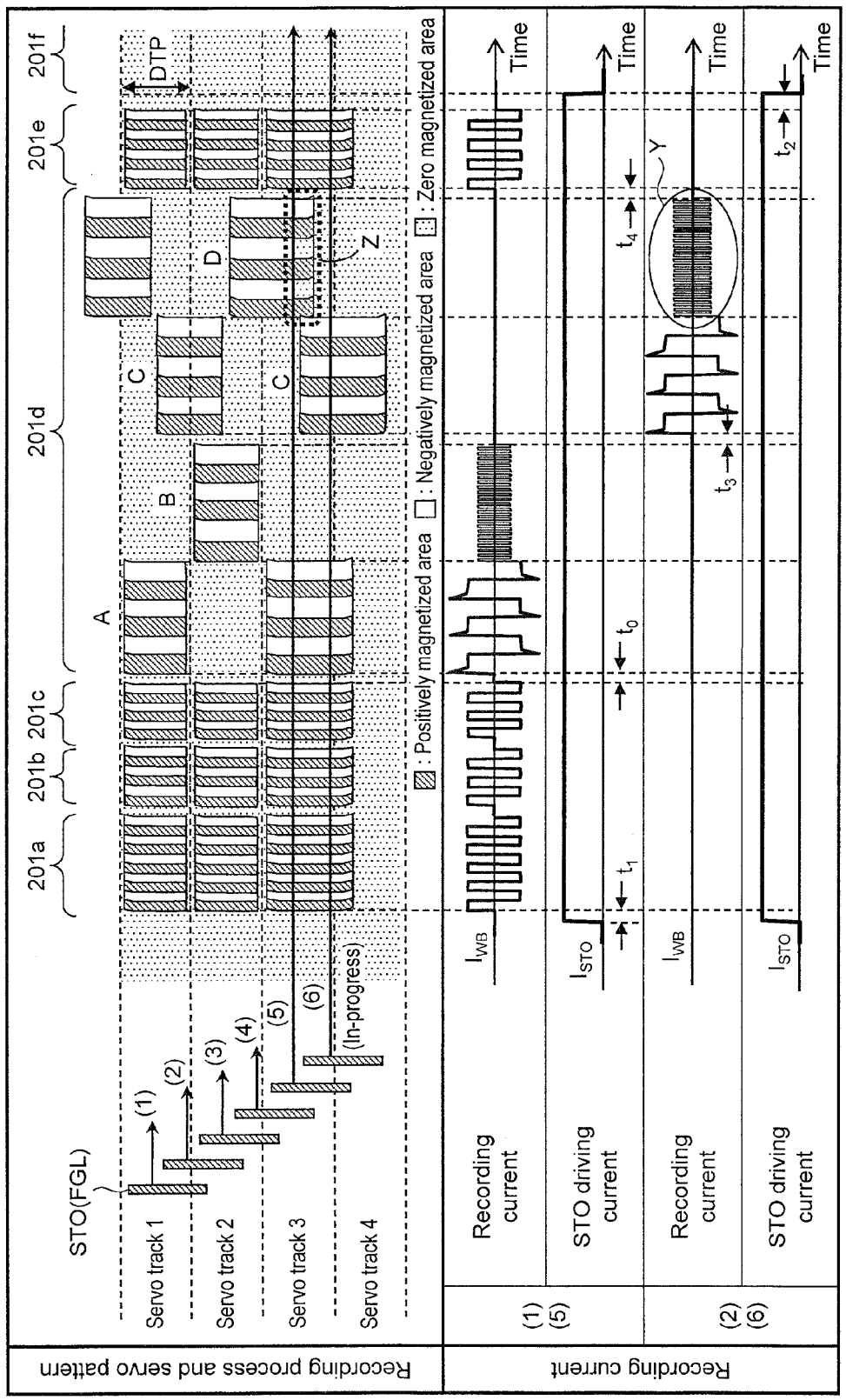
FIG. 36 shows an exemplary servo pattern and a timing chart for recording process thereof.

Referring to a timing chart, the following describes process of recording servo pattern with the same track pitch $TP_{op}$ of 38 nm as the data track pitch toward the right of FIG. 36 using a microwave assisted magnetic recording head.

Similarly to Embodiment 6, preparation is firstly performed. As shown in step (6) of FIG. 36, since a magnetic head selected has a MWW larger than the track pitch $TP_{op}$ by 6 nm, the lower Z part of D burst pattern written in step (4), for example, is left at the lower half of the servo track (3). Since this remaining part should not be left as servo information, AC demagnetization has to be performed therefor. To this end, the servo information recording/reproducing controller shown in FIGS. 7 and 19 is equipped with a function of applying current at a frequency $F_m$ that is at least higher than the servo frequency and more preferably higher than the maximum frequency of the data recording. Then, at the current application step (6), current at the high frequency $F_m$ is applied to the magnetic core at the position of the remaining part Z (current application part Y), whereby as shown in the servo tracks 1 and 2 of FIG. 36, seamless servo information can be recorded without waste at the entire track width so as to be more linear than the servo patterns of FIGS. 22 and 29. Then, a servo pattern is recorded similarly while setting the track pitch at 40 nm and 36 nm.

According to the above process, the servo pattern has the remanent magnetization longer than the track width of the reproduction head in the track width direction compared with the case of FIGS. 22 and 29, and so has high resistance against disturbance vibrations during positioning. Further, the servo pattern is more linear on the bit lower side (the side where the servo information is recorded subsequently) and so has less average phase shift. On the upper side of the drawing (the side of starting recording of servo information, inner radius side in the present embodiment), the recorded magnetization region is curved.

Through this process, a perpendicular magnetic recording medium formed has the same servo track pitch as the data track pitch during mass production. Herein, various characteristics parameters used for recording by the media servo writer of the present embodiment are recorded at a predetermined area of the magnetic recording medium.

(Magnetic Storage Device)

In the adaptive formatting, due to variations in track width of a plurality of microwave assisted magnetic recording heads mounted, the data track pitch is larger than the servo track pitch by the amount necessary for securing linearity of the servo information. In the present embodiment, the servo information is recorded separately by shingled magnetic recording, and the servo track pitch can be made larger up to the data track pitch as a limit value thereof. Thus, as can be understood from the relationship of equation (2) between MRW and the track pitch TP, the MRW can be widened by the amount corresponding to a half of the increase in TP as described in Embodiment 2.

Next, microwave assisted magnetic recording heads to be assembled into a magnetic storage device are separately prepared as prototypes, the microwave assisted magnetic recording heads having $W_{FGL}$ of 33 nm and $T_{wr}$ of 19 nm. Then, the heads with MCW of 38 nm and MRW of 23 nm are selected using a recording/reproducing characteristics evaluation equipment (R/W tester). Then, ten of the selected microwave assisted magnetic recording heads and five 3.5" perpendicular magnetic recording media each having a servo pattern of the present embodiment are mounted at a magnetic storage device.

In the manufacturing process of the magnetic storage device, eccentricity correction of the perpendicular magnetic recording media is firstly performed, and then the above-mentioned parameters are read and stored in a memory. Using these parameters, similarly to Embodiments 1 and 2, characteristics of the microwave assisted magnetic recording heads such as adjacent interference characteristics, squeeze characteristics and 747 characteristics are evaluated, thus deciding an optimum data track profile and such linear recording density and finding a conversion equation from a servo track profile. Next, a data track profile is decided for each magnetic head and each zone based on this conversion equation, and an optimum track density and such a linear recording density profile are decided for each zone and each magnetic head so that all heads have a uniform error rate in the range satisfying predetermined areal recording density (adaptive formatting) in all zones. Then, a magnetic storage device of predetermined capacity stores parameters necessary for conversion and recording/reproducing in a memory, and their characteristics are evaluated. Similarly to Embodiment 8, the eccentricity amount may be found, and the device may be operated based on a data track having the center at the rotating center.

The magnetic storage device of the present embodiment is filled with He, and the case is sealed, whereby a He-filled magnetic storage device is configured.

(Advantageous Effects)

According to the present embodiment, similarly to Embodiment 8, a gap area both at the servo track boundary and the servo track center can be narrowed, the gap area being for absorbing and compensating MCW distribution and reducing positioning errors of a plurality of microwave assisted magnetic recording heads, and so high-quality seamless servo information can be recorded at almost the entire servo track without waste. This means that the servo information reproduction signal at the preamble part and the servo burst part is improved by 5 to 6 dB similarly to Embodiment 8. Then, a magnetic storage device including the magnetic recording medium of the present invention achieves high positioning precision and has reduced rotational delay due to reading error and writing error for improved performance. The servo frequency also can be increased to 1.2 to 1.8 times, and in this case the servo area can be reduced by 15 to 40%, thus improving margin of the device capacity.

The present embodiment enables MRW to be designed wider than Embodiments 1 to 5 by 3 to 8%, and increases yields of the magnetic head by about 5 points. The present embodiment further increases S/N of a reproduction signal and so increases yields of the magnetic storage device by about 5 points. The present embodiment still further increases reproduction S/N by about 0.5 dB and thus increases recording density of the magnetic storage device.

A perpendicular magnetic recording medium, on which a servo track is formed beforehand at the above-stated optimum track pitch, secures servo track density of 689 kTPI and data track density of 689 TPI to 650 kTPI, and so can secure S/N (=about 13 dB) necessary for a servo function, and thus a magnetic storage device having a data track pitch that is 1 time or more and 1.06 times or less of the servo track pitch can be configured. This is preferably because signal quality is improved and track correction process is simplified, and so performance relating to the device positioning can be increased by several points.

When magnetic heads selected beforehand have the values of MWW and MCW with variation beyond ±5% of the aforementioned optimum value (i.e., more than 1.05 times larger or less than 0.95 times smaller than the aforementioned optimum value), then the magnetic heads may be combined with a medium provided with the aforementioned limit track pitch pattern, whereby the utilization rate of the magnetic heads can be increased by about 10 points.

In the case of a He-filled device, a data track pitch enabling the highest yield during mass production can be reduced by about 1 nm, whereby the data track density and the device capacity can be increased by about 3 points. Further the He-filled magnetic storage device of the present embodiment achieves high positioning precision in the actual usage as well, whereby seven magnetic recording media achieves positioning precision equivalent to the case including conventional five magnetic recording media.

Embodiment 10

The present embodiment describes a servo pattern compatible with shingled recording, a perpendicular magnetic recording medium with the servo pattern recorded thereon and a magnetic storage device.

(Magnetic Storage Device)

The microwave assisted magnetic recording heads described in Embodiments 8 and 9 and a perpendicular magnetic recording medium in a demagnetization state in which no servo information is recorded are assembled to 2.5" and 3.5" magnetic storage devices, and similarly to Embodiments 1 to 5, servo information is recorded by shingled magnetic recording similar to Embodiments 8 and 9, thus making a shingled magnetic recording type magnetic storage device.

(Advantageous Effects)

Although the microwave assisted magnetic recording heads included in the magnetic storage device have variations in FGL width, shingled magnetic recording/reproducing enables the same data track pitch as the servo track pitch on the perpendicular magnetic recording medium of the present embodiment. Further recording/reproducing with wider FGL increases an error rate of the recording data by 2 dB, preferably resulting in increases of the device yield with the same capacity by 8 points and 4 points compared with the magnetic storage devices of Embodiments 8 and 9, respectively, not performing shingled magnetic recording of data.

Embodiment 11

The present embodiment describes a servo pattern by a microwave assisted magnetic recording head having another structure of a recording magnetic pole and a magnetic storage device.

(Microwave Assisted Magnetic Recording Head for Servo Writing)

Figure 37:
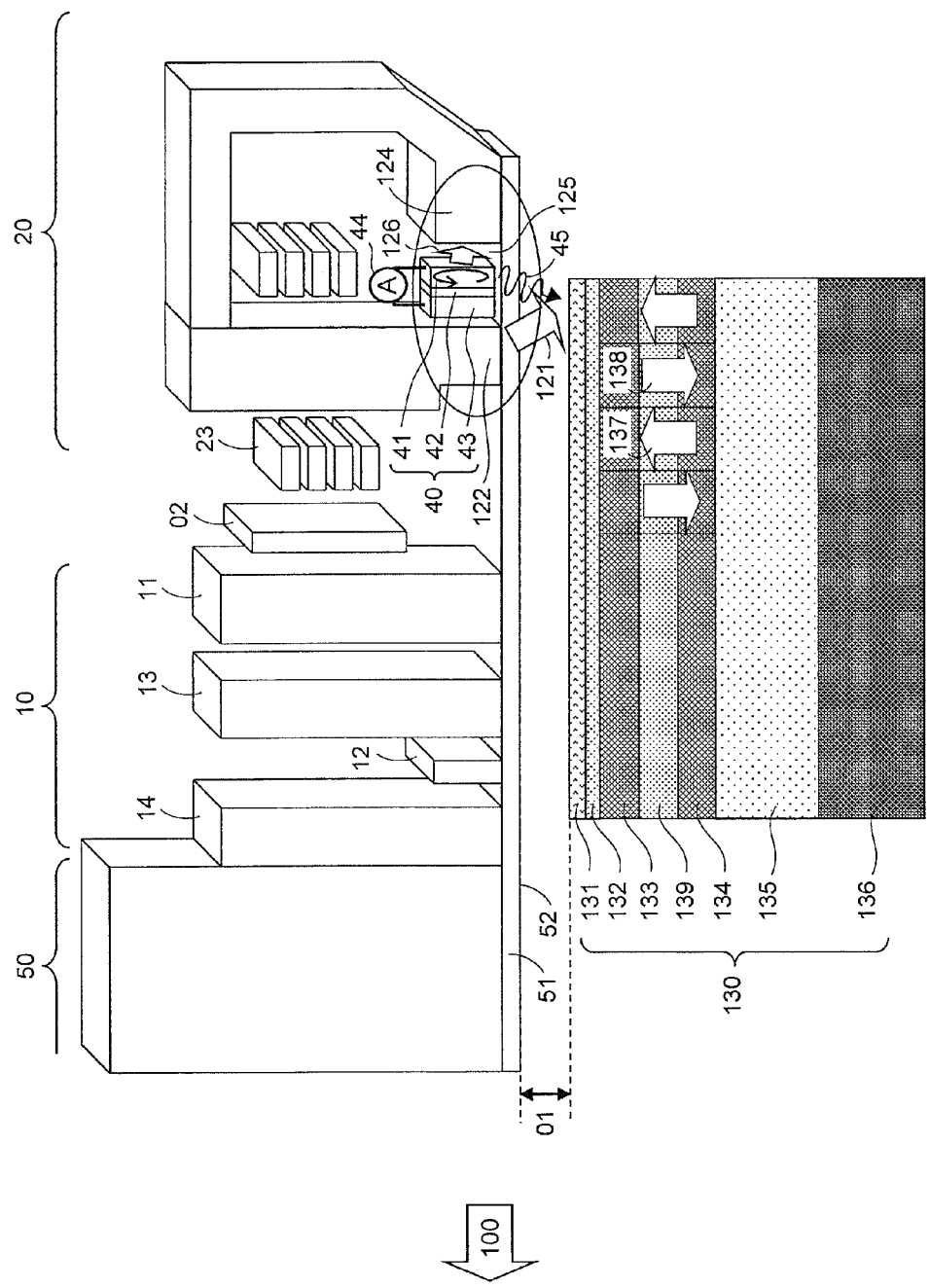
FIG. 37 is a conceptual diagram showing exemplary magnetic head and perpendicular magnetic recording medium.

FIG. 37 shows a structure of a microwave assisted magnetic recording head of the present embodiment and schematically shows a cross-section of a perpendicular magnetic recording medium of the present embodiment. This microwave assisted magnetic recording head has a basic configuration similar to that of Embodiments 1 to 10 (FIG. 1) other than recording magnetic poles, including a slider 50, a head protective layer 51, a floating face 52, a STO 40, a reproduction head part 10, a magnetic shield layer 11, a reproduction sensor element 12, upper and lower magnetic shields 13 and 14 and a TFC element 02 and the like.

Figure 38:
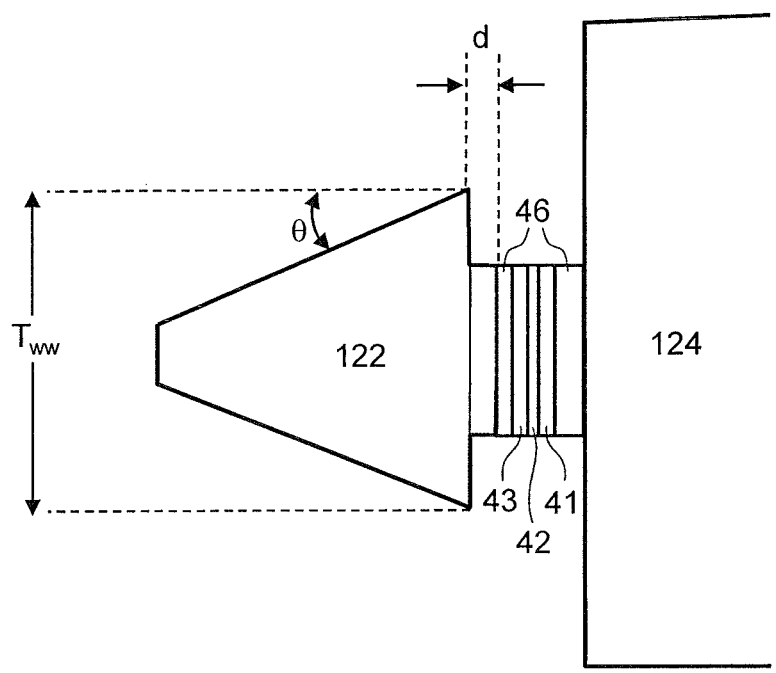
FIG. 38 shows a structure of a magnetic pole part viewed from the ABS face.
Figure 39:
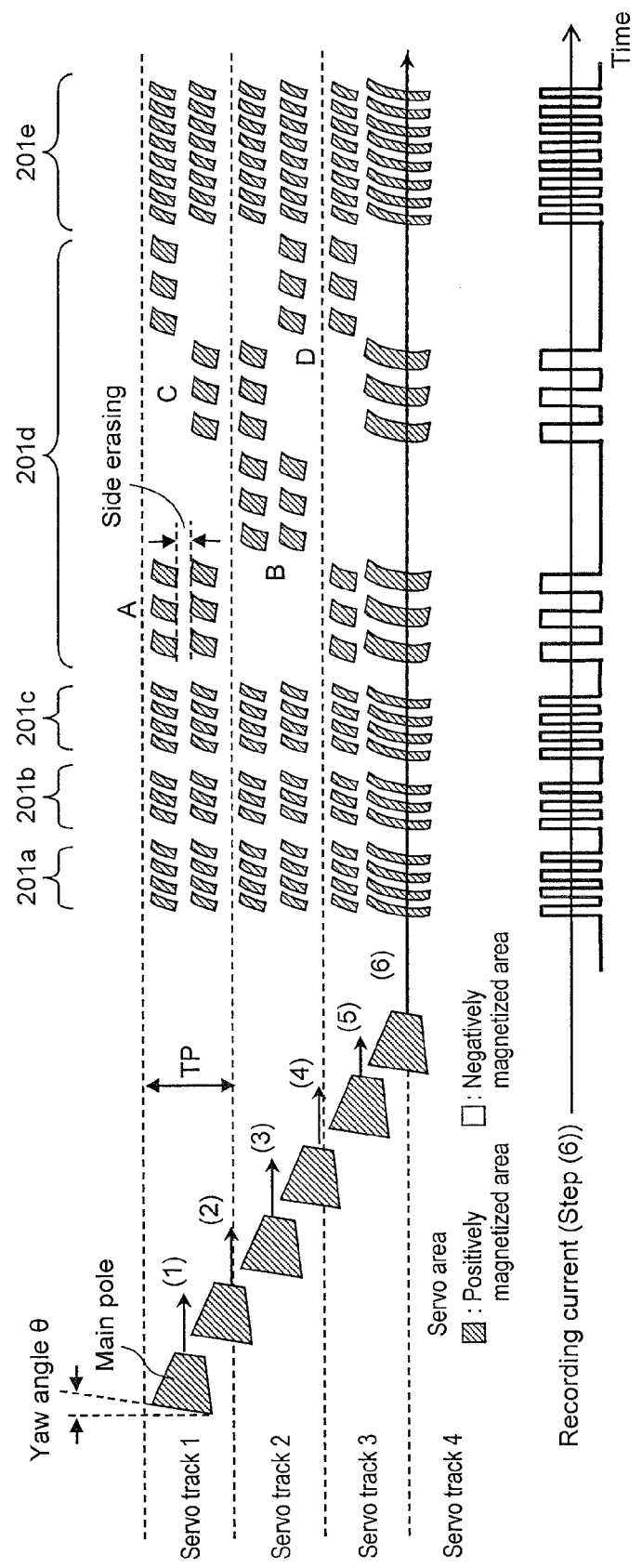
FIG. 39 shows a servo pattern including a side erasing area and a timing chart for recording process thereof by a conventional main-pole type perpendicular magnetic recording head.

FIG. 38 shows a structure of a magnetic pole part viewed from the ABS face, and as shown in this drawing, a magnetic recording head part 20 includes: a recording magnetic pole (main pole) 122 that is formed by etching to have a substantially same width as the STO and is shaped at the STO part so as to generate perpendicular recording field 121 having a substantially same width as that of high-frequency magnetic field; a shield magnetic pole 124 to control a magnetization rotating direction or the like of the high-frequency magnetic field oscillating element 40; and a coil 23 made of Cu or the like to excite the recording magnetic pole. The etching depth d is about 5 to 40 nm, preferably 10 to 20 nm in terms of balance between magnetic field distribution and magnetic field intensity. A magnetic gap 125 is provided between the recording magnetic pole 122 and the shield magnetic pole 124, and oscillation control magnetic field 126 controls the magnetization direction and the magnetization rotating direction of the high-frequency magnetic field oscillating element 40.

The recording magnetic pole 122 includes a soft magnetic film with high-saturation magnetic flux density made of FeCoNi, CoFe alloy or the like, which is formed by plating, sputtering or the like so as to have a trapezoidal shape having a bevel angle of 10 to 20 degrees and have a cross-sectional area decreasing with increasing proximity to the ABS face. The width $T_{ww}$ of the recording element on the wider side of the trapezoidal recording magnetic pole is designed and processed suitably for the target recording magnetic field and such recording density, and the size thereof is about 160 nm to 10 nm. The recording magnetic pole 122 may have a so-called Wrap Around Structure (WAS), in which the recording magnetic pole 122 and the shield magnetic pole 124 are formed with a soft magnetic alloy thin film such as CoNiFe alloy or NiFe alloy, and the recording magnetic pole 122 is surrounded via a non-magnetic layer.

A perpendicular magnetic recording medium 130 includes three magnetic layers of 133, 139 and 134, where the outermost face layer receiving the strongest microwave assist effect has large anisotropic magnetic field Hk, and elements and thickness of the magnetic films are adjusted so that recording cannot be performed sufficiently with recording magnetic field from the recording magnetic field and sufficient recording is enabled only when the STO 40 currently acts.

The following describes structures and elements of the microwave assisted magnetic recording head and the perpendicular magnetic recording medium of the present embodiment.

slider 50: thin long femto type (1×0.7×0.2 mm)

FCAC 51: 1.8 nm sensor element 12: TMR (Twr=30 nm)

first recording magnetic pole 122: FeCoFe($T_{WW}$=60 nm), d=15 nm, θ=15° second recording magnetic pole 124: FeCoNi

STO 40: Ta(4 nm)/Co/Fe(12 nm)/Cu(2 nm)/Ni/Co(8 nm)/Cr(4 nm)

FGL width: $W_{FGL}$=34 nm medium substrate: 3.5-inch NiP plated Al alloy substrate medium structure: lubricant film (1 nm)/C (2 nm)/CoCrPtB(SiTi)O$_2$ (4 nm)/CoCrPt (SiTa)O$_2$ (4 nm)/CoCrPtSiO$_2$C (4 nm)/Ru (10 nm)/CoFeTaZr (10 nm)/Ru (0.5 nm)/CoFeTaZr(10 nm)

Although not shown in FIGS. 37 and 38, for improved controllability of film quality and film properties of the spin injection layer and the high-frequency magnetic field generation layer and their oscillation efficiency and reliability, an under layer and a cap layer including a single-layer thin film, an alloy thin film made of Cu, Pt, Ir, Ru, Cr, Ta, Nb or the like, or a lamination thin film of the foregoing may be provided above and below the spin injection layer. Since the STO 40 is formed after the formation of the reproduction element 12, the manufacturing process thereof preferably is performed so as not to adversely affect the characteristics of the reproduction element. In FIG. 37, a driving current source (or voltage source) and an electrode part of the STO are schematically represented with reference numeral 44, and the recording magnetic poles 122 and 124 may be used as electrodes by magnetically coupling the recording magnetic poles 122 and 124 with the rear-end part of the magnetic head but electrically insulating and further by electrically connecting them with the side face of the STO at the gap. As shown in the drawing, the magnetic head slider 50 is provided with a TFC 02 including a NiCr thin film with resistance of 80Ω for clearance control. Microwaves 45 from the microwave assisted magnetic recording head of the present embodiment is circularly polarized on both sides of the FGL film and is linear polarized just thereunder, and has typical oscillation frequency of 20 to 30 GHz and typical microwave magnetic intensity is 1 kOe to 2 kOe.

Two perpendicular magnetic recording media in a demagnetization state and four microwave assisted magnetic recording heads or four perpendicular magnetic recording media in a demagnetization state and eight microwave assisted magnetic recording heads are mounted at a 3.5" magnetic storage device, thus forming the perpendicular magnetic recording media with servo information recorded thereon similarly to Embodiments 1 to 5. Through this process, servo pattern recorded is such that a residual part of recording footprint left has a size that can be substantially ignored, the total sum of positive (+) and negative (−) magnetization at the servo part 201 becomes substantially zero, magnetization information (sequence) providing servo information is seamless at the servo area and the servo pattern has a substantially constant pitch. Similarly to Embodiments 1 to 5, a data track is decided by adaptive formatting in the manufacturing process, thus making a magnetic storage device.

(Advantageous Effects)

The microwave assisted magnetic heads of the present embodiment have the thickness of the STO part of 30 nm and the etching amount at the main pole of 15 nm, and so they are sufficiently thin that is a fraction of the conventional main pole thickness (100 to 200 nm), leading to high pattern-fabrication precision by lithography and reducing variations of the recording track width and MCW to ½ or less of the conventional main pole. Further, side erasing width ΔE and the fringe effect also can be reduced to about ½ of the conventional perpendicular recording head, and so variations in the track width and MCW of a plurality of magnetic heads mounted at the magnetic storage device can be absorbed and compensated adaptively at a high rate than the device using conventionally magnetic heads, and a TPI profile in the radial direction of the data track can be set with reference to TPI of the servo track with margin for each magnetic head. As a result, in the case of four heads and the servo track density of 575 kTPI, data track density of 514 to 542 kTPI can be achieved with high yield of 85% or more, and in the case of eight heads and the servo track density of 560 kTPI, data track density of 500 to 528 kTPI can be achieved with high yield of 80% or more. In both cases, a magnetic storage device of high density track of 500 kTPI or more can be obtained, and further the servo track pitch thereof can be made 1.06 times or more and 1.12 times or less of the data track pitch.

As stated above, the microwave assisted magnetic recording head of the present embodiment has less variation in MCW and has a track pitch with less difference between the data track and the servo track compared with the conventional techniques. Thus, the conversion equation (reference curve) from the servo track to the data track can be simplified from a fifth to seventh-order conversion equation to a second to fourth-order conversion equation, and so calculation load necessary for positioning can be reduced and complicated positioning operation can be shortened. Thus, a magnetic storage device provided with a microwave assisted magnetic recording head of the present embodiment and provided with a perpendicular magnetic recording medium having a servo pattern of the present embodiment can shorten the access time to a data track, and so the performance of the device can be improved by about 2 points. This effect is preferably notable for a large-capacity magnetic storage device including eight heads for enterprise use, which have been demanded rapidly and increasingly these days.

In this way, a servo pattern, a magnetic recording medium, a servo track writer and a magnetic storage device of the present invention have a lot of excellent performance compared with conventional ones, and especially recording density including track density can be greatly improved as explained. Then, a high-capacity magnetic storage device that is reliable about performance of positioning and manufacturing yields can be provided. Further, since the servo pattern hardly includes an extra curvature area and such a recording footprint area, the format efficiency is high, and additionally since the data track pitch and the servo track pitch can be made substantially the same, a high-capacity and high-performance magnetic storage device without degraded performance due to rotational delay or the like can be provided.

The present invention is not limited to the above-described embodiments, and may include various modification examples. For instance, the entire detailed configuration of the embodiments described below for explanatory convenience is not always necessary for the present invention. A part of one embodiment may be replaced with the configuration of another embodiment, or the configuration of one embodiment may be combined with the configuration of another embodiment. The configuration of each embodiment may additionally include another configuration, or a part of the configuration may be deleted or replaced.

REFERENCE SIGNS LIST

02: Thermal Flying Height Controller (TFC)
10: Reproduction head part
12: Reproduction sensor element
20: Recording head part
22: First recording magnetic pole
24: Second recording magnetic pole
25: Recording gap
26: STO oscillation control magnetic field
30: Perpendicular magnetic recording medium
40: High-frequency oscillator unit (STO)
41: High frequency magnetic field generation layer (FGL)
43: Spin injection layer
44: DC power supply for driving STO
45: High frequency magnetic field (microwave)
50: Slider
130: Perpendicular magnetic recording medium
200: Data sector
201: Preamble servo part
202: Data part
203: Parity, ECC and CRC part
204: Data sector gap part
205: Synchronization part
206: Data address mark (DAM) part
207: Servo sector
1101: Crash stop
1102: HDA
1103: STW driving controller
1201: He sealing cover
1203: Disk flutter suppression plate
1204: Vibration suppression damper
1205: Cooling plate

What is claimed is:

1. A servo information recording method for recording servo-related information on a perpendicular magnetic recording medium by a magnetic head, the servo-related information including a servo sequence that provides positioning information made up of a seamless pattern having recording footprint in size that can be substantially ignored and having a total amount of recording magnetization that is substantially zero, the magnetic head including: a recording magnetic pole generating recording magnetic field; a high-frequency oscillation element provided in a recording gap of the recording magnetic pole and generating high-frequency magnetic field; a magnetic reproduction element that reads information from a magnetic recording medium; and a TFC (Thermal Flying Height Controller) element that adjusts clearance between the high-frequency generation element and a magnetic recording medium, the method comprising the steps of:

a first step of performing recording/reproducing of servo information on the perpendicular magnetic recording medium while changing a combination of a value of first current that generates the recording magnetic field and a value of second current that generates the high-frequency magnetic field, thus deciding a combination of a value of the first current and a value of the second current, from which a high recording/reproducing characteristic is obtained;

a second step of, when recording/reproducing is performed on the perpendicular magnetic recording medium by the value of the first current and the value of the second current decided at the first step, changing a value of the first current, thus deciding a combination with a value of the second current having a least effect of demagnetization at adjacent tracks; and a third step of, while changing input power by means that controls input power to the TFC element until the clearance has a predetermined value, performing recording/reproducing of servo information on the perpendicular magnetic recording medium while changing a value of the first current decided at the second step, thus deciding a combination of a value of the first current and a value of the second current, from which a high recording/reproducing characteristic is obtained.

2. The servo information recording method according to claim 1, wherein a recording head having a parameter that is expected to give a highest device yield during manufacturing of a magnetic storage device is used as the magnetic head, thus recording servo information at a predetermined track pitch.

3. The servo information recording method according to claim 1, wherein predetermined servo information is formed by moving the magnetic head at a pitch smaller than a recording track width.

4. The servo information recording method according to claim 1, wherein the second current is applied at least 0.3 ns ahead of application of the first current.

5. The servo information recording method according to claim 1, wherein the servo-related information includes at least a multi-spiral pattern having a substantially uniform width.

6. A servo track writer that records servo information including a servo sequence on a perpendicular magnetic recording medium, the servo sequence providing positioning information made up of a seamless pattern having recording footprint in size that can be substantially ignored and having a total amount of recording magnetization that is substantially zero, comprising:

a plurality of magnetic heads where each magnetic head includes: a recording magnetic pole generating a recording magnetic field; a high-frequency oscillation element provided in a recording gap of the recording magnetic pole and generating a high-frequency magnetic field; a magnetic reproduction element that reads information from a perpendicular magnetic recording medium; and a TFC (Thermal Flying Height Controller) element that adjusts clearance between the high-frequency generation element and a perpendicular magnetic recording medium;

a servo information recording/reproducing control unit that controls and processes a recording operation by the recording magnetic pole and the high-frequency oscillation element and a reproducing operation by the magnetic reproduction element for each magnetic head concurrently;

a TFC controller that controls an operation of the TFC element for each magnetic head concurrently; and a mechanism that fills He in an environment enclosing the magnetic heads, the magnetic recording medium and a mechanical unit during servo information recording.

7. The servo track writer according to claim 6, wherein the servo information recording/reproducing control unit includes a register in number corresponding to the number of magnetic heads included, the register holding a value of power to be input to the TFC element, a value of a signal to drive the high-frequency oscillation element, a value of signal to generate the recording magnetic field and values of operation timings of the foregoing.

8. A perpendicular magnetic recording medium, comprising a servo area where a magnetization pattern including a servo sequence that provides positioning information is recorded, the servo area further including an alternating current (AC) demagnetization area, wherein the servo sequence includes a seamless pattern having recording footprint in size that can be substantially ignored, a total amount of recording magnetization of the servo sequence is substantially zero; and the magnetization pattern includes negative and positive magnetization patterns which directly abut each other in a track length direction, all of the magnetization patterns at the servo area are seamless in a track width direction, and the magnetization pattern extends substantially across the entire track width direction.

9. The perpendicular magnetic recording medium according to claim 8, wherein the magnetization pattern at the servo area is recorded at a substantially constant track pitch.

10. The perpendicular magnetic recording medium according to claim 8, wherein the servo area includes a plurality of pieces of magnetization information having a total amount of recording magnetization that is substantially zero and includes at least a zone at a substantially constant track pitch.

11. The perpendicular magnetic recording medium according to claim 8, wherein a servo track in which the servo area is formed has a track pitch that is 1.06 times or more and 1.12 times or less of a track pitch of a data track recorded at a substantially constant track pitch.

12. The perpendicular magnetic recording medium according to claim 8, wherein a servo track in which the servo area is formed has a track pitch that is 1 time or more and 1.06 time or less of a track pitch of a data track recorded at a substantially constant track pitch.

13. A magnetic storage device, comprising
a perpendicular magnetic recording medium;
a medium driving unit that drives the perpendicular magnetic recording medium;
a magnetic head including: a recording head unit including a recording magnetic pole unit generating recording magnetic field, and a high-frequency oscillation element generating high-frequency magnetic field; and a reproducing head unit including a reproduction element, the magnetic head performing recording/reproducing operations with respect to the perpendicular magnetic recording medium; and a head driving unit that performs positioning of the magnetic head with reference to a track on the perpendicular magnetic recording medium, wherein the perpendicular magnetic recording medium includes a servo area where a magnetization pattern including a servo sequence that provides positioning information is recorded, the servo area further including an alternating current (AC) demagnetization area, the servo sequence including a seamless pattern having recording footprint in size that can be substantially ignored, and a total amount of recording magnetization of the servo sequence is substantially zero; and the magnetization pattern includes negative and positive magnetization patterns which directly abut each other in a track length direction, all of the magnetization patterns at the servo area are seamless in a track width direction, and the magnetization pattern extends substantially across the entire track width direction.

14. The magnetic storage device according to claim 13, wherein
the high-frequency oscillation element has a track width wider than a data track pitch of the perpendicular magnetic recording medium.

15. The magnetic storage device according to claim 13, wherein
the recording magnetic pole unit of the magnetic head forms a ring-shape magnetic core, in which a main recording magnetic field component concentrates on a recording gap unit.

16. The magnetic storage device according to claim 13, wherein
the recording magnetic pole unit of the magnetic head includes a protrusion having a same track width as the high-frequency oscillation element, or a recess wider than the track width of the high-frequency oscillation element.

17. The magnetic storage device according to claim 13, including a perpendicular magnetic recording medium including a data track having a center at a rotation center and being made up of a concentric sector that is eccentric to a servo track center.

* * * * *